(12) United States Patent
Yeung et al.

(10) Patent No.: US 12,338,772 B2
(45) Date of Patent: Jun. 24, 2025

(54) SYSTEMS, ASSEMBLIES, AND METHODS TO ENHANCE INTAKE AIR FLOW TO A GAS TURBINE ENGINE OF A HYDRAULIC FRACTURING UNIT

(71) Applicant: BJ Energy Solutions, LLC, Houston, TX (US)

(72) Inventors: Tony Yeung, Houston, TX (US); Ricardo Rodriguez-Ramon, Houston, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 363 days.

(21) Appl. No.: 17/989,601

(22) Filed: Nov. 17, 2022

(65) Prior Publication Data
US 2023/0086680 A1 Mar. 23, 2023

Related U.S. Application Data

(63) Continuation-in-part of application No. 17/954,118, filed on Sep. 27, 2022, now Pat. No. 11,598,263,
(Continued)

(51) Int. Cl.
*F02C 7/052* (2006.01)
*B01D 46/42* (2006.01)
(Continued)

(52) U.S. Cl.
CPC .......... *F02C 7/052* (2013.01); *B01D 46/4263* (2013.01); *B01D 46/58* (2022.01);
(Continued)

(58) Field of Classification Search
CPC .......... F02C 7/052; F02C 7/042; F02C 7/143; F02C 7/05; F02C 6/00; B01D 46/4263;
(Continued)

(56) References Cited

U.S. PATENT DOCUMENTS 1,442,239 A 1/1923 Stoltz
1,563,413 A 12/1925 Whitcomb
(Continued)

FOREIGN PATENT DOCUMENTS

AU 9609498 7/1999
AU 737970 9/2001
(Continued)

OTHER PUBLICATIONS

US 11,555,493 B2, 01/2023, Chang et al. (withdrawn)
(Continued)

*Primary Examiner* — Emmanuel E Duke
(74) *Attorney, Agent, or Firm* — Norton Rose Fulbright US LLP

(57) ABSTRACT

Systems, assemblies, and methods to enhance the efficiency of operation of a gas turbine engine may include a turbine housing positioned to at least partially enclose the gas turbine engine, and a filtration assembly connected to the turbine housing to supply at least partially filtered intake air to an inlet assembly associated with the gas turbine engine. The filtration assembly may include a pre-cleaner including one or more inertial separators configured to separate a first portion of particles and/or liquid from ambient air supplied to the gas turbine engine, thereby to provide at least partially filtered intake air, and one or more filters positioned downstream of the pre-cleaner to separate a second portion of the particles and/or liquid from the at least partially filtered intake air.

65 Claims, 17 Drawing Sheets

Related U.S. Application Data which is a continuation of application No. 17/403,373, filed on Aug. 16, 2021, now Pat. No. 11,560,845, which is a continuation of application No. 17/326,711, filed on May 21, 2021, now Pat. No. 11,156,159, which is a continuation of application No. 17/213,802, filed on Mar. 26, 2021, now Pat. No. 11,060,455, which is a continuation of application No. 16/948,289, filed on Sep. 11, 2020, now Pat. No. 11,002,189.

(60) Provisional application No. 62/704,565, filed on May 15, 2020, provisional application No. 62/900,291, filed on Sep. 13, 2019.

(51) Int. Cl.
    *B01D 46/58*     (2022.01)
    *F02C 6/00*     (2006.01)
    *F02C 7/042*     (2006.01)
    *F02C 7/143*     (2006.01)

(52) U.S. Cl.
    CPC ............... *F02C 6/00* (2013.01); *F02C 7/042* (2013.01); *F02C 7/143* (2013.01); *B01D 2279/60* (2013.01)

(58) Field of Classification Search
    CPC .. B01D 46/58; B01D 46/121; B01D 2279/60; B01D 2273/30; B01D 45/04
    See application file for complete search history.

(56) References Cited

U.S. PATENT DOCUMENTS

| | | |
|---|---|---|
| 1,716,049 A | 6/1929 | Greve |
| 1,726,633 A | 9/1929 | Smith |
| 2,178,662 A | 11/1939 | Lars |
| 2,427,638 A | 9/1947 | Vilter |
| 2,498,229 A | 2/1950 | Adler |
| 2,535,703 A | 12/1950 | Smith et al. |
| 2,572,711 A | 10/1951 | Fischer |
| 2,820,341 A | 1/1958 | Amann |
| 2,868,004 A | 1/1959 | Runde |
| 2,940,377 A | 6/1960 | Darnell et al. |
| 2,947,141 A | 8/1960 | Russ |
| 2,956,738 A | 10/1960 | Rosenschold |
| 3,068,796 A | 12/1962 | Pfluger et al. |
| 3,191,517 A | 6/1965 | Solzman |
| 3,257,031 A | 6/1966 | Dietz |
| 3,274,768 A | 9/1966 | Klein |
| 3,378,074 A | 4/1968 | Kiel |
| 3,382,671 A | 5/1968 | Ehni, III |
| 3,401,873 A | 9/1968 | Privon |
| 3,463,612 A | 8/1969 | Whitsel |
| 3,496,880 A | 2/1970 | Wolff |
| 3,550,696 A | 12/1970 | Kenneday |
| 3,560,053 A | 2/1971 | Ortloff |
| 3,586,459 A | 6/1971 | Zerlauth |
| 3,632,222 A | 1/1972 | Cronstedt |
| 3,656,582 A | 4/1972 | Alcock |
| 3,667,868 A | 6/1972 | Brunner |
| 3,692,434 A | 9/1972 | Schnear |
| 3,695,808 A | 10/1972 | Beneze et al. |
| 3,739,872 A | 6/1973 | McNair |
| 3,757,581 A | 9/1973 | Mankin |
| 3,759,063 A | 9/1973 | Bendall |
| 3,765,173 A | 10/1973 | Harris |
| 3,771,916 A | 11/1973 | Flanigan et al. |
| 3,773,438 A | 11/1973 | Hall et al. |
| 3,781,135 A | 12/1973 | Nickell |
| 3,786,835 A | 1/1974 | Finger |
| 3,791,682 A | 2/1974 | Mitchell |
| 3,796,045 A | 3/1974 | Foster |
| 3,801,394 A | 4/1974 | Alexander et al. |
| 3,814,549 A | 6/1974 | Cronstedt |
| 3,820,922 A | 6/1974 | Buse et al. |
| 3,847,511 A | 11/1974 | Cole |
| 3,866,108 A | 2/1975 | Yannone |
| 3,875,380 A | 4/1975 | Rankin |
| 3,963,372 A | 6/1976 | McLain et al. |
| 4,010,613 A | 3/1977 | McInerney |
| 4,019,477 A | 4/1977 | Overton |
| 4,031,407 A | 6/1977 | Reed |
| 4,050,862 A | 9/1977 | Buse |
| 4,059,045 A | 11/1977 | McClain |
| 4,086,976 A | 5/1978 | Holm et al. |
| 4,117,342 A | 9/1978 | Melley, Jr. |
| 4,147,230 A * | 4/1979 | Ormond .................. F01N 1/088 181/231 |
| 4,173,121 A | 11/1979 | Yu |
| 4,204,808 A | 5/1980 | Reese et al. |
| 4,209,079 A | 6/1980 | Marchal et al. |
| 4,209,979 A | 7/1980 | Woodhouse et al. |
| 4,222,229 A | 9/1980 | Uram |
| 4,239,396 A | 12/1980 | Arribau et al. |
| 4,269,569 A | 5/1981 | Hoover |
| 4,311,395 A | 1/1982 | Douthitt et al. |
| 4,330,237 A | 5/1982 | Battah |
| 4,341,508 A | 7/1982 | Rambin, Jr. |
| 4,357,027 A | 11/1982 | Zeitlow |
| 4,383,478 A | 5/1983 | Jones |
| 4,402,504 A | 9/1983 | Christian |
| 4,430,047 A | 2/1984 | Ilg |
| 4,442,665 A | 4/1984 | Fick |
| 4,457,325 A | 7/1984 | Green |
| 4,470,771 A | 9/1984 | Hall et al. |
| 4,483,684 A | 11/1984 | Black |
| 4,505,650 A | 3/1985 | Hannett et al. |
| 4,574,880 A | 3/1986 | Handke |
| 4,584,654 A | 4/1986 | Crane |
| 4,620,330 A | 11/1986 | Izzi, Sr. |
| 4,672,813 A | 6/1987 | David |
| 4,697,668 A * | 10/1987 | Barker ...................... F01N 5/04 181/255 |
| 4,754,607 A | 7/1988 | Mackay |
| 4,782,244 A | 11/1988 | Wakimoto |
| 4,796,777 A | 1/1989 | Keller |
| 4,804,162 A | 2/1989 | Rice |
| 4,869,209 A | 9/1989 | Young |
| 4,913,625 A | 4/1990 | Gerlowski |
| 4,983,259 A | 1/1991 | Duncan |
| 4,990,058 A | 2/1991 | Eslinger |
| 5,032,065 A | 7/1991 | Yamamuro |
| 5,135,361 A | 8/1992 | Dion |
| 5,167,493 A | 12/1992 | Kobari |
| 5,245,970 A | 9/1993 | Iwaszkiewicz et al. |
| 5,291,842 A | 3/1994 | Sallstrom et al. |
| 5,326,231 A | 7/1994 | Pandeya |
| 5,362,219 A | 11/1994 | Paul et al. |
| 5,511,956 A | 4/1996 | Hasegawa |
| 5,537,813 A | 7/1996 | Davis et al. |
| 5,553,514 A | 9/1996 | Walkowc |
| 5,560,195 A | 10/1996 | Anderson et al. |
| 5,586,444 A | 12/1996 | Fung |
| 5,622,245 A | 4/1997 | Reik |
| 5,626,103 A | 5/1997 | Haws et al. |
| 5,634,777 A | 6/1997 | Albertin |
| 5,651,400 A | 7/1997 | Corts et al. |
| 5,678,460 A | 10/1997 | Nalkowc |
| 5,717,172 A | 2/1998 | Griffin, Jr. et al. |
| 5,720,598 A | 2/1998 | de Chizzelle |
| 5,761,084 A | 6/1998 | Edwards |
| 5,811,676 A | 9/1998 | Spalding et al. |
| 5,839,888 A | 11/1998 | Harrison |
| 5,846,062 A | 12/1998 | Yanagisawa et al. |
| 5,875,744 A | 3/1999 | Vallejos |
| 5,983,962 A | 11/1999 | Gerardot |
| 5,992,944 A | 11/1999 | Hara |
| 6,041,856 A | 3/2000 | Thrasher et al. |
| 6,050,080 A | 4/2000 | Horner |
| 6,067,962 A | 5/2000 | Bartley et al. |
| 6,071,188 A | 6/2000 | O'Neill et al. |
| 6,074,170 A | 6/2000 | Bert et al. |
| 6,123,751 A | 9/2000 | Nelson et al. |

(56) References Cited

U.S. PATENT DOCUMENTS

| | | |
|---|---|---|
| 6,129,335 A | 10/2000 | Yokogi |
| 6,145,318 A | 11/2000 | Kaplan et al. |
| 6,230,481 B1 | 5/2001 | Jahr |
| 6,250,068 B1 | 6/2001 | Tajima et al. |
| 6,279,309 B1 | 8/2001 | Lawlor, II et al. |
| 6,321,860 B1 | 11/2001 | Reddoch |
| 6,334,746 B1 | 1/2002 | Nguyen et al. |
| 6,388,317 B1 | 5/2002 | Reese |
| 6,401,472 B2 | 6/2002 | Pollrich |
| 6,530,224 B1 | 3/2003 | Conchieri |
| 6,543,395 B2 | 4/2003 | Green |
| 6,655,922 B1 | 12/2003 | Flek |
| 6,669,453 B1 | 12/2003 | Breeden |
| 6,765,304 B2 | 7/2004 | Baten et al. |
| 6,786,051 B2 | 9/2004 | Kristich et al. |
| 6,832,900 B2 | 12/2004 | Leu |
| 6,851,514 B2 | 2/2005 | Han et al. |
| 6,859,740 B2 | 2/2005 | Stephenson et al. |
| 6,901,735 B2 | 6/2005 | Lohn |
| 6,962,057 B2 | 11/2005 | Kurokawa et al. |
| 7,007,966 B2 | 3/2006 | Campion |
| 7,047,747 B2 | 5/2006 | Tanaka |
| 7,065,953 B1 | 6/2006 | Kopko |
| 7,143,016 B1 | 11/2006 | Discenzo et al. |
| 7,222,015 B2 | 5/2007 | Davis et al. |
| 7,281,519 B2 | 10/2007 | Schroeder |
| 7,388,303 B2 | 6/2008 | Seiver |
| 7,404,294 B2 | 7/2008 | Sundin |
| 7,442,239 B2 | 10/2008 | Armstrong et al. |
| 7,524,173 B2 | 4/2009 | Cummins |
| 7,545,130 B2 | 6/2009 | Latham |
| 7,552,903 B2 | 6/2009 | Dunn et al. |
| 7,563,076 B2 | 7/2009 | Brunet et al. |
| 7,563,413 B2 | 7/2009 | Naets et al. |
| 7,574,325 B2 | 8/2009 | Dykstra |
| 7,581,379 B2 | 9/2009 | Yoshida et al. |
| 7,594,424 B2 | 9/2009 | Fazekas |
| 7,614,239 B2 | 11/2009 | Herzog et al. |
| 7,627,416 B2 | 12/2009 | Batenburg et al. |
| 7,677,316 B2 | 3/2010 | Butler et al. |
| 7,721,521 B2 | 5/2010 | Kunkle et al. |
| 7,730,711 B2 | 6/2010 | Kunkle et al. |
| 7,779,961 B2 | 8/2010 | Matte |
| 7,789,452 B2 | 9/2010 | Dempsey et al. |
| 7,836,949 B2 | 11/2010 | Dykstra |
| 7,841,394 B2 | 11/2010 | McNeel et al. |
| 7,845,413 B2 | 12/2010 | Shampine et al. |
| 7,861,679 B2 | 1/2011 | Lemke et al. |
| 7,886,702 B2 | 2/2011 | Jerrell et al. |
| 7,900,724 B2 | 3/2011 | Promersberger et al. |
| 7,921,914 B2 | 4/2011 | Bruins et al. |
| 7,938,151 B2 | 5/2011 | Höckner |
| 7,955,056 B2 | 6/2011 | Pettersson |
| 7,980,357 B2 | 7/2011 | Edwards |
| 8,056,635 B2 | 11/2011 | Shampine et al. |
| 8,083,504 B2 | 12/2011 | Williams et al. |
| 8,099,942 B2 | 1/2012 | Alexander |
| 8,167,980 B2 | 5/2012 | Hiner et al. |
| 8,186,334 B2 | 5/2012 | Ooyama |
| 8,196,555 B2 | 6/2012 | Keda et al. |
| 8,202,354 B2 | 6/2012 | Iijima |
| 8,292,216 B1 | 10/2012 | Rumberger, Jr. |
| 8,316,936 B2 | 11/2012 | Roddy et al. |
| 8,336,631 B2 | 12/2012 | Shampine et al. |
| 8,388,317 B2 | 3/2013 | Sung |
| 8,414,673 B2 | 4/2013 | Raje et al. |
| 8,469,826 B2 | 6/2013 | Brosowske |
| 8,491,687 B1 | 7/2013 | Wann |
| 8,500,215 B2 | 8/2013 | Gastauer |
| 8,506,267 B2 | 8/2013 | Gambier et al. |
| 8,575,873 B2 | 11/2013 | Peterson et al. |
| 8,616,005 B1 | 12/2013 | Cousino, Sr. et al. |
| 8,621,873 B2 | 1/2014 | Robertson et al. |
| 8,641,399 B2 | 2/2014 | Mucibabic |
| 8,656,990 B2 | 2/2014 | Kajaria et al. |
| 8,672,606 B2 | 3/2014 | Glynn et al. |
| 8,673,040 B2 | 3/2014 | Handley et al. |
| 8,707,853 B1 | 4/2014 | Dille et al. |
| 8,708,667 B2 | 4/2014 | Collingborn |
| 8,714,253 B2 | 5/2014 | Sherwood et al. |
| 8,757,918 B2 | 6/2014 | Ramnarain et al. |
| 8,763,583 B2 | 7/2014 | Hofbauer et al. |
| 8,770,329 B2 | 7/2014 | Spitler |
| 8,784,081 B1 | 7/2014 | Blume |
| 8,789,601 B2 | 7/2014 | Broussard et al. |
| 8,794,307 B2 | 8/2014 | Coquilleau et al. |
| 8,801,394 B2 | 8/2014 | Anderson |
| 8,840,364 B2 | 9/2014 | Warton et al. |
| 8,851,186 B2 | 10/2014 | Shampine et al. |
| 8,851,441 B2 | 10/2014 | Acuna et al. |
| 8,894,356 B2 | 11/2014 | Lafontaine et al. |
| 8,905,056 B2 | 12/2014 | Kendrick |
| 8,951,019 B2 | 2/2015 | Hains et al. |
| 8,973,560 B2 | 3/2015 | Krug |
| 8,997,904 B2 | 4/2015 | Cryer et al. |
| 9,011,111 B2 | 4/2015 | Lesko |
| 9,016,383 B2 | 4/2015 | Shampine et al. |
| 9,032,620 B2 | 5/2015 | Frassinelli et al. |
| 9,057,247 B2 | 6/2015 | Kumar et al. |
| 9,097,249 B2 | 8/2015 | Petersen |
| 9,103,193 B2 | 8/2015 | Coli et al. |
| 9,121,257 B2 | 9/2015 | Coli et al. |
| 9,140,110 B2 | 9/2015 | Coli et al. |
| 9,175,810 B2 | 11/2015 | Hains |
| 9,187,982 B2 | 11/2015 | Dehring et al. |
| 9,206,667 B2 | 12/2015 | Khvoshchev et al. |
| 9,212,643 B2 | 12/2015 | Deliyski |
| 9,222,346 B1 | 12/2015 | Walls |
| 9,249,733 B2 | 2/2016 | Hallam et al. |
| 9,324,049 B2 | 4/2016 | Thomeer et al. |
| 9,341,055 B2 | 5/2016 | Weightman et al. |
| 9,346,662 B2 | 5/2016 | Van Vliet et al. |
| 9,366,114 B2 | 6/2016 | Coli et al. |
| 9,376,786 B2 | 6/2016 | Numasawa |
| 9,394,829 B2 | 7/2016 | Cabeen et al. |
| 9,395,049 B2 | 7/2016 | Vicknair et al. |
| 9,401,670 B2 | 7/2016 | Minato et al. |
| 9,410,410 B2 | 8/2016 | Broussard et al. |
| 9,410,546 B2 | 8/2016 | Jaeger et al. |
| 9,429,078 B1 | 8/2016 | Crowe et al. |
| 9,435,333 B2 | 9/2016 | McCoy et al. |
| 9,488,169 B2 | 11/2016 | Cochran et al. |
| 9,493,997 B2 | 11/2016 | Liu et al. |
| 9,512,783 B2 | 12/2016 | Veilleux et al. |
| 9,534,473 B2 | 1/2017 | Morris et al. |
| 9,546,652 B2 | 1/2017 | Yin |
| 9,550,501 B2 | 1/2017 | Ledbetter |
| 9,556,721 B2 | 1/2017 | Jang et al. |
| 9,562,420 B2 | 2/2017 | Morris et al. |
| 9,570,945 B2 | 2/2017 | Fischer |
| 9,579,980 B2 | 2/2017 | Cryer et al. |
| 9,587,649 B2 | 3/2017 | Oehring |
| 9,593,710 B2 | 3/2017 | Laimboeck et al. |
| 9,611,728 B2 | 4/2017 | Oehring |
| 9,617,808 B2 | 4/2017 | Liu et al. |
| 9,638,101 B1 | 5/2017 | Crowe et al. |
| 9,638,194 B2 | 5/2017 | Wiegman et al. |
| 9,650,871 B2 | 5/2017 | Oehring et al. |
| 9,650,879 B2 | 5/2017 | Broussard et al. |
| 9,656,762 B2 | 5/2017 | Kamath et al. |
| 9,689,316 B1 | 6/2017 | Crom |
| 9,695,808 B2 | 7/2017 | Giessbach et al. |
| 9,739,130 B2 | 8/2017 | Young |
| 9,764,266 B1 | 9/2017 | Carter |
| 9,777,748 B2 | 10/2017 | Lu et al. |
| 9,803,467 B2 | 10/2017 | Tang et al. |
| 9,803,793 B2 | 10/2017 | Davi et al. |
| 9,809,308 B2 | 11/2017 | Aguilar et al. |
| 9,829,002 B2 | 11/2017 | Crom |
| 9,840,897 B2 | 12/2017 | Larson |
| 9,840,901 B2 | 12/2017 | Oehring et al. |
| 9,845,730 B2 | 12/2017 | Betti et al. |
| 9,850,422 B2 | 12/2017 | Lestz et al. |
| 9,856,131 B1 | 1/2018 | Moffitt |

(56) References Cited

U.S. PATENT DOCUMENTS

| | | |
|---|---|---|
| 9,863,279 B2 | 1/2018 | Laing et al. |
| 9,869,305 B1 | 1/2018 | Crowe et al. |
| 9,871,406 B1 | 1/2018 | Churnock et al. |
| 9,879,609 B1 | 1/2018 | Crowe et al. |
| RE46,725 E | 2/2018 | Case et al. |
| 9,893,500 B2 | 2/2018 | Oehring et al. |
| 9,893,660 B2 | 2/2018 | Peterson et al. |
| 9,897,003 B2 | 2/2018 | Motakef et al. |
| 9,920,615 B2 | 3/2018 | Zhang et al. |
| 9,945,365 B2 | 4/2018 | Hernandez et al. |
| 9,964,052 B2 | 5/2018 | Millican et al. |
| 9,970,278 B2 | 5/2018 | Broussard et al. |
| 9,981,840 B2 | 5/2018 | Shock |
| 9,995,102 B2 | 6/2018 | Dillie et al. |
| 9,995,218 B2 | 6/2018 | Oehring et al. |
| 10,008,880 B2 | 6/2018 | Vicknair et al. |
| 10,008,912 B2 | 6/2018 | Davey et al. |
| 10,018,096 B2 | 7/2018 | Wallimann et al. |
| 10,020,711 B2 | 7/2018 | Oehring et al. |
| 10,024,123 B2 | 7/2018 | Steffenhagen et al. |
| 10,029,289 B2 | 7/2018 | Wendorski et al. |
| 10,030,579 B2 | 7/2018 | Austin et al. |
| 10,036,238 B2 | 7/2018 | Oehring |
| 10,040,541 B2 | 8/2018 | Wilson et al. |
| 10,060,293 B2 | 8/2018 | Del Bono |
| 10,060,349 B2 | 8/2018 | Álvarez et al. |
| 10,077,933 B2 | 9/2018 | Nelson et al. |
| 10,082,137 B2 | 9/2018 | Graham et al. |
| 10,094,366 B2 | 10/2018 | Marica |
| 10,100,827 B2 | 10/2018 | Devan et al. |
| 10,107,084 B2 | 10/2018 | Coli et al. |
| 10,107,085 B2 | 10/2018 | Coli et al. |
| 10,114,061 B2 | 10/2018 | Frampton et al. |
| 10,119,381 B2 | 11/2018 | Oehring et al. |
| 10,125,750 B2 | 11/2018 | Pfaff |
| 10,134,257 B2 | 11/2018 | Zhang et al. |
| 10,138,098 B2 | 11/2018 | Sorensen et al. |
| 10,151,244 B2 | 12/2018 | Giancotti et al. |
| 10,161,423 B2 | 12/2018 | Rampen |
| 10,174,599 B2 | 1/2019 | Shampine et al. |
| 10,184,397 B2 | 1/2019 | Austin et al. |
| 10,196,258 B2 | 2/2019 | Kalala et al. |
| 10,221,856 B2 | 3/2019 | Hernandez et al. |
| 10,227,854 B2 | 3/2019 | Glass |
| 10,227,855 B2 | 3/2019 | Coli et al. |
| 10,246,984 B2 | 4/2019 | Payne et al. |
| 10,247,182 B2 | 4/2019 | Zhang et al. |
| 10,254,732 B2 | 4/2019 | Oehring et al. |
| 10,267,439 B2 | 4/2019 | Pryce et al. |
| 10,280,724 B2 | 5/2019 | Hinderliter |
| 10,287,943 B1 | 5/2019 | Schiltz |
| 10,288,519 B2 | 5/2019 | De La Cruz |
| 10,303,190 B2 | 5/2019 | Shock |
| 10,305,350 B2 | 5/2019 | Johnson et al. |
| 10,316,832 B2 | 6/2019 | Byrne |
| 10,317,875 B2 | 6/2019 | Pandurangan et al. |
| 10,337,402 B2 | 7/2019 | Austin et al. |
| 10,358,035 B2 | 7/2019 | Cryer |
| 10,371,012 B2 | 8/2019 | Davis et al. |
| 10,374,485 B2 | 8/2019 | Morris et al. |
| 10,378,326 B2 | 8/2019 | Morris et al. |
| 10,393,108 B2 | 8/2019 | Chong et al. |
| 10,407,990 B2 | 9/2019 | Oehring et al. |
| 10,408,031 B2 | 9/2019 | Oehring et al. |
| 10,415,348 B2 | 9/2019 | Zhang et al. |
| 10,415,557 B1 | 9/2019 | Crowe et al. |
| 10,415,562 B2 | 9/2019 | Kajita et al. |
| 10,415,563 B2 | 9/2019 | Robinson et al. |
| RE47,695 E | 11/2019 | Case et al. |
| 10,465,689 B2 | 11/2019 | Crom |
| 10,478,753 B1 | 11/2019 | Elms et al. |
| 10,526,882 B2 | 1/2020 | Oehring et al. |
| 10,563,649 B2 | 2/2020 | Zhang et al. |
| 10,577,910 B2 | 3/2020 | Stephenson |
| 10,584,645 B2 | 3/2020 | Nakagawa et al. |
| 10,590,805 B2 | 3/2020 | Kersey et al. |
| 10,590,867 B2 | 3/2020 | Thomassin et al. |
| 10,598,258 B2 | 3/2020 | Oehring et al. |
| 10,610,842 B2 | 4/2020 | Chong |
| 10,648,531 B2 | 5/2020 | Maienschein et al. |
| 10,655,516 B2 | 5/2020 | Kulkarni et al. |
| 10,662,749 B1 | 5/2020 | Hill et al. |
| 10,711,787 B1 | 7/2020 | Darley |
| 10,738,580 B1 | 8/2020 | Fischer et al. |
| 10,753,153 B1 | 8/2020 | Fischer et al. |
| 10,753,165 B1 | 8/2020 | Fischer et al. |
| 10,760,556 B1 | 9/2020 | Crom et al. |
| 10,794,165 B2 | 10/2020 | Fischer et al. |
| 10,794,166 B2 | 10/2020 | Reckels et al. |
| 10,801,311 B1 | 10/2020 | Cui et al. |
| 10,815,764 B1 | 10/2020 | Yeung et al. |
| 10,815,978 B2 | 10/2020 | Glass |
| 10,830,032 B1 | 11/2020 | Zhang et al. |
| 10,830,104 B2 | 11/2020 | Rochin et al. |
| 10,830,225 B2 | 11/2020 | Repaci |
| 10,859,203 B2 | 12/2020 | Cui et al. |
| 10,864,487 B1 | 12/2020 | Han et al. |
| 10,865,624 B1 | 12/2020 | Cui et al. |
| 10,865,631 B1 | 12/2020 | Zhang et al. |
| 10,870,093 B1 | 12/2020 | Zhong et al. |
| 10,871,045 B2 | 12/2020 | Fischer et al. |
| 10,895,202 B1 | 1/2021 | Yeung et al. |
| 10,900,475 B2 | 1/2021 | Weightman et al. |
| 10,907,459 B1 | 2/2021 | Yeung et al. |
| 10,907,698 B2 | 2/2021 | Moreno Castro |
| 10,927,774 B2 | 2/2021 | Cai et al. |
| 10,927,802 B2 | 2/2021 | Oehring |
| 10,954,770 B1 | 3/2021 | Yeung et al. |
| 10,954,855 B1 | 3/2021 | Ji et al. |
| 10,961,614 B1 | 3/2021 | Yeung et al. |
| 10,961,908 B1 | 3/2021 | Yeung et al. |
| 10,961,912 B1 | 3/2021 | Yeung et al. |
| 10,961,914 B1 | 3/2021 | Yeung et al. |
| 10,961,993 B1 | 3/2021 | Ji et al. |
| 10,961,995 B2 | 3/2021 | Mayorca |
| 10,892,596 B2 | 4/2021 | Yeung et al. |
| 10,968,837 B1 | 4/2021 | Yeung et al. |
| 10,982,523 B1 | 4/2021 | Hill et al. |
| 10,982,596 B1 | 4/2021 | Yeung et al. |
| 10,989,019 B2 | 4/2021 | Cai et al. |
| 10,989,180 B2 | 4/2021 | Yeung et al. |
| 10,995,564 B2 | 5/2021 | Miller et al. |
| 11,002,189 B2 | 5/2021 | Yeung et al. |
| 11,008,950 B2 | 5/2021 | Ethier et al. |
| 11,014,444 B2 | 5/2021 | Wetzel |
| 11,015,423 B1 | 5/2021 | Yeung et al. |
| 11,015,536 B2 | 5/2021 | Yeung et al. |
| 11,015,594 B2 | 5/2021 | Yeung et al. |
| 11,022,526 B1 | 6/2021 | Yeung et al. |
| 11,028,677 B1 | 6/2021 | Yeung et al. |
| 11,035,213 B2 | 6/2021 | Dusterhoft et al. |
| 11,035,214 B2 | 6/2021 | Cui et al. |
| 11,047,379 B1 | 6/2021 | Li et al. |
| 11,053,853 B2 | 7/2021 | Li et al. |
| 11,060,455 B1 | 7/2021 | Yeung et al. |
| 11,066,915 B1 | 7/2021 | Yeung et al. |
| 11,068,455 B1 | 7/2021 | Shabi et al. |
| 11,085,281 B1 | 8/2021 | Yeung et al. |
| 11,085,282 B2 | 8/2021 | Mazrooee et al. |
| 11,092,152 B2 | 8/2021 | Yeung et al. |
| 11,098,651 B1 | 8/2021 | Yeung et al. |
| 11,105,250 B1 | 8/2021 | Zhang et al. |
| 11,105,266 B2 | 8/2021 | Zhou et al. |
| 11,109,508 B1 | 8/2021 | Yeung et al. |
| 11,111,768 B1 | 9/2021 | Yeung et al. |
| 11,125,066 B1 | 9/2021 | Yeung et al. |
| 11,125,156 B2 | 9/2021 | Zhang et al. |
| 11,129,295 B1 | 9/2021 | Yeung et al. |
| 11,143,000 B2 | 10/2021 | Li et al. |
| 11,143,005 B2 | 10/2021 | Dusterhoft et al. |
| 11,143,006 B1 | 10/2021 | Zhang et al. |
| 11,149,533 B1 | 10/2021 | Yeung et al. |
| 11,149,726 B1 | 10/2021 | Yeung et al. |
| 11,156,159 B1 | 10/2021 | Yeung et al. |

(56) References Cited

U.S. PATENT DOCUMENTS

| | | |
|---|---|---|
| 11,168,681 B2 | 11/2021 | Boguski |
| 11,174,716 B1 | 11/2021 | Yeung et al. |
| 11,193,360 B1 | 12/2021 | Yeung et al. |
| 11,193,361 B1 | 12/2021 | Yeung et al. |
| 11,205,880 B1 | 12/2021 | Yeung et al. |
| 11,205,881 B2 | 12/2021 | Yeung et al. |
| 11,208,879 B1 | 12/2021 | Yeung et al. |
| 11,208,953 B1 | 12/2021 | Yeung et al. |
| 11,220,895 B1 | 1/2022 | Yeung et al. |
| 11,236,739 B2 | 2/2022 | Yeung et al. |
| 11,242,737 B2 | 2/2022 | Zhang et al. |
| 11,242,802 B2 | 2/2022 | Yeung et al. |
| 11,243,509 B2 | 2/2022 | Cai et al. |
| 11,251,650 B1 | 2/2022 | Liu et al. |
| 11,261,717 B2 | 3/2022 | Yeung et al. |
| 11,268,346 B2 | 3/2022 | Yeung et al. |
| 11,280,266 B2 | 3/2022 | Yeung et al. |
| 11,280,331 B2 | 3/2022 | Yeung et al. |
| 11,306,835 B1 | 4/2022 | Dille et al. |
| RE49,083 E | 5/2022 | Case et al. |
| 11,339,638 B1 | 5/2022 | Yeung et al. |
| 11,346,200 B2 | 5/2022 | Cai et al. |
| 11,373,058 B2 | 6/2022 | Jaaskelainen et al. |
| RE49,140 E | 7/2022 | Case et al. |
| 11,377,943 B2 | 7/2022 | Kriebel et al. |
| RE49,155 E | 8/2022 | Case et al. |
| RE49,156 E | 8/2022 | Case et al. |
| 11,401,927 B2 | 8/2022 | Li et al. |
| 11,415,056 B1 | 8/2022 | Yeung et al. |
| 11,428,165 B2 | 8/2022 | Yeung et al. |
| 11,441,483 B2 | 9/2022 | Li et al. |
| 11,448,122 B2 | 9/2022 | Feng et al. |
| 11,459,954 B2 | 10/2022 | Yeung et al. |
| 11,466,680 B2 | 10/2022 | Yeung et al. |
| 11,480,040 B2 | 10/2022 | Han et al. |
| 11,492,887 B2 | 11/2022 | Cui et al. |
| 11,499,405 B2 | 11/2022 | Zhang et al. |
| 11,506,039 B2 | 11/2022 | Zhang et al. |
| 11,512,570 B2 | 11/2022 | Yeung |
| 11,519,395 B2 | 12/2022 | Zhang et al. |
| 11,519,405 B2 | 12/2022 | Deng et al. |
| 11,530,602 B2 | 12/2022 | Yeung et al. |
| 11,549,349 B2 | 1/2023 | Wang et al. |
| 11,555,390 B2 | 1/2023 | Cui et al. |
| 11,555,756 B2 | 1/2023 | Yeung et al. |
| 11,557,887 B2 | 1/2023 | Ji et al. |
| 11,560,779 B2 | 1/2023 | Mao et al. |
| 11,560,845 B2 | 1/2023 | Yeung et al. |
| 11,560,848 B2 | 1/2023 | Yeung et al. |
| 11,572,775 B2 | 2/2023 | Mao et al. |
| 11,575,249 B2 | 2/2023 | Ji et al. |
| 11,592,020 B2 | 2/2023 | Chang et al. |
| 11,596,047 B2 | 2/2023 | Liu et al. |
| 11,598,263 B2 | 3/2023 | Yeung et al. |
| 11,603,797 B2 | 3/2023 | Zhang et al. |
| 11,607,982 B2 | 3/2023 | Tian et al. |
| 11,608,726 B2 | 3/2023 | Zhang et al. |
| 11,624,326 B2 | 4/2023 | Yeung et al. |
| 11,629,583 B2 | 4/2023 | Yeung et al. |
| 11,629,584 B2 | 4/2023 | Yeung et al. |
| 11,629,589 B2 | 4/2023 | Lin et al. |
| 11,649,766 B1 | 5/2023 | Yeung et al. |
| 11,655,763 B1 | 5/2023 | Yeung et al. |
| 11,662,384 B2 | 5/2023 | Liu et al. |
| 11,668,173 B2 | 6/2023 | Zhang et al. |
| 11,668,289 B2 | 6/2023 | Chang et al. |
| 11,677,238 B2 | 6/2023 | Liu et al. |
| 11,767,791 B2 | 9/2023 | Yeung et al. |
| 11,859,482 B2 | 1/2024 | Yeung et al. |
| 2002/0126922 A1 | 9/2002 | Cheng et al. |
| 2002/0197176 A1 | 12/2002 | Kondo |
| 2003/0031568 A1 | 2/2003 | Stiefel |
| 2003/0061819 A1 | 4/2003 | Kuroki et al. |
| 2003/0161212 A1 | 8/2003 | Neal et al. |
| 2004/0016245 A1 | 1/2004 | Pierson |
| 2004/0074238 A1 | 4/2004 | Wantanabe et al. |
| 2004/0076526 A1 | 4/2004 | Fukano et al. |
| 2004/0187950 A1 | 9/2004 | Cohen et al. |
| 2004/0219040 A1 | 11/2004 | Kugelev et al. |
| 2004/0255783 A1* | 12/2004 | Graham ............... B01D 46/10 55/528 |
| 2005/0051322 A1 | 3/2005 | Speer |
| 2005/0056081 A1 | 3/2005 | Gocho |
| 2005/0139286 A1 | 6/2005 | Poulter |
| 2005/0196298 A1 | 9/2005 | Manning |
| 2005/0226754 A1 | 10/2005 | Orr et al. |
| 2005/0274134 A1 | 12/2005 | Ryu et al. |
| 2006/0061091 A1 | 3/2006 | Osterloh |
| 2006/0062914 A1 | 3/2006 | Garg et al. |
| 2006/0196251 A1 | 9/2006 | Richey |
| 2006/0211356 A1 | 9/2006 | Grassman |
| 2006/0228225 A1 | 10/2006 | Rogers |
| 2006/0260331 A1 | 11/2006 | Andreychuk |
| 2006/0272333 A1 | 12/2006 | Sundin |
| 2007/0029090 A1 | 2/2007 | Andreychuk et al. |
| 2007/0041848 A1 | 2/2007 | Wood et al. |
| 2007/0066406 A1 | 3/2007 | Keller et al. |
| 2007/0098580 A1 | 5/2007 | Petersen |
| 2007/0107981 A1 | 5/2007 | Sicotte |
| 2007/0125544 A1 | 6/2007 | Robinson et al. |
| 2007/0169543 A1 | 7/2007 | Fazekas |
| 2007/0181212 A1 | 8/2007 | Fell |
| 2007/0277982 A1 | 12/2007 | Shampine et al. |
| 2007/0295569 A1 | 12/2007 | Manzoor et al. |
| 2008/0006089 A1 | 1/2008 | Adnan et al. |
| 2008/0098891 A1 | 5/2008 | Feher |
| 2008/0161974 A1 | 7/2008 | Alston |
| 2008/0187431 A1 | 8/2008 | Brown et al. |
| 2008/0212275 A1 | 9/2008 | Waryck et al. |
| 2008/0229757 A1 | 9/2008 | Alexander et al. |
| 2008/0264625 A1 | 10/2008 | Ochoa |
| 2008/0264649 A1 | 10/2008 | Crawford |
| 2008/0298982 A1 | 12/2008 | Pabst |
| 2009/0064685 A1 | 3/2009 | Busekros et al. |
| 2009/0068031 A1 | 3/2009 | Gambier et al. |
| 2009/0092510 A1 | 4/2009 | Williams et al. |
| 2009/0124191 A1 | 5/2009 | Van Becelaere et al. |
| 2009/0178412 A1 | 7/2009 | Spytek |
| 2009/0212630 A1 | 8/2009 | Flegel et al. |
| 2009/0249794 A1 | 10/2009 | Wilkes et al. |
| 2009/0252616 A1 | 10/2009 | Brunet et al. |
| 2009/0308602 A1 | 12/2009 | Bruins et al. |
| 2010/0019626 A1 | 1/2010 | Stout et al. |
| 2010/0071899 A1 | 3/2010 | Coquilleau et al. |
| 2010/0119304 A1 | 5/2010 | Nelson et al. |
| 2010/0218508 A1 | 9/2010 | Brown et al. |
| 2010/0300683 A1 | 12/2010 | Looper et al. |
| 2010/0310384 A1 | 12/2010 | Stephenson et al. |
| 2011/0041681 A1 | 2/2011 | Duerr |
| 2011/0052423 A1 | 3/2011 | Gambier et al. |
| 2011/0054704 A1 | 3/2011 | Karpman et al. |
| 2011/0083419 A1 | 4/2011 | Upadhyay et al. |
| 2011/0085924 A1 | 4/2011 | Shampine et al. |
| 2011/0146244 A1 | 6/2011 | Farman et al. |
| 2011/0146246 A1 | 6/2011 | Farman et al. |
| 2011/0173991 A1 | 7/2011 | Dean |
| 2011/0197988 A1 | 8/2011 | Van Vliet et al. |
| 2011/0241888 A1 | 10/2011 | Lu et al. |
| 2011/0265443 A1 | 11/2011 | Ansari |
| 2011/0272158 A1 | 11/2011 | Neal |
| 2012/0000168 A1 | 1/2012 | Chaudhari et al. |
| 2012/0023973 A1 | 2/2012 | Mayorca |
| 2012/0048242 A1 | 3/2012 | Sumilla et al. |
| 2012/0085541 A1 | 4/2012 | Love et al. |
| 2012/0124961 A1 | 5/2012 | Jarrier et al. |
| 2012/0137699 A1 | 6/2012 | Montagne et al. |
| 2012/0179444 A1 | 7/2012 | Ganguly et al. |
| 2012/0192542 A1 | 8/2012 | Chillar et al. |
| 2012/0199001 A1 | 8/2012 | Chillar et al. |
| 2012/0204627 A1 | 8/2012 | Anderl et al. |
| 2012/0255734 A1 | 10/2012 | Coli et al. |
| 2012/0310509 A1 | 12/2012 | Pardo et al. |
| 2012/0324843 A1 | 12/2012 | Saraswathi et al. |
| 2012/0324903 A1 | 12/2012 | Dewis et al. |

(56) References Cited

U.S. PATENT DOCUMENTS

| | | |
|---|---|---|
| 2013/0068307 A1 | 3/2013 | Hains et al. |
| 2013/0087045 A1 | 4/2013 | Sullivan et al. |
| 2013/0087945 A1 | 4/2013 | Kusters et al. |
| 2013/0134702 A1 | 5/2013 | Boraas et al. |
| 2013/0174764 A1 | 7/2013 | Warton et al. |
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette |
| 2013/0306322 A1 | 11/2013 | Sanborn |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0102301 A1 | 4/2014 | Marks et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251129 A1 | 9/2014 | Upadhyay et al. |
| 2014/0251143 A1 | 9/2014 | Hawkinson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2014/0360370 A1 | 12/2014 | Eyers et al. |
| 2015/0007720 A1 | 1/2015 | Vu et al. |
| 2015/0027730 A1 | 1/2015 | Hall et al. |
| 2015/0078924 A1 | 3/2015 | Zhang et al. |
| 2015/0082758 A1 | 3/2015 | Saraswathi et al. |
| 2015/0101344 A1 | 4/2015 | Jarrier et al. |
| 2015/0107199 A1 | 4/2015 | Smith et al. |
| 2015/0114229 A1 | 4/2015 | Rout et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Tund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0240720 A1 | 8/2015 | Brubber |
| 2015/0252661 A1 | 9/2015 | Glass |
| 2015/0275891 A1 | 10/2015 | Chong et al. |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0017861 A1 | 1/2016 | Sigurdsson |
| 2016/0032703 A1 | 2/2016 | Broussard et al. |
| 2016/0032836 A1 | 2/2016 | Hawkinson et al. |
| 2016/0059168 A1* | 3/2016 | Bataille ............... B65G 69/182 96/416 |
| 2016/0076447 A1 | 3/2016 | Merlo et al. |
| 2016/0096134 A1 | 4/2016 | Santini et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladron de Guevara |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole |
| 2017/0322086 A1 | 11/2017 | Luharuka |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038328 A1 | 2/2018 | Louven et al. |
| 2018/0041093 A1 | 2/2018 | Miranda |
| 2018/0045202 A1 | 2/2018 | Crom |
| 2018/0038216 A1 | 3/2018 | Zhang et al. |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |

(56) References Cited

U.S. PATENT DOCUMENTS

| | | |
|---|---|---|
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney |
| 2018/0229998 A1 | 8/2018 | Shock |
| 2018/0258746 A1 | 9/2018 | Broussard et al. |
| 2018/0266412 A1 | 9/2018 | Stokkevåg et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |
| 2018/0328157 A1 | 11/2018 | Bishop |
| 2018/0334893 A1 | 11/2018 | Oehring |
| 2018/0363435 A1 | 12/2018 | Coli et al. |
| 2018/0363436 A1 | 12/2018 | Coli et al. |
| 2018/0363437 A1 | 12/2018 | Coli et al. |
| 2018/0363438 A1 | 12/2018 | Coli et al. |
| 2019/0003272 A1 | 1/2019 | Morris et al. |
| 2019/0003329 A1 | 1/2019 | Morris et al. |
| 2019/0010793 A1 | 1/2019 | Hinderliter |
| 2019/0011051 A1 | 1/2019 | Yeung |
| 2019/0048993 A1 | 2/2019 | Akiyama et al. |
| 2019/0063263 A1 | 2/2019 | Davis et al. |
| 2019/0063326 A1 | 2/2019 | Davis |
| 2019/0063341 A1 | 2/2019 | Davis |
| 2019/0067991 A1 | 2/2019 | Davis et al. |
| 2019/0071992 A1 | 3/2019 | Feng |
| 2019/0072005 A1 | 3/2019 | Fisher et al. |
| 2019/0078471 A1 | 3/2019 | Braglia et al. |
| 2019/0088845 A1 | 3/2019 | Sugi et al. |
| 2019/0091619 A1 | 3/2019 | Huang |
| 2019/0106316 A1 | 4/2019 | Van Vliet et al. |
| 2019/0106970 A1 | 4/2019 | Oehring |
| 2019/0112908 A1 | 4/2019 | Coli et al. |
| 2019/0112910 A1 | 4/2019 | Oehring et al. |
| 2019/0119096 A1 | 4/2019 | Haile et al. |
| 2019/0120024 A1 | 4/2019 | Oehring et al. |
| 2019/0120031 A1 | 4/2019 | Gilje |
| 2019/0120134 A1 | 4/2019 | Goleczka et al. |
| 2019/0128247 A1 | 5/2019 | Douglas, III |
| 2019/0128288 A1 | 5/2019 | Konada et al. |
| 2019/0131607 A1 | 5/2019 | Gillette |
| 2019/0136677 A1 | 5/2019 | Shampine et al. |
| 2019/0153843 A1 | 5/2019 | Headrick |
| 2019/0153938 A1 | 5/2019 | Hammoud |
| 2019/0154020 A1 | 5/2019 | Glass |
| 2019/0155318 A1 | 5/2019 | Meunier |
| 2019/0264667 A1 | 5/2019 | Byrne |
| 2019/0178234 A1 | 6/2019 | Beisel |
| 2019/0178235 A1 | 6/2019 | Coskrey et al. |
| 2019/0185312 A1 | 6/2019 | Bush et al. |
| 2019/0203572 A1 | 7/2019 | Morris et al. |
| 2019/0204021 A1 | 7/2019 | Morris et al. |
| 2019/0211661 A1 | 7/2019 | Reckles et al. |
| 2019/0211814 A1 | 7/2019 | Weightman et al. |
| 2019/0217258 A1 | 7/2019 | Bishop |
| 2019/0226317 A1 | 7/2019 | Payne et al. |
| 2019/0245348 A1 | 8/2019 | Hinderliter et al. |
| 2019/0249652 A1 | 8/2019 | Stephenson et al. |
| 2019/0249754 A1 | 8/2019 | Oehring et al. |
| 2019/0257297 A1 | 8/2019 | Botting et al. |
| 2019/0277279 A1 | 9/2019 | Byrne et al. |
| 2019/0277295 A1 | 9/2019 | Clyburn et al. |
| 2019/0309585 A1 | 10/2019 | Miller et al. |
| 2019/0316447 A1 | 10/2019 | Oehring et al. |
| 2019/0316456 A1 | 10/2019 | Beisel et al. |
| 2019/0322390 A1 | 10/2019 | Merrit et al. |
| 2019/0323337 A1 | 10/2019 | Glass et al. |
| 2019/0330923 A1 | 10/2019 | Gable et al. |
| 2019/0331117 A1 | 10/2019 | Gable et al. |
| 2019/0337392 A1 | 11/2019 | Joshi et al. |
| 2019/0338762 A1 | 11/2019 | Curry et al. |
| 2019/0345920 A1 | 11/2019 | Surjaatmadja et al. |
| 2019/0353103 A1 | 11/2019 | Roberge |
| 2019/0353303 A1 | 11/2019 | Morris et al. |
| 2019/0356199 A1 | 11/2019 | Morris et al. |
| 2019/0376449 A1 | 12/2019 | Carrell |
| 2019/0383123 A1 | 12/2019 | Hinderliter |
| 2020/0003205 A1 | 1/2020 | Stokkevåg et al. |
| 2020/0011165 A1 | 1/2020 | George et al. |
| 2020/0040705 A1 | 2/2020 | Morris et al. |
| 2020/0040878 A1 | 2/2020 | Morris |
| 2020/0049136 A1 | 2/2020 | Stephenson |
| 2020/0049153 A1 | 2/2020 | Headrick et al. |
| 2020/0071998 A1 | 3/2020 | Oehring et al. |
| 2020/0072201 A1 | 3/2020 | Marica |
| 2020/0088202 A1 | 3/2020 | Sigmar et al. |
| 2020/0095854 A1 | 3/2020 | Hinderliter |
| 2020/0109610 A1 | 4/2020 | Husoy et al. |
| 2020/0109616 A1 | 4/2020 | Oehring et al. |
| 2020/0132058 A1 | 4/2020 | Mollatt |
| 2020/0141219 A1 | 5/2020 | Oehring et al. |
| 2020/0141326 A1 | 5/2020 | Redford et al. |
| 2020/0141907 A1 | 5/2020 | Meck et al. |
| 2020/0166026 A1 | 5/2020 | Marica |
| 2020/0206704 A1 | 7/2020 | Chong |
| 2020/0208733 A1 | 7/2020 | Kim |
| 2020/0223648 A1 | 7/2020 | Herman et al. |
| 2020/0224645 A1 | 7/2020 | Buckley |
| 2020/0232454 A1 | 7/2020 | Chretien et al. |
| 2020/0256333 A1 | 8/2020 | Surjaatmadja |
| 2020/0263498 A1 | 8/2020 | Fischer et al. |
| 2020/0263525 A1 | 8/2020 | Reid |
| 2020/0263526 A1 | 8/2020 | Fischer et al. |
| 2020/0263527 A1 | 8/2020 | Fischer et al. |
| 2020/0263528 A1 | 8/2020 | Fischer et al. |
| 2020/0267888 A1 | 8/2020 | Putz |
| 2020/0291731 A1 | 9/2020 | Haiderer et al. |
| 2020/0295574 A1 | 9/2020 | Batsch-Smith |
| 2020/0300050 A1 | 9/2020 | Oehring et al. |
| 2020/0309027 A1 | 10/2020 | Rytkonen |
| 2020/0309113 A1 | 10/2020 | Hunter et al. |
| 2020/0325752 A1 | 10/2020 | Clark et al. |
| 2020/0325760 A1 | 10/2020 | Markham |
| 2020/0325761 A1 | 10/2020 | Williams |
| 2020/0325791 A1 | 10/2020 | Himmelmann |
| 2020/0325893 A1 | 10/2020 | Kraige et al. |
| 2020/0332784 A1 | 10/2020 | Zhang et al. |
| 2020/0332788 A1 | 10/2020 | Cui et al. |
| 2020/0340313 A1 | 10/2020 | Fischer et al. |
| 2020/0340340 A1 | 10/2020 | Oehring et al. |
| 2020/0340344 A1 | 10/2020 | Reckels et al. |
| 2020/0340404 A1 | 10/2020 | Stockstill |
| 2020/0347725 A1 | 11/2020 | Morris et al. |
| 2020/0354928 A1 | 11/2020 | Wehler et al. |
| 2020/0355055 A1 | 11/2020 | Dusterhoft et al. |
| 2020/0362760 A1 | 11/2020 | Morenko et al. |
| 2020/0362764 A1 | 11/2020 | Saintignan et al. |
| 2020/0370394 A1 | 11/2020 | Cai et al. |
| 2020/0370408 A1 | 11/2020 | Cai et al. |
| 2020/0370429 A1 | 11/2020 | Cai et al. |
| 2020/0371490 A1 | 11/2020 | Cai et al. |
| 2020/0340322 A1 | 12/2020 | Sizemore et al. |
| 2020/0386169 A1 | 12/2020 | Hinderliter et al. |
| 2020/0386222 A1 | 12/2020 | Pham et al. |
| 2020/0388140 A1 | 12/2020 | Gomez et al. |
| 2020/0392826 A1 | 12/2020 | Cui et al. |
| 2020/0392827 A1 | 12/2020 | George et al. |
| 2020/0393088 A1 | 12/2020 | Sizemore et al. |
| 2020/0398238 A1 | 12/2020 | Zhong et al. |
| 2020/0400000 A1 | 12/2020 | Ghasripoor et al. |
| 2020/0400005 A1 | 12/2020 | Han et al. |
| 2020/0407625 A1 | 12/2020 | Stephenson |
| 2020/0408071 A1 | 12/2020 | Li et al. |
| 2020/0408144 A1 | 12/2020 | Feng et al. |
| 2020/0408147 A1 | 12/2020 | Zhang et al. |
| 2020/0408149 A1 | 12/2020 | Li et al. |

(56) References Cited

U.S. PATENT DOCUMENTS

| | | |
|---|---|---|
| 2021/0025324 A1 | 1/2021 | Morris et al. |
| 2021/0025383 A1 | 1/2021 | Bodishbaugh et al. |
| 2021/0032961 A1 | 2/2021 | Hinderliter et al. |
| 2021/0054727 A1 | 2/2021 | Floyd |
| 2021/0071503 A1 | 3/2021 | Ogg et al. |
| 2021/0071574 A1 | 3/2021 | Feng et al. |
| 2021/0071579 A1 | 3/2021 | Li et al. |
| 2021/0071654 A1 | 3/2021 | Brunson |
| 2021/0071752 A1 | 3/2021 | Cui et al. |
| 2021/0079758 A1 | 3/2021 | Yeung et al. |
| 2021/0079851 A1 | 3/2021 | Yeung et al. |
| 2021/0086851 A1 | 3/2021 | Zhang et al. |
| 2021/0087883 A1 | 3/2021 | Zhang et al. |
| 2021/0087916 A1 | 3/2021 | Zhang et al. |
| 2021/0087925 A1 | 3/2021 | Heidari et al. |
| 2021/0087943 A1 | 3/2021 | Cui et al. |
| 2021/0088042 A1 | 3/2021 | Zhang et al. |
| 2021/0123425 A1 | 4/2021 | Cui et al. |
| 2021/0123434 A1 | 4/2021 | Cui et al. |
| 2021/0123435 A1 | 4/2021 | Cui et al. |
| 2021/0131409 A1 | 5/2021 | Cui et al. |
| 2021/0140416 A1 | 5/2021 | Buckley |
| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0231119 A1 | 7/2021 | Boguski et al. |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0301815 A1 | 9/2021 | Chretien et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1 | 3/2022 | Zhang et al. |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0127944 A1 | 4/2022 | Chapman et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |

(56) References Cited

U.S. PATENT DOCUMENTS

| | | | |
|---|---|---|---|
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |
| 2023/0182063 A1 | 6/2023 | Lennhager et al. |

FOREIGN PATENT DOCUMENTS

| | | | | |
|---|---|---|---|---|
| CA | 2043184 | | 8/1994 | |
| CA | 2829762 | | 9/2012 | |
| CA | 2737321 | | 9/2013 | |
| CA | 2876687 | A1 | 5/2014 | |
| CA | 2693567 | | 9/2014 | |
| CA | 2964597 | | 10/2017 | |
| CA | 2876687 | C | 4/2019 | |
| CA | 3138533 | | 11/2020 | |
| CA | 2919175 | | 3/2021 | |
| CN | 2622404 | | 6/2004 | |
| CN | 2779054 | | 5/2006 | |
| CN | 2890325 | | 4/2007 | |
| CN | 200964929 | Y | 10/2007 | |
| CN | 101323151 | A | 12/2008 | |
| CN | 201190660 | Y | 2/2009 | |
| CN | 201190892 | Y | 2/2009 | |
| CN | 201190893 | Y | 2/2009 | |
| CN | 101414171 | A | 4/2009 | |
| CN | 201215073 | Y | 4/2009 | |
| CN | 201236650 | Y | 5/2009 | |
| CN | 201275542 | Y | 7/2009 | |
| CN | 201275801 | Y | 7/2009 | |
| CN | 201333385 | Y | 10/2009 | |
| CN | 201443300 | U | 4/2010 | |
| CN | 201496415 | U | 6/2010 | |
| CN | 201501365 | U | 6/2010 | |
| CN | 201507271 | U | 6/2010 | |
| CN | 101323151 | B | 7/2010 | |
| CN | 201560210 | U | 8/2010 | |
| CN | 201581862 | U | 9/2010 | |
| CN | 201610728 | U | 10/2010 | |
| CN | 201610751 | U | 10/2010 | |
| CN | 201618530 | U | 11/2010 | |
| CN | 201661255 | U | 12/2010 | |
| CN | 101949382 | | 1/2011 | |
| CN | 201756927 | U | 3/2011 | |
| CN | 101414171 | B | 5/2011 | |
| CN | 102128011 | A | 7/2011 | |
| CN | 102140898 | A | 8/2011 | |
| CN | 102155172 | A | 8/2011 | |
| CN | 102182904 | | 9/2011 | |
| CN | 202000930 | U | 10/2011 | |
| CN | 202055781 | U | 11/2011 | |
| CN | 202082265 | U | 12/2011 | |
| CN | 202100216 | U | 1/2012 | |
| CN | 202100217 | U | 1/2012 | |
| CN | 202100815 | U | 1/2012 | |
| CN | 202124340 | U | 1/2012 | |
| CN | 202140051 | U | 2/2012 | |
| CN | 202140080 | U | 2/2012 | |
| CN | 202144789 | U | 2/2012 | |
| CN | 202144943 | U | 2/2012 | |
| CN | 202149354 | U | 2/2012 | |
| CN | 102383748 | A | 3/2012 | |
| CN | 202156297 | U | 3/2012 | |
| CN | 202158355 | U | 3/2012 | |
| CN | 202163504 | U | 3/2012 | |
| CN | 202165236 | U | 3/2012 | |
| CN | 202180866 | U | 4/2012 | |
| CN | 202181875 | U | 4/2012 | |
| CN | 202187744 | U | 4/2012 | |
| CN | 202191854 | U | 4/2012 | |
| CN | 202250008 | U | 5/2012 | |
| CN | 101885307 | | 7/2012 | |
| CN | 102562020 | A | 7/2012 | |
| CN | 202326156 | U | 7/2012 | |
| CN | 202370773 | U | 8/2012 | |
| CN | 202417397 | U | 9/2012 | |
| CN | 202417461 | U | 9/2012 | |
| CN | 102729335 | A | 10/2012 | |
| CN | 202463955 | U | 10/2012 | |
| CN | 202463957 | U | 10/2012 | |
| CN | 202467739 | U | 10/2012 | |
| CN | 202467801 | U | 10/2012 | |
| CN | 202531016 | U | 11/2012 | |
| CN | 202544794 | U | 11/2012 | |
| CN | 102825039 | A | 12/2012 | |
| CN | 202578592 | U | 12/2012 | |
| CN | 202579164 | U | 12/2012 | |
| CN | 202594808 | U | 12/2012 | |
| CN | 202594928 | U | 12/2012 | |
| CN | 202596615 | U | 12/2012 | |
| CN | 202596616 | U | 12/2012 | |
| CN | 102849880 | A | 1/2013 | |
| CN | 102889191 | A | 1/2013 | |
| CN | 202641535 | U | 1/2013 | |
| CN | 202645475 | U | 1/2013 | |
| CN | 202666716 | U | 1/2013 | |
| CN | 202669645 | U | 1/2013 | |
| CN | 202669944 | U | 1/2013 | |
| CN | 202671336 | U | 1/2013 | |
| CN | 202673269 | U | 1/2013 | |
| CN | 202751982 | U | 2/2013 | |
| CN | 102963629 | A | 3/2013 | |
| CN | 202767964 | U | 3/2013 | |
| CN | 202789791 | U | 3/2013 | |
| CN | 202789792 | U | 3/2013 | |
| CN | 202810717 | U | 3/2013 | |
| CN | 202827276 | U | 3/2013 | |
| CN | 202833093 | U | 3/2013 | |
| CN | 202833370 | U | 3/2013 | |
| CN | 102140898 | B | 4/2013 | |
| CN | 202895467 | U | 4/2013 | |
| CN | 202926404 | U | 5/2013 | |
| CN | 202935216 | U | 5/2013 | |
| CN | 202935798 | U | 5/2013 | |
| CN | 202935816 | U | 5/2013 | |
| CN | 202970631 | U | 6/2013 | |
| CN | 103223315 | A | 7/2013 | |
| CN | 203050598 | U | 7/2013 | |
| CN | 103233714 | A | 8/2013 | |
| CN | 103233715 | A | 8/2013 | |
| CN | 103245523 | A | 8/2013 | |
| CN | 103247220 | A | 8/2013 | |
| CN | 103253839 | A | 8/2013 | |
| CN | 103277290 | A | 9/2013 | |
| CN | 103321782 | A | 9/2013 | |
| CN | 203170270 | U | 9/2013 | |
| CN | 203172509 | U | 9/2013 | |
| CN | 203175778 | U | 9/2013 | |
| CN | 203175787 | U | 9/2013 | |
| CN | 102849880 | B | 10/2013 | |
| CN | 203241231 | U | 10/2013 | |
| CN | 203244941 | U | 10/2013 | |
| CN | 203244942 | U | 10/2013 | |
| CN | 203303798 | U | 11/2013 | |
| CN | 102155172 | B | 12/2013 | |
| CN | 102729335 | B | 12/2013 | |
| CN | 103420532 | A | 12/2013 | |
| CN | 203321792 | U | 12/2013 | |
| CN | 203412658 | | 1/2014 | |
| CN | 203420697 | U | 2/2014 | |
| CN | 203480755 | U | 3/2014 | |
| CN | 103711437 | A | 4/2014 | |
| CN | 103764252 | A * | 4/2014 | ............ B01D 45/04 |
| CN | 203531815 | U | 4/2014 | |
| CN | 203531871 | U | 4/2014 | |
| CN | 203531883 | U | 4/2014 | |
| CN | 203556164 | U | 4/2014 | |
| CN | 203558809 | U | 4/2014 | |
| CN | 203559861 | U | 4/2014 | |
| CN | 203559893 | U | 4/2014 | |

(56) References Cited

FOREIGN PATENT DOCUMENTS

| | | |
|---|---|---|
| CN | 203560189 U | 4/2014 |
| CN | 102704870 B | 5/2014 |
| CN | 203611843 U | 5/2014 |
| CN | 203612531 U | 5/2014 |
| CN | 203612843 U | 5/2014 |
| CN | 203614062 U | 5/2014 |
| CN | 203614388 U | 5/2014 |
| CN | 203621045 U | 6/2014 |
| CN | 203621046 U | 6/2014 |
| CN | 203621051 U | 6/2014 |
| CN | 203640993 U | 6/2014 |
| CN | 203655221 U | 6/2014 |
| CN | 103899280 A | 7/2014 |
| CN | 103923670 A | 7/2014 |
| CN | 203685052 U | 7/2014 |
| CN | 203716936 U | 7/2014 |
| CN | 103990410 A | 8/2014 |
| CN | 103993869 A | 8/2014 |
| CN | 203754009 U | 8/2014 |
| CN | 203754025 U | 8/2014 |
| CN | 203754341 U | 8/2014 |
| CN | 203756614 U | 8/2014 |
| CN | 203770264 U | 8/2014 |
| CN | 203784519 U | 8/2014 |
| CN | 203784520 U | 8/2014 |
| CN | 104057864 A | 9/2014 |
| CN | 203819819 U | 9/2014 |
| CN | 203823431 U | 9/2014 |
| CN | 203835337 U | 9/2014 |
| CN | 104074500 A | 10/2014 |
| CN | 203876633 U | 10/2014 |
| CN | 203876636 U | 10/2014 |
| CN | 203877364 U | 10/2014 |
| CN | 203877365 U | 10/2014 |
| CN | 203877375 U | 10/2014 |
| CN | 203877424 U | 10/2014 |
| CN | 203879476 U | 10/2014 |
| CN | 203879479 U | 10/2014 |
| CN | 203890292 U | 10/2014 |
| CN | 203899476 U | 10/2014 |
| CN | 203906206 U | 10/2014 |
| CN | 104150728 A | 11/2014 |
| CN | 104176522 A | 12/2014 |
| CN | 104196464 A | 12/2014 |
| CN | 104234651 A | 12/2014 |
| CN | 203971841 U | 12/2014 |
| CN | 203975450 U | 12/2014 |
| CN | 204020788 U | 12/2014 |
| CN | 204021980 U | 12/2014 |
| CN | 204024625 U | 12/2014 |
| CN | 204051401 U | 12/2014 |
| CN | 204060661 U | 12/2014 |
| CN | 104260672 A | 1/2015 |
| CN | 104314512 A | 1/2015 |
| CN | 204077478 U | 1/2015 |
| CN | 204077526 U | 1/2015 |
| CN | 204078307 U | 1/2015 |
| CN | 204083051 U | 1/2015 |
| CN | 204113168 U | 1/2015 |
| CN | 104340682 A | 2/2015 |
| CN | 104358536 A | 2/2015 |
| CN | 104369687 A | 2/2015 |
| CN | 104402178 A | 3/2015 |
| CN | 104402185 A | 3/2015 |
| CN | 104402186 A | 3/2015 |
| CN | 204209819 U | 3/2015 |
| CN | 204224560 U | 3/2015 |
| CN | 204225813 U | 3/2015 |
| CN | 204225839 U | 3/2015 |
| CN | 104533392 A | 4/2015 |
| CN | 104563938 A | 4/2015 |
| CN | 104563994 A | 4/2015 |
| CN | 104563995 A | 4/2015 |
| CN | 104563998 A | 4/2015 |
| CN | 104564033 A | 4/2015 |
| CN | 204257122 U | 4/2015 |
| CN | 204283610 U | 4/2015 |
| CN | 204283782 U | 4/2015 |
| CN | 204297682 U | 4/2015 |
| CN | 204299810 U | 4/2015 |
| CN | 103223315 B | 5/2015 |
| CN | 104594857 A | 5/2015 |
| CN | 104595493 A | 5/2015 |
| CN | 104612647 A | 5/2015 |
| CN | 104612928 A | 5/2015 |
| CN | 104632126 A | 5/2015 |
| CN | 204325094 U | 5/2015 |
| CN | 204325098 U | 5/2015 |
| CN | 204326983 U | 5/2015 |
| CN | 204326985 U | 5/2015 |
| CN | 204344040 U | 5/2015 |
| CN | 204344095 U | 5/2015 |
| CN | 104727797 A | 6/2015 |
| CN | 204402414 U | 6/2015 |
| CN | 204402423 U | 6/2015 |
| CN | 204402450 U | 6/2015 |
| CN | 103247220 B | 7/2015 |
| CN | 104803568 A | 7/2015 |
| CN | 204436360 U | 7/2015 |
| CN | 204457524 U | 7/2015 |
| CN | 204472485 U | 7/2015 |
| CN | 204473625 U | 7/2015 |
| CN | 204477303 U | 7/2015 |
| CN | 204493095 U | 7/2015 |
| CN | 204493309 U | 7/2015 |
| CN | 103253839 B | 8/2015 |
| CN | 104820372 A | 8/2015 |
| CN | 104832093 A | 8/2015 |
| CN | 104863523 A | 8/2015 |
| CN | 204552723 U | 8/2015 |
| CN | 204553866 U | 8/2015 |
| CN | 204571831 U | 8/2015 |
| CN | 204703814 U | 10/2015 |
| CN | 204703833 U | 10/2015 |
| CN | 204703834 U | 10/2015 |
| CN | 105092401 A | 11/2015 |
| CN | 103233715 B | 12/2015 |
| CN | 103790927 | 12/2015 |
| CN | 105207097 | 12/2015 |
| CN | 204831952 U | 12/2015 |
| CN | 204899777 U | 12/2015 |
| CN | 102602323 | 1/2016 |
| CN | 105240064 A | 1/2016 |
| CN | 204944834 | 1/2016 |
| CN | 205042127 U | 2/2016 |
| CN | 205172478 U | 4/2016 |
| CN | 103993869 B | 5/2016 |
| CN | 105536299 A | 5/2016 |
| CN | 105545207 A | 5/2016 |
| CN | 205260249 | 5/2016 |
| CN | 103233714 B | 6/2016 |
| CN | 104340682 B | 6/2016 |
| CN | 205297518 U | 6/2016 |
| CN | 205298447 U | 6/2016 |
| CN | 205391821 U | 7/2016 |
| CN | 205400701 U | 7/2016 |
| CN | 103277290 B | 8/2016 |
| CN | 104260672 B | 8/2016 |
| CN | 205477370 U | 8/2016 |
| CN | 205479153 U | 8/2016 |
| CN | 205503058 U | 8/2016 |
| CN | 205503068 U | 8/2016 |
| CN | 205503089 U | 8/2016 |
| CN | 105958098 A | 9/2016 |
| CN | 205599180 | 9/2016 |
| CN | 205599180 U | 9/2016 |
| CN | 106121577 A | 11/2016 |
| CN | 205709587 | 11/2016 |
| CN | 104612928 B | 12/2016 |
| CN | 106246120 A | 12/2016 |
| CN | 205805471 | 12/2016 |
| CN | 106321045 A | 1/2017 |
| CN | 205858306 | 1/2017 |
| CN | 106438310 A | 2/2017 |

(56) References Cited

FOREIGN PATENT DOCUMENTS

| | | |
|---|---|---|
| CN | 205937833 | 2/2017 |
| CN | 104563994 B | 3/2017 |
| CN | 206129196 | 4/2017 |
| CN | 104369687 B | 5/2017 |
| CN | 106715165 | 5/2017 |
| CN | 106761561 A | 5/2017 |
| CN | 105240064 B | 6/2017 |
| CN | 206237147 | 6/2017 |
| CN | 206287832 | 6/2017 |
| CN | 206346711 | 7/2017 |
| CN | 104563995 B | 9/2017 |
| CN | 107120822 | 9/2017 |
| CN | 107143298 A | 9/2017 |
| CN | 107159046 A | 9/2017 |
| CN | 107188018 A | 9/2017 |
| CN | 206496016 | 9/2017 |
| CN | 104564033 B | 10/2017 |
| CN | 107234358 A | 10/2017 |
| CN | 107261975 A | 10/2017 |
| CN | 206581929 | 10/2017 |
| CN | 104820372 B | 12/2017 |
| CN | 105092401 B | 12/2017 |
| CN | 107476769 A | 12/2017 |
| CN | 107520526 A | 12/2017 |
| CN | 206754664 | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 | 2/2018 |
| CN | 207017968 | 2/2018 |
| CN | 107859053 A | 3/2018 |
| CN | 207057867 | 3/2018 |
| CN | 207085817 | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 | 4/2018 |
| CN | 207169595 | 4/2018 |
| CN | 207194873 | 4/2018 |
| CN | 207245674 | 4/2018 |
| CN | 108034466 A | 5/2018 |
| CN | 108036071 A | 5/2018 |
| CN | 108087050 A | 5/2018 |
| CN | 207380566 | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 | 7/2018 |
| CN | 207634064 | 7/2018 |
| CN | 207648054 | 7/2018 |
| CN | 207650621 | 7/2018 |
| CN | 108371894 A | 8/2018 |
| CN | 207777153 | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 | 9/2018 |
| CN | 207814698 | 9/2018 |
| CN | 207862275 | 9/2018 |
| CN | 108687954 A | 10/2018 |
| CN | 207935270 | 10/2018 |
| CN | 207961582 | 10/2018 |
| CN | 207964530 | 10/2018 |
| CN | 108789848 A | 11/2018 |
| CN | 108799473 | 11/2018 |
| CN | 108868675 A | 11/2018 |
| CN | 208086829 | 11/2018 |
| CN | 208089263 | 11/2018 |
| CN | 208169068 | 11/2018 |
| CN | 108979569 A | 12/2018 |
| CN | 109027662 A | 12/2018 |
| CN | 109058092 A | 12/2018 |
| CN | 208179454 | 12/2018 |
| CN | 208179502 | 12/2018 |
| CN | 208253147 | 12/2018 |
| CN | 208260574 | 12/2018 |
| CN | 109114418 A | 1/2019 |
| CN | 109141990 A | 1/2019 |
| CN | 208313120 | 1/2019 |
| CN | 208330319 | 1/2019 |
| CN | 208342730 | 1/2019 |
| CN | 208430982 | 1/2019 |
| CN | 208430986 | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 | 3/2019 |
| CN | 208564516 | 3/2019 |
| CN | 208564525 | 3/2019 |
| CN | 208564918 | 3/2019 |
| CN | 208576026 | 3/2019 |
| CN | 208576042 | 3/2019 |
| CN | 208650818 | 3/2019 |
| CN | 208669244 | 3/2019 |
| CN | 109555484 A | 4/2019 |
| CN | 109682881 A | 4/2019 |
| CN | 208730959 | 4/2019 |
| CN | 208735264 | 4/2019 |
| CN | 208746733 | 4/2019 |
| CN | 208749529 | 4/2019 |
| CN | 208750405 | 4/2019 |
| CN | 208764658 | 4/2019 |
| CN | 109736740 A | 5/2019 |
| CN | 109751007 A | 5/2019 |
| CN | 208868428 | 5/2019 |
| CN | 208870761 | 5/2019 |
| CN | 109869294 A | 6/2019 |
| CN | 109882144 A | 6/2019 |
| CN | 109882372 A | 6/2019 |
| CN | 209012047 | 6/2019 |
| CN | 209100025 | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 | 9/2019 |
| CN | 110374745 A | 10/2019 |
| CN | 209534736 | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |

(56) References Cited

FOREIGN PATENT DOCUMENTS

| | | |
|---|---|---|
| CN | 110513097 A | 11/2019 |
| CN | 209650738 | 11/2019 |
| CN | 209653968 | 11/2019 |
| CN | 209654004 | 11/2019 |
| CN | 209654022 | 11/2019 |
| CN | 209654128 | 11/2019 |
| CN | 209656622 | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 | 12/2019 |
| CN | 209780827 | 12/2019 |
| CN | 209798631 | 12/2019 |
| CN | 209799942 | 12/2019 |
| CN | 209800178 | 12/2019 |
| CN | 209855723 | 12/2019 |
| CN | 209855742 | 12/2019 |
| CN | 209875063 | 12/2019 |
| CN | 110656919 A | 1/2020 |
| CN | 107520526 B | 2/2020 |
| CN | 110787667 A | 2/2020 |
| CN | 110821464 A | 2/2020 |
| CN | 110833665 A | 2/2020 |
| CN | 110848028 A | 2/2020 |
| CN | 210049880 | 2/2020 |
| CN | 210049882 | 2/2020 |
| CN | 210097596 | 2/2020 |
| CN | 210105817 | 2/2020 |
| CN | 210105818 | 2/2020 |
| CN | 210105993 | 2/2020 |
| CN | 110873093 A | 3/2020 |
| CN | 210139911 | 3/2020 |
| CN | 110947681 A | 4/2020 |
| CN | 111058810 A | 4/2020 |
| CN | 111075391 A | 4/2020 |
| CN | 210289931 | 4/2020 |
| CN | 210289932 | 4/2020 |
| CN | 210289933 | 4/2020 |
| CN | 210303516 | 4/2020 |
| CN | 211412945 | 4/2020 |
| CN | 111089003 A | 5/2020 |
| CN | 111151186 A | 5/2020 |
| CN | 111167769 A | 5/2020 |
| CN | 111169833 A | 5/2020 |
| CN | 111173476 A | 5/2020 |
| CN | 111185460 A | 5/2020 |
| CN | 111185461 A | 5/2020 |
| CN | 111188763 A | 5/2020 |
| CN | 111206901 A | 5/2020 |
| CN | 111206992 A | 5/2020 |
| CN | 111206994 A | 5/2020 |
| CN | 210449044 | 5/2020 |
| CN | 210460875 | 5/2020 |
| CN | 210522432 | 5/2020 |
| CN | 210598943 | 5/2020 |
| CN | 210598945 | 5/2020 |
| CN | 210598946 | 5/2020 |
| CN | 210599194 | 5/2020 |
| CN | 210599303 | 5/2020 |
| CN | 210600110 | 5/2020 |
| CN | 111219326 A | 6/2020 |
| CN | 111350595 A | 6/2020 |
| CN | 210660319 | 6/2020 |
| CN | 210714569 | 6/2020 |
| CN | 210769168 | 6/2020 |
| CN | 210769169 | 6/2020 |
| CN | 210769170 | 6/2020 |
| CN | 210770133 | 6/2020 |
| CN | 210825844 | 6/2020 |
| CN | 210888904 | 6/2020 |
| CN | 210888905 | 6/2020 |
| CN | 210889242 | 6/2020 |
| CN | 111397474 A | 7/2020 |
| CN | 111412064 A | 7/2020 |
| CN | 111441923 A | 7/2020 |
| CN | 111441925 A | 7/2020 |
| CN | 111503517 A | 8/2020 |
| CN | 111515898 A | 8/2020 |
| CN | 111594059 A | 8/2020 |
| CN | 111594062 A | 8/2020 |
| CN | 111594144 A | 8/2020 |
| CN | 211201919 | 8/2020 |
| CN | 211201920 | 8/2020 |
| CN | 211202218 | 8/2020 |
| CN | 111608965 A | 9/2020 |
| CN | 111664087 A | 9/2020 |
| CN | 111677476 A | 9/2020 |
| CN | 111677647 A | 9/2020 |
| CN | 111692064 A | 9/2020 |
| CN | 111692065 A | 9/2020 |
| CN | 211384571 | 9/2020 |
| CN | 211397553 | 9/2020 |
| CN | 211397677 | 9/2020 |
| CN | 211500955 | 9/2020 |
| CN | 211524765 | 9/2020 |
| DE | 4004854 | 8/1991 |
| DE | 4241614 | 6/1994 |
| DE | 102009022859 | 12/2010 |
| DE | 102012018825 | 3/2014 |
| DE | 102013111655 | 12/2014 |
| DE | 102015103872 | 10/2015 |
| DE | 102013114335 | 12/2020 |
| EP | 0835983 | 4/1998 |
| EP | 1378683 | 1/2004 |
| EP | 2143916 | 1/2010 |
| EP | 2613023 | 7/2013 |
| EP | 3095989 | 11/2016 |
| EP | 3211766 | 8/2017 |
| EP | 3049642 | 4/2018 |
| EP | 3354866 | 8/2018 |
| EP | 3075946 | 5/2019 |
| FR | 2795774 | 6/1999 |
| GB | 474072 | 10/1937 |
| GB | 1438172 | 6/1976 |
| JP | 857135212 | 2/1984 |
| KR | 20020026398 | 4/2002 |
| KR | 20170134281 A * | 12/2017 ......... B01D 46/0065 |
| RU | 13562 | 4/2000 |
| WO | 1993020328 | 10/1993 |
| WO | 2006025886 | 3/2006 |
| WO | 2009023042 | 2/2009 |
| WO | 20110133821 | 10/2011 |
| WO | 2012139380 | 10/2012 |
| WO | 2013158822 | 10/2013 |
| WO | PCT/CN2012/074945 | 11/2013 |
| WO | 2013185399 | 12/2013 |
| WO | 2015158020 | 10/2015 |
| WO | 2016014476 | 1/2016 |
| WO | 2016033983 | 3/2016 |
| WO | 2016078181 | 5/2016 |
| WO | 2016101374 | 6/2016 |
| WO | 2016112590 | 7/2016 |
| WO | WO-2016130450 A1 * | 8/2016 ......... B01D 46/0002 |
| WO | 2016/186790 | 11/2016 |
| WO | 2017123656 A | 7/2017 |
| WO | 2017146279 | 8/2017 |
| WO | 2017213848 | 12/2017 |
| WO | 2018031029 | 2/2018 |
| WO | 2018038710 | 3/2018 |
| WO | 2018044293 | 3/2018 |
| WO | 2018044307 | 3/2018 |
| WO | 2018071738 | 4/2018 |
| WO | 2018101909 | 6/2018 |
| WO | 2018101912 | 6/2018 |
| WO | 2018106210 | 6/2018 |
| WO | 2018106225 | 6/2018 |
| WO | 2018106252 | 6/2018 |
| WO | 2018/132106 | 7/2018 |
| WO | 2018156131 | 8/2018 |
| WO | 2018075034 | 10/2018 |

(56) References Cited

FOREIGN PATENT DOCUMENTS

| | | |
|---|---|---|
| WO | 2018187346 | 10/2018 |
| WO | 2018031031 | 2/2019 |
| WO | 2019045691 | 3/2019 |
| WO | 2019046680 | 3/2019 |
| WO | 2019060922 | 3/2019 |
| WO | 2019117862 | 6/2019 |
| WO | 2019126742 | 6/2019 |
| WO | 2019147601 | 8/2019 |
| WO | 2019169366 | 9/2019 |
| WO | 2019195651 | 10/2019 |
| WO | 2019200510 | 10/2019 |
| WO | 2019210417 | 11/2019 |
| WO | 2020018068 | 1/2020 |
| WO | 2020046866 | 3/2020 |
| WO | 2020072076 | 4/2020 |
| WO | 2020076569 | 4/2020 |
| WO | 2020097060 | 5/2020 |
| WO | 2020104088 | 5/2020 |
| WO | 2020131085 | 6/2020 |
| WO | 2020211083 | 10/2020 |
| WO | 2020211086 | 10/2020 |
| WO | 2021/038604 | 3/2021 |
| WO | 2021041783 | 3/2021 |

OTHER PUBLICATIONS

Youtube: "Jereh Fracturing Equipment," Jereh Group, Jun. 8, 2015, 1 Page, Retrieved from URL: https://www.youtube.com/watch?v=m0vMiq84P4Q.
Final written decision of PGR2021-00102 dated Feb. 6, 2023.
Final written decision of PGR2021-00103 dated Feb. 6, 2023.
De Gevigney et al., "Analysis of no-load dependent power losses in a planetary gear train by using thermal network method", International Gear Conference 2014: Aug. 26-28, 2014, Lyon, pp. 615-624.
Special-Purpose Couplings for Petroleum, Chemical, and Gas Industry Services, API Standard 671 (4th Edition) (2010).
The Application of Flexible Couplings for Turbomachinery, Jon R.Mancuso et al., Proceedings of the Eighteenthturbomachinery Symposium (1989).
Pump Control With Variable Frequency Drives, Kevin Tory, Pumps & Systems: Advances in Motors and Drives, Reprint from Jun. 2008.
Fracture Design and Stimulation, Mike Eberhard, P.E., Wellconstruction & Operations Technical Workshop Insupport of the EPA Hydraulic Fracturing Study, Mar. 10-11, 2011.
General Purpose vs. Special Purpose Couplings, Jon Mancuso, Proceedings of the Twenty-Third Turbomachinerysymposium (1994).
Overview of Industry Guidance/Best Practices on Hydraulic Fracturing (HF), American Petroleum Institute, © 2012.
API Member Companies, American Petroleum Institute, WaybackMachine Capture, https://web.archive.org/web/20130424080625/http://api.org/globalitems/globalheaderpages/membership/api-member-companies, accessed Jan. 4, 2021.
API's Global Industry Services, American Petroleum Institute, © Aug. 2020.
About API, American Petroleum Institute, https://www.api.org /about, accessed Dec. 30, 2021.
About API, American Petroleum Institute, WaybackMachine Capture, https://web.archive.org/web/20110422104346 / http:/api.org/aboutapi/, captured Apr. 22, 2011.
Publications, American Petroleum Institute, WaybackMachine Capture, https://web.archive.org/web/20110427043936 / http://www.api.org:80/Publications/, captured Apr. 27, 2011.
Procedures for Standards Development, American Petroleum Institute, Third Edition (2006).
WorldCat Library Collections Database Records for API Standard 671 and API Standard 674, https://www.worldcat.org/title/positive-displacement-pumps-reciprocating/oclc/ 858692269&referer=brief_results, accessed Dec. 30, 2021; and https://www.worldcat.org/title/special-purpose-couplings-for-petroleum-chemical-and-gas-industry-services/oclc/871254217&referer-brief_results, accessed Dec. 22, 2021.
2011 Publications and Services, American Petroleum Institute (2011). Standards, American Petroleum Institute, WaybackMachine Capture, https://web.archive.org/web/20110207195046/http:/www.api.org/Standards/, captured Feb. 7, 2011; and https://web.archive.org/web/20110204112554/http://global.ihs.com/?RID=API1, captured Feb. 4, 2011.
IHS Markit Standards Store, https://global.ihs.com/doc_ detail.cfm?document_name=API%20STD%20674&item_s_key=00010672#doc-detail-history-anchor, accessed Dec. 30, 2021; and https://global.ihs.com/doc_detail.cfm?&input _doc_number=671&input_doc_title=&document_name=API%20STD%20671&item_s_key=00010669&item_key_date=890331&origin=DSSC, accessed Dec. 30, 2021.
Dziubak, Tadeusz, "Experimental Studies of Dust Suction Irregularity from Multi-Cyclone Dust Collector of Two-Stage Air Filter", Energies 2021, 14, 3577, 28 pages.
Rigmaster Machinery Ltd., Model: 2000 RMP-6-PLEX, brochure, downloaded at https://www.rigmastermachinery.com/_files/ugd/431e62_eaecd77c9fe54af8b13d08396072da67.pdf.
Europump and Hydrualic Institute, Variable Speed Pumping: A Guide to Successful Applications, Elsevier Ltd, 2004.
Capstone Turbine Corporation, Capstone Receives Three Megawatt Order from Large Independent Oil & Gas Company in Eagle Ford Shale Play, Dec. 7, 2010.
Wikipedia, Westinghouse Combustion Turbine Systems Division, https://en.wikipedia.org/wiki/Westinghouse_Combustion_Turbine_Systems_Division, circa 1960.
Wikipedia, Union Pacific GTELs, https://en.wikipedia.org/wiki/Union_Pacific_GTELs, circa 1950.
HCI Jet Frac, Screenshots from YouTube, Dec. 11, 2010. https://www.youtube.com/watch?v=6HjXkdbFaFQ.
AFD Petroleum Ltd., Automated Hot Zone, Frac Refueling System, Dec. 2018.
Eygun, Christiane, et al., URTeC: 2687987, Mitigating Shale Gas Developments Carbon Footprint: Evaluating and Implementing Solutions in Argentina, Copyright 2017, Unconventional Resources Technology Conference.
Walzel, Brian, Hart Energy, Oil, Gas Industry Discovers Innovative Solutions to Environmental Concerns, Dec. 10, 2018.
Frac Shack, Bi-Fuel FracFueller brochure, 2011.
Pettigrew, Dana, et al., High Pressure Multi-Stage Centrifugal Pump for 10,000 psi Frac Pump—HPHPS Frac Pump, Copyright 2013, Society of Petroleum Engineers, SPE 166191.
Elle Seybold, et al., Evolution of Dual Fuel Pressure Pumping for Fracturing: Methods, Economics, Field Trial Results and Improvements in Availability of Fuel, Copyright 2013, Society of Petroleum Engineers, SPE 166443.
Wallace, E.M., Associated Shale Gas: From Flares to Rig Power, Copyright 2015, Society of Petroleum Engineers, SPE-173491-MS.
Williams, C.W. (Gulf Oil Corp. Odessa Texas), The Use of Gas-turbine Engines in an Automated High-Pressure Water-Injection Stations; American Petroleum Institute; API-63-144 (Jan. 1, 1963).
Neal, J.C. (Gulf Oil Corp. Odessa Texas), Gas Turbine Driven Centrifugal Pumps for High Pressure Water Injection; American Institute of Mining, Metallurgical and Petroleum Engineers, Inc.; SPE-1888 (1967).
Porter, John A. (Solar Division International Harvester Co.), Modern Industrial Gas Turbines for the Oil Field; American Petroleum Institute; Drilling and Production Practice; API-67-243 (Jan. 1, 1967).
Cooper et al., Jet Frac Porta-Skid—A New Concept in Oil Field Service Pump Equipments[sic]; Halliburton Services; SPE-2706 (1969).
Ibragimov, É.S., Use of gas-turbine engines in oil field pumping units; Chem Petrol Eng; (1994) 30: 530. https://doi.org/10.1007/BF01154919. (Translated from Khimicheskaya i Neftyanoe Mashinostroenie, No. 11, pp. 24-26, Nov. 1994.).
Kas'yanov et al., Application of gas-turbine engines in pumping units complexes of hydraulic fracturing of oil and gas reservoirs; Exposition Oil & Gas; (Oct. 2012) (published in Russian).

(56) References Cited

OTHER PUBLICATIONS

American Petroleum Institute. API 674: Positive Displacement Pumps—Reciprocating. 3rd ed. Washington, DC: API Publishing Services, 2010.
American Petroleum Institute. API 616: Gas Turbines for the Petroleum, Chemical, and Gas Industry Services. 5th ed. Washington, DC: API Publishing Services, 2011.
Karassik, Igor, Joseph Messina, Paul Cooper, and Charles Heald. Pump Handbook. 4th ed. New York: McGraw-Hill Education, 2008.
Weir SPM. Weir SPM General Catalog: Well Service Pumps, Flow Control Products, Manifold Trailers, Safety Products, Post Sale Services. Ft. Worth, TX: Weir Oil & Gas. May 28, 2016. https://www.pumpfundamentals.com/pumpdatabase2/weir-spm-general.pdf.
The Weir Group, Inc. Weir SPM Pump Product Catalog. Ft. Worth, Tx: S.P.M. Flow Control, Inc. Oct. 30, 2017. https://manage.global.weir/assets/files/product%20brochures/SPM_2P140706_Pump_Product_Catalogue_View.pdf.
Shandong Saigao Group Corporation. Q4 (5W115) Quintuplex Plunger Pump. Jinan City, Shandong Province, China: Saigao. Oct. 20, 2014. https://www.saigaogroup.com/product/q400-5w115-quintuplex-plunger-pump.html.
Marine Turbine. Turbine Powered Frac Units. Franklin, Louisiana: Marine Turbine Technologies, 2020.
Rotating Right. Quintuplex Power Pump Model Q700. Edmonton, Alberta, Canada: Weatherford International Ltd. https://www.rotatingright.com/pdf/weatherford/RR%2026-Weatherford%20Model%20Q700.pdf, 2021.
CanDyne Pump Services, Inc. Weatherford Q700 Pump. Calgary, Alberta, Canada: CanDyne Pump Services. Aug. 15, 2015. http://candyne.com/wp-content/uploads/2014/10/181905-94921.q700-quintuplex-pump.pdf.
Arop, Julius Bankong. Geomechanical review of hydraulic fracturing technology. Thesis (M. Eng.). Cambridge, MA: Massachusetts Institute of Technology, Dept. of Civil and Environmental Engineering. Oct. 29, 2013. https://dspace.mit.edu/handle/1721.1/82176.
AFGlobal Corporation, Durastim Hydraulic Fracturing Pump, A Revolutionary Design for Continuous Duty Hydraulic Fracturing, 2018.
SPM® QEM 5000 E-Frac Pump Specification Sheet, Weir Group (2019) ("Weir 5000").
Green Field Energy Services Natural Gas Driven Turbine Frac Pumps HHP Summit Presentation, Yumpu (Sep. 2012), https://www.yumpu.com/en/document/read/49685291/turbine-frac-pump-assembly-hhp ("Green Field").
Jereh Debut's Super-power Turbine Fracturing Pump, Leading the Industrial Revolution, Jereh Oilfield Services Group (Mar. 19, 2014), https://www.prnewswire.com/news-releases/jereh-debuts-super-power-turbine-fracturing-pump-leading-the-industrial-revolution-250992111.html.
Jereh Apollo 4500 Turbine Frac Pumper Finishes Successful Field Operation in China, Jereh Group (Feb. 13, 2015), as available on Apr. 20, 2015, https://web.archive.org/web/20150420220625/https://www.prnewswire.com/news-releases/jereh-apollo-4500-turbine-frac-pumper-finishes-successful-field-operation-in-china-300035829.html.
35% Economy Increase, Dual-fuel System Highlighting Jereh Apollo Frac Pumper, Jereh Group (Apr. 13, 2015), https://www.jereh.com/en/news/press-release/news-detail-7345.htm.
Hydraulic Fracturing: Gas turbine proves successful in shale gas field operations, Vericor (2017), https://www.vericor.com/wp-content/uploads/2020/02/7.-Fracing-4500hp-Pump-China-En.pdf ("Vericor Case Study").
Jereh Apollo Turbine Fracturing Pumper Featured on China Central Television, Jereh Group (Mar. 9, 2018), https://www.jereh.com/en/news/press-release/news-detail-7267.htm.
Jereh Unveiled New Electric Fracturing Solution at OTC 2019, Jereh Group (May 7, 2019), as available on May 28, 2019, https://web.archive.org/web/20190528183906/https://www.prnewswire.com/news-releases/jereh-unveiled-new-electric-fracturing-solution-at-otc-2019-300845028.html.
Jereh Group, Jereh Fracturing Unit, Fracturing Spread, YouTube (Mar. 30, 2015), https://www.youtube.com/watch?v=PIkDbU5dE0o.
Transcript of Jereh Group, Jereh Fracturing Unit, Fracturing Spread, YouTube (Mar. 30, 2015).
Jereh Group, Jereh Fracturing Equipment. YouTube (Jun. 8, 2015), https://www.youtube.com/watch?v=m0vMiq84P4Q.
Transcript of Jereh Group, Jereh Fracturing Equipment, YouTube (Jun. 8, 2015), https://www.youtube.com/watch?v=m0vMiq84P4Q.
Ferdinand P. Beer et al., Mechanics of Materials (6th ed. 2012).
Weir Oil & Gas Introduces Industry's First Continuous Duty 5000-Horsepower Pump, Weir Group (Jul. 25, 2019), https://www.global.weir/newsroom/news-articles/weir-oil-and-gas-introduces-industrys-first-continuous-duty-5000-horsepower-pump/.
2012 High Horsepower Summit Agenda, Natural Gas for High Horsepower Applications (Sept. 5, 2012).
Review of HHP Summit 2012, Gladstein, Neandross & Associates https://www.gladstein.org/gna-conferences/high-horsepower-summit-2012/.
Green Field Energy Services Deploys Third New Hydraulic Fracturing System, Green Field Energy Services, Inc. (Jul. 11, 2012), https://www.prnewswire.com/news-releases/green-field-energy-services-deploys-third-new-hydraulic-fracturing-spread-162113425.
Karen Boman, Turbine Technology Powers Green Field Multi-Fuel Frack Pump, Rigzone (Mar. 7, 2015), as available on Mar. 14, 2015, https://web.archive.org/web/20150314203227/https://www.rigzone.com/news/oil-gas/a/124883/Turbine_Technology_Powers_Green_Field_MultiFuel_Frack_Pump.
"Turbine Frac Units," WMD Squared (2012), https://wmdsquared.com/work/gfes-turbine-frac-units/.
Leslie Turj, Green Field asset sale called 'largest disposition industry has seen,' The INDsider Media (Mar. 19, 2014), http://theind.com/article-16497-green-field-asset-sale-called-%E2%80%98largest-disposition-industry-has-seen%60.html.
"Honghua developing new-generation shale-drilling rig, plans testing of frac pump"; Katherine Scott; Drilling Contractor May 23, 2013; accessed at https://www.drillingcontractor.org/honghua-developing-new-generation-shale-drilling-rig-plans-testing-of-frac-pump-23278.
Researchgate, Answer by Byron Woolridge, found at https://www.researchgate.net/post/How_can_we_improve_the_efficiency_of_the_gas_turbine_cycles, Jan. 1, 2013.
Filipović, Ivan, Preliminary Selection of Basic Parameters of Different Torsional Vibration Dampers Intended for use in Medium-Speed Diesel Engines, Transactions of Famena XXXVI-3 (2012).
Marine Turbine Technologies, 1 MW Power Generation Package, http://marineturbine.com/power-generation, 2017.
Business Week: Fiber-optic cables help fracking, cablinginstall.com. Jul. 12, 2013. https://www.cablinginstall.com/cable/article/16474208/businessweek-fiberoptic-cables-help-fracking.
Fracking companies switch to electric motors to power pumps, iadd-intl.org. Jun. 27, 2019. https://www.iadd-intl.org/articles/fracking-companies-switch-to-electric-motors-to-power-pumps/.
The Leader in Frac Fueling, suncoastresources.com. Jun. 29, 2015. https://web.archive.org/web/20150629220609/https://www.suncoastresources.com/oilfield/fueling-services/.
Mobile Fuel Delivery, atlasoil.com. Mar. 6, 2019. https://www.atlasoil.com/nationwide-fueling/onsite-and-mobile-fueling.
Frac Tank Hose (FRAC), 4starhose.com. Accessed: Nov. 10, 2019. http://www.4starhose.com/product/frac_tank_hose_frac.aspx.
PLOS One, Dynamic Behavior of Reciprocating Plunger Pump Discharge Valve Based on Fluid Structure Interaction and Experimental Analysis. Oct. 21, 2015.
FMC Technologies, Operation and Maintenance Manual, L06 Through L16 Triplex Pumps Doc No. OMM50000903 Rev: E p. 1 of 66. Aug. 27, 2009.
Lekontsev, Yu M., et al. "Two-side sealer operation." Journal of Mining Science 49.5 (2013): 757-762.

(56) References Cited

OTHER PUBLICATIONS

FTS International's Dual Fuel Hydraulic Fracturing Equipment Increases Operational Efficiencies, Provides Cost Benefits, Jan. 3, 2018.
CNG Delivery, Fracturing with natural gas, dual-fuel drilling with CNG, Aug. 22, 2019.
PbNG, Natural Gas Fuel for Drilling and Hydraulic Fracturing, Diesel Displacement / Dual Fuel & Bi-Fuel, May 2014.
Integrated Flow, Skid-mounted Modular Process Systems, Jul. 15, 2017, https://ifsolutions.com/why-modular/.
Cameron, A Schlumberger Company, Frac Manifold Systems, 2016.
ZSi-Foster, Energy | Solar | Fracking | Oil and Gas, Aug. 2020, https://www.zsi-foster.com/energy-solar-fracking-oil-and-gas.html.
JBG Enterprises, Inc., WS-Series Blowout Prevention Safety Coupling— Quick Release Couplings, Sep. 11, 2015, http://www.jgbhose.com/products/WS-Series-Blowout-Prevention-Safety-Coupling.asp.
Halliburton, Vessel-based Modular Solution (VMS), 2015.
Chun, M. K., H. K. Song, and R. Lallemand. "Heavy duty gas turbines in petrochemical plants: Samsung's Daesan blant (Korea) beats fuel flexibility records with over 95% hydrogen in process gas." Proceedings of PowerGen Asia Conference, Singapore. 1999.
Wolf, Jürgen J., and Marko A. Perkavec. "Safety Aspects and Environmental Considerations for a 10 MW Cogeneration Heavy Duty Gas Turbine Burning Coke Oven Gas with 60% Hydrogen Content." ASME 1992 International Gas Turbine and Aeroengine Congress and Exposition. American Society of Mechanical Engineers Digital Collection, 1992.
Ginter, Timothy, and Thomas Bouvay. "Uprate options for the MS7001 heavy duty gas turbine." GE paper GER-3808C, GE Energy 12 (2006).
Chaichan, Miqdam Tariq. "The impact of equivalence ratio on performance and emissions of a hydrogen-diesel dual fuel engine with cooled exhaust gas recirculation." International Journal of Scientific & Engineering Research 6.6 (2015): 938-941.
Ecob, David J., et al. "Design and Development of a Landfill Gas Combustion System for the Typhoon Gas Turbine." ASME 1996 International Gas Turbine and Aeroengine Congress and Exhibition. American Society of Mechanical Engineers Digital Collection, 1996.
II-VI Marlow Industries, Thermoelectric Technologies in Oil, Gas, and Mining Industries, blog.marlow.com (Jul. 24, 2019).
B.M. Mahlalela, et al., .Electric Power Generation Potential Based on Waste Heat and Geothermal Resources in South Africa, pangea.stanford.edu (Feb. 11, 2019).
Department of Energy, United States of America, The Water-Energy Nexus: Challenges and Opportunities ourenergypolicy.org (Jun. 2014).
Ankit Tiwari, Design of a Cooling System for a Hydraulic Fracturing Equipment, The Pennsylvania State University, The Graduate School, College of Engineering, 2015.
Jp Yadav et al., Power Enhancement of Gas Turbine Plant by Intake Air Fog Cooling, Jun. 2015.
Mee Industries: Inlet Air Fogging Systems for Oil, Gas and Petrochemical Processing, Verdict Media Limited Copyright 2020.
M. Ahmadzadehtalatapeh et al.Performance enhancement of gas turbine units by retrofitting with inlet air cooling technologies (IACTs): an hour-by-hour simulation study, Journal of the Brazilian Society of Mechanical Sciences and Engineering, Mar. 2020.
Advances in Popular Torque-Link Solution Offer OEMs Greater Benefit, Jun. 21, 2018.
Emmanuel Akita et al., Mewbourne College of Earth & Energy, Society of Petroleum Engineers; Drilling Systems Automation Technical Section (DSATS); 2019.
PowerShelter Kit II, nooutage.com, Sep. 6, 2019.
EMPengineering.com, HEMP Resistant Electrical Generators / Hardened Structures HEMP/GMD Shielded Generators, Virginia, Nov. 3, 2012.
Blago Minovski, Coupled Simulations of Cooling and Engine Systems for Unsteady Analysis of the Benefits of Thermal Engine Encapsulation, Department of Applied Mechanics, Chalmers University of Technology Göteborg, Sweden 2015.
J. Porteiro et al., Feasibility of a new domestic CHP trigeneration with heat pump: II. Availability analysis. Design and development, Applied Thermal Engineering 24 (2004) 1421-1429.
ISM, What is Cracking Pressure, 2019.
Swagelok, The right valve for controlling flow direction? Check, 2016.
Technology.org, Check valves how do they work and what are the main type, 2018.
Dowell: "B908 Turbine Pumper," Operator's Manual, 9 Pages, 1980.
GD Energy Products: "GD 3000 Well Service Pump," GD Energy Products Frac Pumps, 2021, 2 Pages, [retrieved on Feb. 6, 2025] Retrieved from the Internet: https://gdenergyproducts.com/products/pumps/frac-pumps/gd-3000#info.
Hausfeld T., et al., "TM2500+ Power for Hydraulic Fracturing," Evolution Well Services, GE Imagination at Work, 2013, 20 Pages.

\* cited by examiner

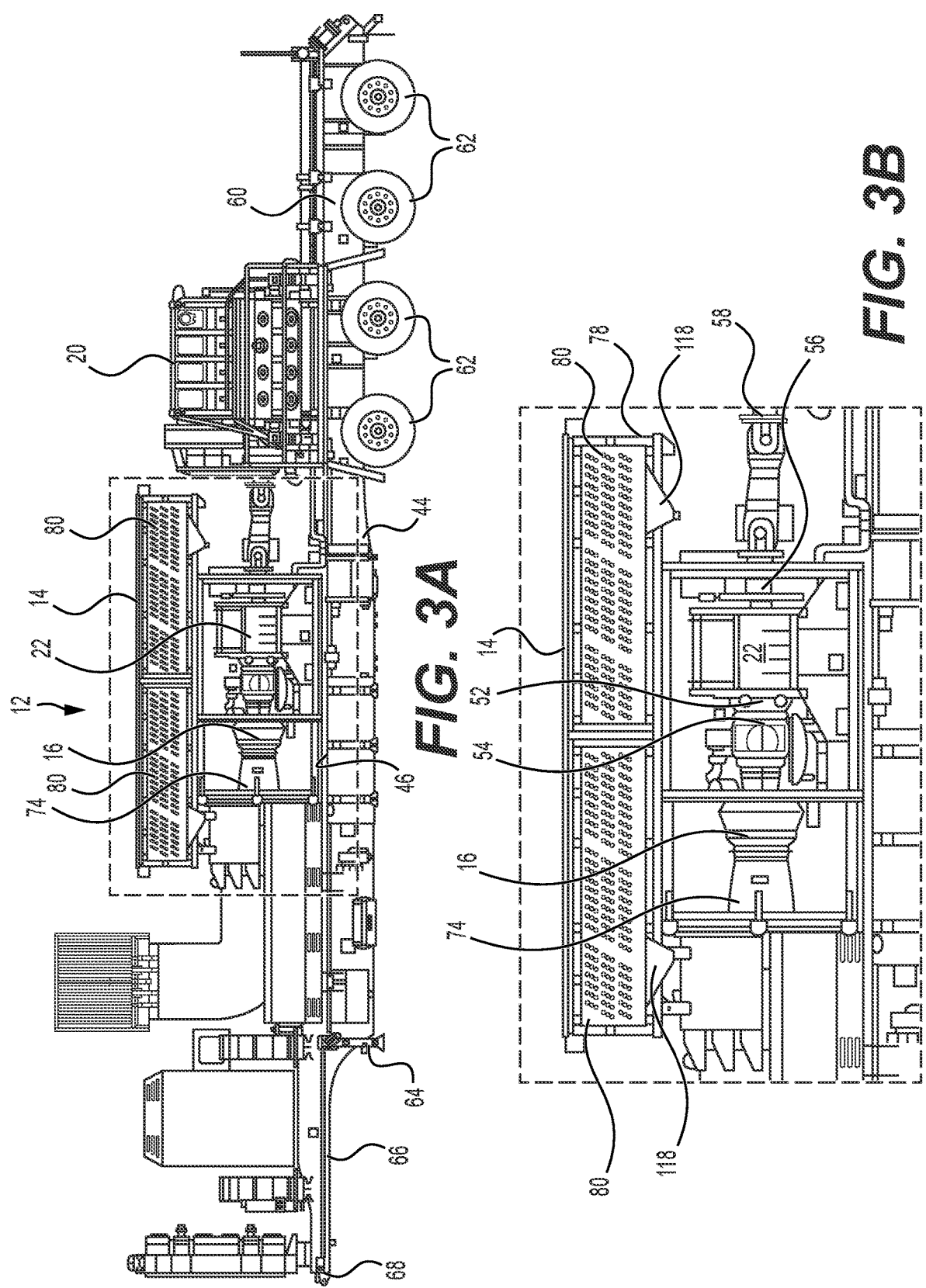

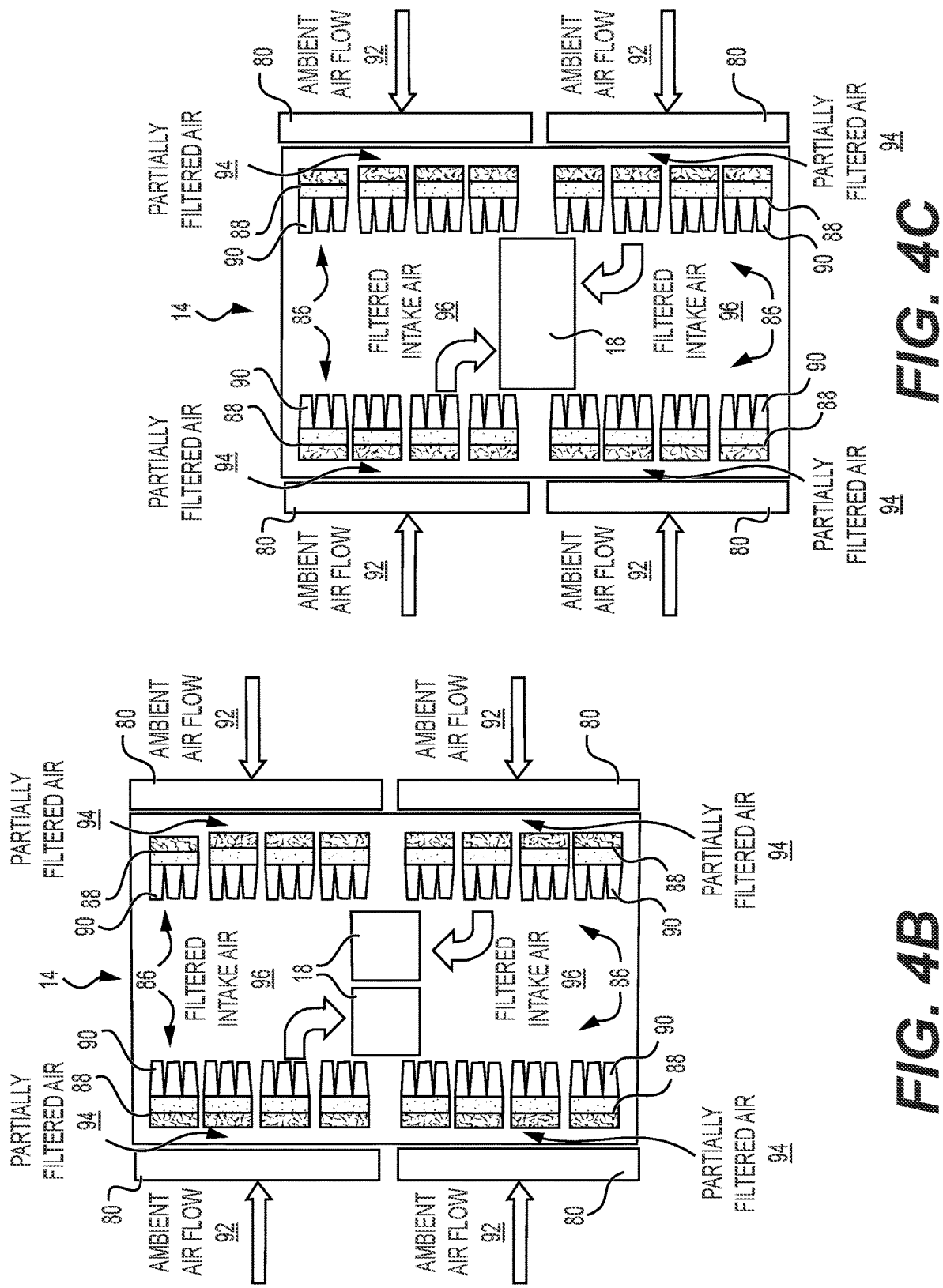

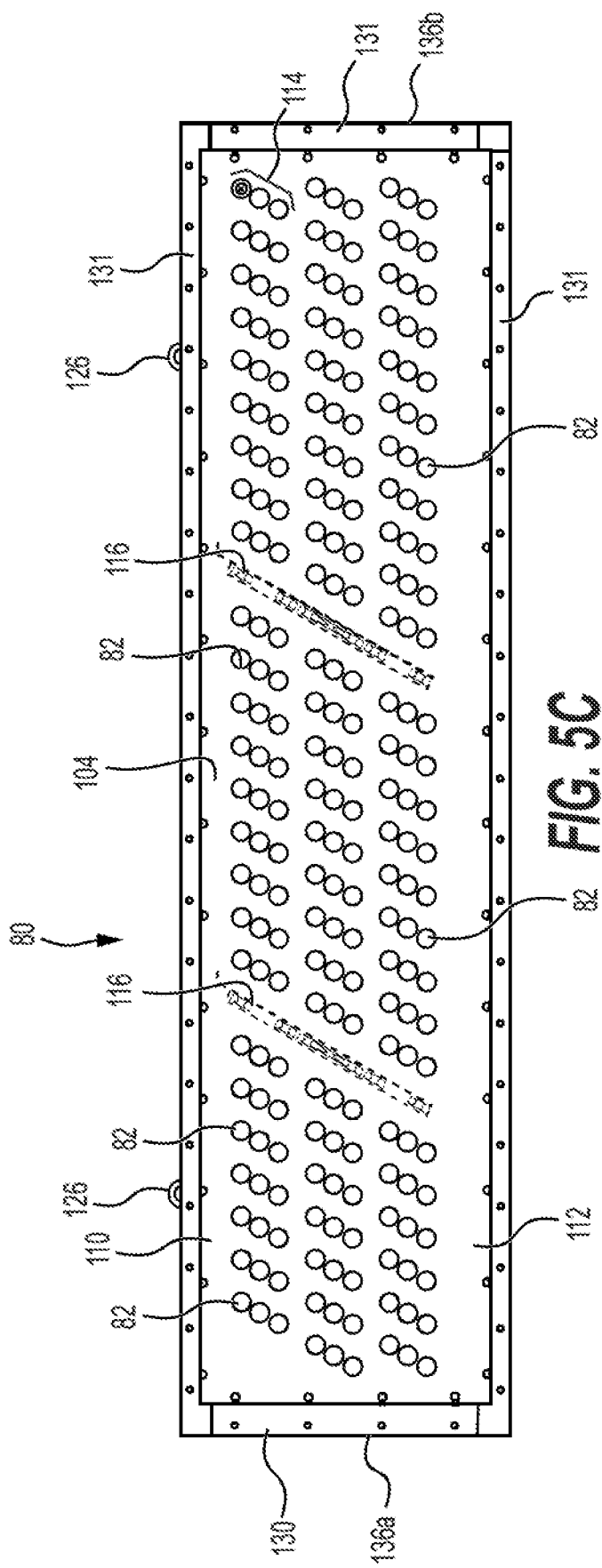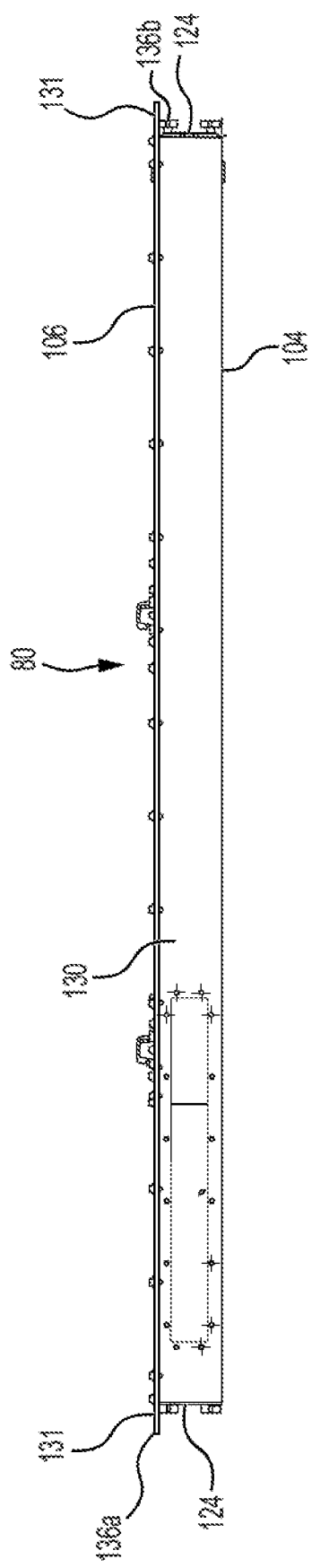

| Alt. (ft) | Temp (F) | Pressure at 59F (inH2O) | Density at 59F (lbm/ft3) | Density at 65F (lbm/ft3) | Density at 75F (lbm/ft3) | Density at 85F (lbm/ft3) | Density at 90F (lbm/ft3) | Density at 100F (lbm/ft3) |
|---|---|---|---|---|---|---|---|---|
| 0 | 59.0 | 407.2 | 0.0765 | 0.0756 | 0.0742 | 0.0728 | 0.0722 | 0.0709 |
| 500 | 57.2 | 399.9 | 0.0754 | 0.0743 | 0.0729 | 0.0715 | 0.0709 | 0.0696 |
| 1000 | 55.4 | 392.7 | 0.0743 | 0.0729 | 0.0716 | 0.0703 | 0.0696 | 0.0684 |
| 2000 | 51.9 | 378.6 | 0.0721 | 0.0703 | 0.0690 | 0.0677 | 0.0671 | 0.0659 |
| 3000 | 48.3 | 364.9 | 0.0700 | 0.0678 | 0.0665 | 0.0653 | 0.0647 | 0.0635 |
| 4000 | 44.7 | 351.7 | 0.0679 | 0.0653 | 0.0641 | 0.0629 | 0.0623 | 0.0612 |
| 5000 | 41.2 | 338.8 | 0.0659 | 0.0629 | 0.0617 | 0.0606 | 0.0601 | 0.0590 |

*FIG. 11*

SYSTEMS, ASSEMBLIES, AND METHODS TO ENHANCE INTAKE AIR FLOW TO A GAS TURBINE ENGINE OF A HYDRAULIC FRACTURING UNIT

PRIORITY CLAIMS

This application is a continuation-in-part of U.S. Non-Provisional application Ser. No. 17/954,118, filed Sep. 27, 2022, titled "MOBILE GAS TURBINE INLET AIR CONDITIONING SYSTEM AND ASSOCIATED METHODS," which is a continuation of U.S. Non-Provisional application Ser. No. 17/403,373, filed Aug. 16, 2021, titled "MOBILE GAS TURBINE INLET AIR CONDITIONING SYSTEM AND ASSOCIATED METHODS," which is a continuation of U.S. Non-Provisional application Ser. No. 17/326,711, filed May 21, 2021, titled "MOBILE GAS TURBINE INLET AIR CONDITIONING SYSTEM AND ASSOCIATED METHODS," now U.S. Pat. No. 11,156,159, issued Oct. 26, 2021, which is a continuation U.S. Non-Provisional application Ser. No. 17/213,802, filed Mar. 26, 2021, titled "MOBILE GAS TURBINE INLET AIR CONDITIONING SYSTEM AND ASSOCIATED METHODS," now U.S. Pat. No. 11,060,455, issued Jul. 13, 2021, which is a continuation of U.S. Non-Provisional application Ser. No. 16/948,289, filed Sep. 11, 2020, titled "MOBILE GAS TURBINE INLET AIR CONDITIONING SYSTEM AND ASSOCIATED METHODS," now U.S. Pat. No. 11,002,189, issued May 11, 2021, which claims priority to and the benefit of U.S. Provisional Application No. 62/704,565, filed May 15, 2020, titled "MOBILE GAS TURBINE INLET AIR CONDITIONING SYSTEM AND ASSOCIATED METHODS," and U.S. Provisional Application No. 62/900,291, filed Sep. 13, 2019, titled "MOBILE GAS TURBINE INLET AIR CONDITIONING SYSTEM," the disclosures of which are incorporated herein by reference in their entireties.

TECHNICAL FIELD

The present disclosure relates to systems, assemblies, and methods for enhancing intake air flow to a gas turbine engine and, more particularly, to systems, assemblies, and methods for enhancing intake air flow to a gas turbine engine of a hydraulic fracturing unit.

BACKGROUND

Hydraulic fracturing is an oilfield operation that stimulates production of hydrocarbons, such that the hydrocarbons may more easily or readily flow from a subsurface formation to a well. For example, a fracturing system may be configured to fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure builds rapidly to the point where the formation may fail and may begin to fracture. By continuing to pump the fracturing fluid into the formation, existing fractures in the formation are caused to expand and extend in directions farther away from a well bore, thereby creating flow paths to the well bore. The proppants may serve to prevent the expanded fractures from closing when pumping of the fracturing fluid is ceased or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Prime movers may be used to supply power to hydraulic fracturing pumps for pumping the fracturing fluid into the formation. For example, a plurality of gas turbine engines may each be mechanically connected to a corresponding hydraulic fracturing pump via a transmission and operated to drive the hydraulic fracturing pump. The gas turbine engine, hydraulic fracturing pump, transmission, and auxiliary components associated with the gas turbine engine, hydraulic fracturing pump, and transmission may be connected to a common platform or trailer for transportation and set-up as a hydraulic fracturing unit at the site of a fracturing operation, which may include up to a dozen or more of such hydraulic fracturing units operating together to perform the fracturing operation.

The performance of a gas turbine engine is dependent on the conditions under which the gas turbine engine operates. For example, ambient air pressure and temperature are large factors in the output of the gas turbine engine, with low ambient air pressure and high ambient temperature reducing the maximum output of the gas turbine engine. Low ambient pressure and/or high ambient temperature reduce the density of air, which reduces the mass flow of the air supplied to the intake of the gas turbine engine for combustion, which results in a lower power output. Some environments in which hydraulic fracturing operations occur are prone to low ambient pressure, for example, at higher elevations, and/or higher temperatures, for example, in hot climates. In addition, gas turbine engines are subject to damage by particulates in air supplied to the intake. Thus, in dusty environments, such as at many well sites, the air must be filtered before entering the intake of the gas turbine engine. However, filtration may reduce the pressure of air supplied to the intake, particularly as the filter medium of the filter becomes obstructed by filtered particulates with use. Reduced power output of the gas turbine engines reduces the pressure and/or flow rate provided by the corresponding hydraulic fracturing pumps of the hydraulic fracturing units. Thus, the effectiveness of a hydraulic fracturing operation may be compromised by reduced power output of the gas turbine engines of the hydraulic fracturing operation.

Accordingly, Applicant has recognized a need for systems, assemblies, and methods that provide enhanced air flow to the intake of a gas turbine engine for hydraulic fracturing operations. The present disclosure may address one or more of the above-referenced drawbacks, as well as other possible drawbacks.

SUMMARY

As referenced above, it may be desirable to provide systems, assemblies, methods that provide enhanced air flow to the intake of a gas turbine engine for hydraulic fracturing operations. For example, as noted above, low ambient pressure and/or high ambient temperature may reduce the density of air, which reduces the mass flow of the air supplied to the intake of the gas turbine engine for combustion, which results in a lower power output. In addition, particles and/or liquid in air supplied to the intake of a gas turbine engines may damage the gas turbine engine. Thus, in dusty environments, such as at many well sites, the air may be filtered before entering the intake of the gas turbine engine to reduce the likelihood of damage to the gas turbine engine. Filtration of the air, however, may reduce the pressure of air supplied to the intake, particularly as the filter medium of the filter becomes obstructed by filtered particulates with use. The gas turbine engine may not be capable of achieving its optimum power output under such conditions, and further, as air flow through the filter media becomes impeded by a build-up of particles and/or liquid, suction resulting from operation of the gas turbine engine may cause the filter to collapse, potentially resulting in damage to the gas turbine engine and excessive downtime for maintenance. Reduced power output of the gas turbine engines reduces the pressure and/or flow rate provided by the corresponding hydraulic fracturing pumps of the hydraulic fracturing units. Thus, the effectiveness of a hydraulic fracturing operation may be compromised by reduced power output of the gas turbine engines of the hydraulic fracturing operation.

The present disclosure generally is directed to assemblies and methods to enhance the efficiency of operation of gas turbine engines, which may be connected to, for example, one or more hydraulic fracturing pumps to pump hydraulic fracturing fluid into wellheads. For example, in some embodiments, an intake air treatment assembly may be provided to enhance the efficiency of operation of a gas turbine engine including an inlet assembly positioned to supply intake air to the gas turbine engine. The intake air treatment assembly may include a filtration assembly including one or more pre-cleaners to receive ambient air drawn into the filtration assembly via operation of the gas turbine engine, and the one or more pre-cleaners may include one or more inertial separators configured to separate particles and/or liquid from the ambient air to provide at least partially filtered intake air prior to the ambient air reaching the inlet of the gas turbine engine. The pre-cleaners, in at least some embodiments, may serve to reduce particles and/or liquid from reaching one or more filters, which may reduce the rate at which the one or more filters need to be services or replaced, thereby reducing maintenance and downtime associated with the one or more filters.

According to some embodiments, a pre-cleaner to enhance the efficiency of separation of particles and/or fluid from intake air supplied to a gas turbine engine, may include a first panel positioned to face outward from a filtration assembly and a second panel opposite the first panel. The first panel and the second panel may at least partially define a separator cavity therebetween. The pre-cleaner further may include one or more inertial separators extending between the first panel and the second panel. The one or more inertial separators may be positioned to separate a portion of particles and/or liquid from ambient air, thereby to provide at least partially filtered intake air for supply to the gas turbine engine. The one or more inertial separators may include an air flow tube having a proximal end connected to the first panel, may extend toward the second panel, and may terminate at a distal end. The air flow tube may define an interior cross-sectional area. The one or more inertial separators further may include a diverter connected to the air flow tube and positioned to cause ambient air entering the air flow tube to swirl as the ambient air flows from the proximal end of the air flow tube to the distal end of the air flow tube. The one or more inertial separators also may include a separator tube connected to the second panel and extending from the second panel toward the distal end of the air flow tube. The separator tube may have an exterior cross-sectional area smaller than the interior cross-sectional area of the air flow tube.

According to some embodiments, an intake air treatment assembly to enhance the efficiency of operation of a gas turbine engine including an inlet assembly positioned to supply intake air to the gas turbine engine, may include a turbine housing configured to at least partially enclose the gas turbine engine and the inlet assembly. The turbine housing may be positioned to facilitate supply of intake air to the inlet assembly of the gas turbine engine. The intake air treatment assembly may further include a filtration assembly connected to the turbine housing and positioned to provide a flow path to supply at least partially filtered intake air to the inlet assembly of the gas turbine engine. The filtration assembly may include a pre-cleaner positioned to receive ambient air drawn into the filtration assembly via operation of the gas turbine engine and including one or more inertial separators configured to separate a first portion of particles and/or liquid from the ambient air, thereby to provide at least partially filtered intake air. The filtration assembly further may include one or more filters positioned in the flow path downstream of the pre-cleaner and configured to separate a second portion of the particles and/or liquid from the at least partially filtered intake air, thereby to provide the at least partially filtered intake air to the inlet assembly of the gas turbine engine.

According to some embodiments, a hydraulic fracturing unit to enhance flow of fracturing fluid into a wellhead during a high-pressure fracturing operation may include a chassis having a longitudinal chassis axis and a width perpendicular to the longitudinal chassis axis. The hydraulic fracturing unit further may include a gas turbine engine supported by the chassis, and an inlet assembly connected to the gas turbine engine to supply intake air to the gas turbine engine. The hydraulic fracturing unit also may include a hydraulic fracturing pump connected to the gas turbine engine, and an intake air treatment assembly associated with the intake assembly to enhance the efficiency of operation of the gas turbine engine. The intake air treatment assembly may include a turbine housing at least partially enclosing the gas turbine engine and the inlet assembly, and positioned to facilitate supply of intake air to the inlet assembly of the gas turbine engine. The hydraulic fracturing unit further may include a filtration assembly connected to the turbine housing and positioned to provide a flow path to supply at least partially filtered intake air to the inlet assembly. The filtration assembly may include a pre-cleaner positioned to receive ambient air drawn into the filtration assembly via operation of the gas turbine engine and including one or more inertial separators configured to separate a first portion of particles and/or liquid from the ambient air, thereby to provide at least partially filtered intake air. The filtration assembly also may include one or more filters positioned in the flow path downstream of the pre-cleaner and configured to separate a second portion of the particles and/or liquid from the at least partially filtered intake air, thereby to provide the at least partially filtered intake air to the inlet assembly of the gas turbine engine.

According to some embodiments, a method to enhance the efficiency of operation of a gas turbine engine may include causing ambient air to flow toward an inlet assembly connected to the gas turbine engine, and passing the ambient air through one or more pre-cleaners to cause the ambient air to swirl and separate a first portion of particles and/or liquid from the ambient air, thereby to provide at least partially filtered intake air. The method further may include passing the at least partially filtered intake air through one or more filters to separate a second portion of the particles and/or liquid from the at least partially filtered intake air, thereby to provide further filtered intake air. The method also may include supplying the further filtered intake air to the intake assembly.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 3A is a schematic partial side section view of an example hydraulic fracturing unit, according to embodiments of the disclosure.

FIG. 3B is a schematic detailed partial side section view of an example intake air treatment assembly of the example hydraulic fracturing unit shown in FIG. 3A, according to embodiments of the disclosure.

FIG. 4B is a schematic top view of an example intake air treatment assembly showing an example flow path, according to embodiments of the disclosure.

FIG. 4C is a schematic top view of another example intake air treatment assembly showing another example flow path, according to embodiments of the disclosure.

FIG. 5C is a schematic side view of the example pre-cleaner shown in FIG. 5A viewed from the exterior side, according to embodiments of the disclosure.

FIG. 5D is a schematic bottom view of the example pre-cleaner shown in FIG. 5A, according to embodiments of the disclosure.

FIG. 11 illustrates, in table form, ambient air properties at different elevations and temperatures, according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," when present, are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
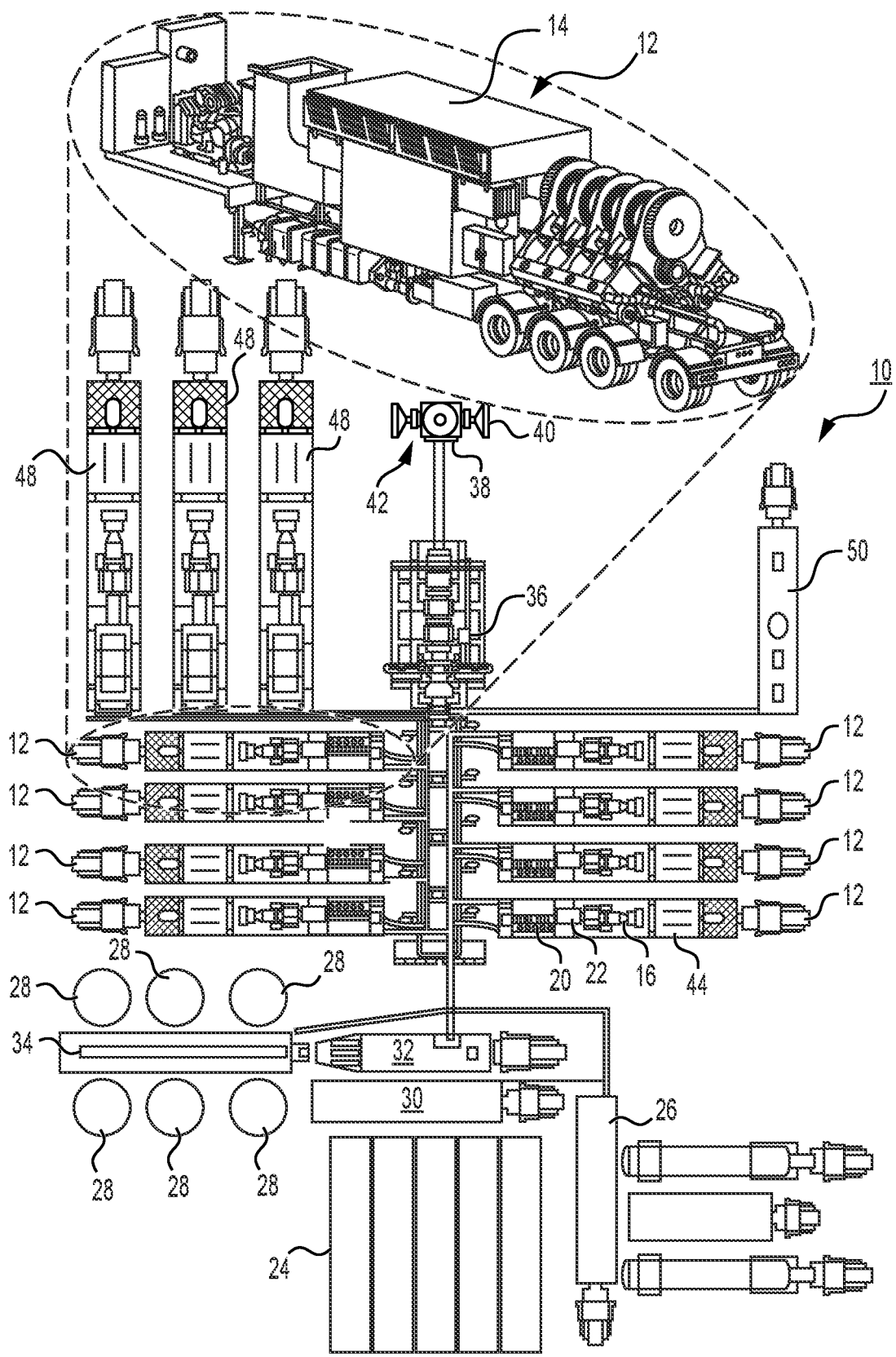
FIG. 1 schematically illustrates an example hydraulic fracturing system including a plurality of example hydraulic fracturing units, according to embodiments of the disclosure.
Figure 2:
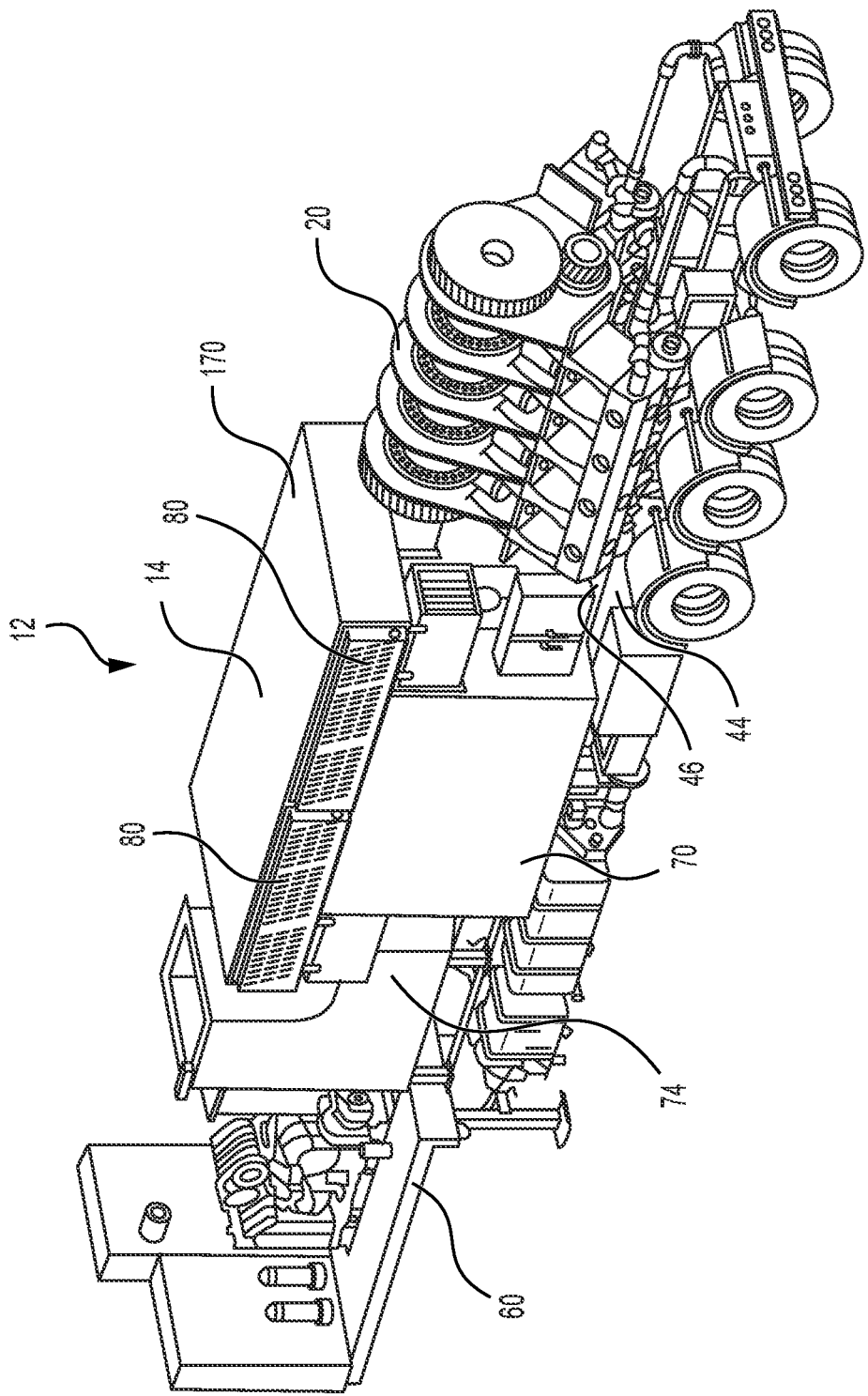
FIG. 2 is a schematic perspective view of an example hydraulic fracturing unit, according to embodiments of the disclosure.

FIG. 1 schematically illustrates a top view of an example hydraulic fracturing system 10 including a plurality of hydraulic fracturing units 12, according to embodiments of the disclosure. FIG. 2 is a schematic perspective view of an example hydraulic fracturing unit 12, according to embodiments of the disclosure. FIG. 3A is a schematic partial side section view of an example hydraulic fracturing unit 12, and FIG. 3B is a detailed partial side section view of an example intake air treatment assembly 14 of the example hydraulic fracturing unit 12 shown in FIG. 3A, according to embodiments of the disclosure. As explained herein, the intake air treatment assembly 14, in some embodiments, may be configured to enhance the efficiency of operation of a prime mover, such as a gas turbine engine (GTE) 16, including an inlet assembly 18 positioned to supply intake air to the GTE 16.

As shown in FIGS. 3A and 3B, in some embodiments, one or more of the hydraulic fracturing units 12 may include a hydraulic fracturing pump 20 driven by a GTE 16. In some embodiments, the prime mover may be a type of internal combustion engine other than a GTE, such as a reciprocating-piston engine (e.g., a diesel engine). In some embodiments, each of the hydraulic fracturing units 12 may include a directly-driven turbine (DDT) hydraulic fracturing pump 20, in which the hydraulic fracturing pump 20 is connected to one or more GTEs 16 that supply power to the respective hydraulic fracturing pump 20 for supplying fracturing fluid at high pressure and high flow rates to a formation. For example, the GTE 16 may be connected to a respective hydraulic fracturing pump 20 via a transmission 22 (e.g., a reduction gearbox) connected to a drive shaft, which, in turn, is connected to a driveshaft or input flange of a respective hydraulic fracturing pump 20, which may be a reciprocating hydraulic fracturing pump. Other types of engine-to-pump arrangements are contemplated as will be understood by those skilled in the art.

In some embodiments, one or more of the GTEs 16 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as, for example, compressed natural gas (CNG), natural gas, field gas, pipeline gas, methane, propane, butane, and/or liquid fuels, such as, for example, diesel fuel (e.g., #2 diesel), bio-diesel fuel, biofuel, alcohol, gasoline, gasohol, aviation fuel, and other fuels as will be understood by those skilled in the art. Gaseous fuels may be supplied by CNG bulk vessels, a gas compressor, a liquid natural gas vaporizer, line gas, and/or well-gas produced natural gas. Other types and associated fuel supply sources are contemplated. The one or more GTEs 16 may be operated to provide horsepower to drive the transmission 22 connected to one or more of the hydraulic fracturing pumps 20 to safely and successfully fracture a formation during a well stimulation project or fracturing operation.

In some embodiments, the fracturing fluid may include, for example, water, proppants, and/or other additives, such as thickening agents and/or gels, such as guar. For example, proppants may include grains of sand, ceramic beads or spheres, shells, and/or other particulates, and may be added to the fracturing fluid, along with gelling agents to create a slurry as will be understood by those skilled in the art. The slurry may be forced via the hydraulic fracturing pumps 16 into the formation at rates faster than can be accepted by the existing pores, fractures, faults, or other spaces within the formation. As a result, pressure in the formation may build rapidly to the point where the formation fails and begins to fracture. By continuing to pump the fracturing fluid into the formation, existing fractures in the formation may be caused to expand and extend in directions away from a well bore, thereby creating additional flow paths for hydrocarbons to flow to the well. The proppants may serve to prevent the expanded fractures from closing or may reduce the extent to which the expanded fractures contract when pumping of the fracturing fluid is ceased. Once the well is fractured, large quantities of the injected fracturing fluid may be allowed to flow out of the well, and the water and any proppants not remaining in the expanded fractures may be separated from hydrocarbons produced by the well to protect downstream equipment from damage and corrosion. In some instances, the production stream of hydrocarbons may be processed to neutralize corrosive agents in the production stream resulting from the fracturing process.

In the example shown in FIG. 1, the hydraulic fracturing system 10 may include one or more water tanks 24 for supplying water for fracturing fluid, one or more chemical additive units 26 for supplying gels or agents for adding to the fracturing fluid (e.g., guar, etc.), and one or more proppant tanks 28 (e.g., sand tanks) for supplying proppants for the fracturing fluid. The example hydraulic fracturing system 10 shown also includes a hydration unit 30 for mixing water from the water tanks 24 and gels and/or agents from the chemical additive units 26 to form a mixture, for example, gelled water. The example shown also includes a blender 32, which receives the mixture from the hydration unit 30 and proppants via conveyers 34 from the proppant tanks 28. The blender 32 may mix the mixture and the proppants into a slurry to serve as fracturing fluid for the hydraulic fracturing system 10. Once combined, the slurry may be discharged through low-pressure hoses, which convey the slurry into two or more low-pressure lines in a fracturing manifold 36. In the example shown, the low-pressure lines in the fracturing manifold 36 may feed the slurry to the hydraulic fracturing pumps 20 through low-pressure suction hoses as will be understood by those skilled in the art.

The hydraulic fracturing pumps 20, driven by the respective GTEs 16, discharge the slurry (e.g., the fracturing fluid including the water, agents, gels, and/or proppants) at high flow rates and/or high pressures through individual high-pressure discharge lines into two or more high-pressure flow lines, sometimes referred to as "missiles," on the fracturing manifold 36. The flow from the high-pressure flow lines is combined at the fracturing manifold 36, and one or more of the high-pressure flow lines provide fluid flow to a manifold assembly 38, sometimes referred to as a "goat head." The manifold assembly 38 delivers the slurry into a wellhead manifold 40. The wellhead manifold 40 may be configured to selectively divert the slurry to, for example, one or more wellheads 42 via operation of one or more valves. Once the fracturing process is ceased or completed, flow returning from the fractured formation discharges into a flowback manifold, and the returned flow may be collected in one or more flowback tanks as will be understood by those skilled in the art.

As schematically depicted in FIG. 1, FIG. 2, and FIG. 3A, one or more of the components of the fracturing system 10 may be configured to be portable, so that the hydraulic fracturing system 10 may be transported to a well site, quickly assembled, operated for a relatively short period of time, at least partially disassembled, and transported to another location of another well site for use. For example, the components may be connected to and/or supported on a chassis 44, for example, a trailer and/or a support incorporated into a truck, so that they may be easily transported between well sites. In some embodiments, the GTE 16, the hydraulic fracturing pump 20, and/or the transmission 22 may be connected to the chassis 44. For example, the chassis 44 may include a platform 46, and the transmission 22 may be connected to the platform 46, and the GTE 16 may be connected to the transmission 22. In some embodiments, the GTE 16 may be connected to the transmission 22 without also connecting the GTE 16 directly to the platform 46, which may result in fewer support structures being needed for supporting the GTE 16, hydraulic fracturing pump 20, and/or transmission 22 on the chassis 44.

As shown in FIG. 1, some embodiments of the hydraulic fracturing system 10 may include one or more fuel supplies 48 for supplying the GTEs 16 and any other fuel-powered components of the hydraulic fracturing system 10, such as auxiliary equipment, with fuel. The fuel supplies 48 may include gaseous fuels, such as compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels as will be understood by those skilled in the art. Gaseous fuels may be supplied by CNG bulk vessels, such as fuel tanks coupled to trucks, a gas compressor, a liquid natural gas vaporizer, line gas, and/or well-gas produced natural gas. The fuel may be supplied to the hydraulic fracturing units 12 by one or more fuel lines supplying the fuel to a fuel manifold and unit fuel lines between the fuel manifold and the hydraulic fracturing units 12. Other types and associated fuel supply sources and arrangements are contemplated as will be understood by those skilled in the art.

As shown in FIG. 1, some embodiments also may include one or more data centers 50 configured to facilitate receipt and transmission of data communications related to operation of one or more of the components of the hydraulic fracturing system 10. Such data communications may be received and/or transmitted via hard-wired communications cables and/or wireless communications, for example, according to known communications protocols. For example, the data centers 50 may contain at least some components of a hydraulic fracturing control assembly, such as a supervisory controller configured to receive signals from components of the hydraulic fracturing system 10 and/or communicate control signals to components of the hydraulic fracturing system 10, for example, to at least partially control operation of one or more components of the hydraulic fracturing system 10, such as, for example, the GTEs 16, the hydraulic fracturing pumps 20, and/or the transmissions 22 of the hydraulic fracturing units 12, the chemical additive units 26, the hydration units 30, the blender 32, the conveyers 34, the fracturing manifold 36, the manifold assembly 38, the wellhead manifold 40, and/or any associated valves, pumps, and/or other components of the hydraulic fracturing system 10.

As shown in FIGS. 3A and 3B, in some embodiments, the transmission 22 may include a transmission input shaft 52 connected to a prime mover output shaft 54 (e.g., a turbine output shaft), such that the transmission input shaft 52 rotates at the same rotational speed as the prime mover output shaft 54. The transmission 22 may also include a transmission output shaft 56 positioned to be driven by the transmission input shaft 52 at a different rotational speed than the transmission input shaft 52. In some embodiments, the transmission 22 may be a reduction gearbox, which results in the transmission output shaft 56 having a relatively slower rotational speed than the transmission input shaft 52. The transmission 22 may include a continuously variable transmission, an automatic transmission including one or more planetary gear trains, a transmission shiftable between different ratios of input-to-output, etc., or any other suitable of types of transmissions as will be understood by those skilled in the art.

As shown in FIGS. 3A and 3B, in some embodiments, the hydraulic fracturing pump 20 may be, for example, a reciprocating fluid pump, as explained herein. In some embodiments, the hydraulic fracturing pump 20 may include a pump drive shaft 58 connected to the transmission output shaft 56, such that the transmission output shaft 56 drives the pump drive shaft 58 at a desired rotational speed. For example, the transmission output shaft 56 may include an output shaft connection flange, and the pump drive shaft 58 may include a drive shaft connection flange, and the output shaft connection flange and the drive shaft connection flange may be coupled to one another, for example, directly connected to one another. In some embodiments, the transmission output shaft 56 and the pump drive shaft 58 may be connected to one another via any known coupling types as will be understood by those skilled in the art (e.g., such as a universal joint and/or a torsional coupling).

As shown in FIGS. 2 and 3A, in some embodiments, the chassis 44 may be or include a trailer 60 including the platform 46 for supporting components of the hydraulic fracturing unit 12, one or more pairs of wheels 62 facilitating movement of the trailer 60, a pair of retractable supports 64 to support the hydraulic fracturing unit 12 during use, and a tongue 66 including a coupler 68 for connecting the trailer 60 to a truck for transport of the hydraulic fracturing unit 12 between well sites to be incorporated into a hydraulic fracturing system 10 of a well site fracturing operation, as will be understood by those skilled in the art.

As shown in FIGS. 2, 3A, and 3B, some embodiments of the intake air treatment assembly 14 may include a turbine housing 70 configured to at least partially enclose the GTE 16 and the inlet assembly 18. The turbine housing 70 may be positioned to facilitate supply of intake air to the inlet assembly 18 of the GTE 16. The turbine housing 70 may be connected to and supported by the chassis 44 according to embodiments of the disclosure. In some embodiments, as shown in FIGS. 3A and 3B, the GTE 16 may be connected to the transmission 22 via the prime mover output shaft 54 and the transmission input shaft 52, both of which may be substantially contained within the turbine housing 70. The inlet assembly 18 may include an air intake duct 72 and a turbine exhaust duct 74 passing through walls of the turbine housing 70 and connected to the GTE 16. The GTE 16 may be connected to the hydraulic fracturing pump 20 via the transmission 22, with the transmission output shaft 56 connected to the pump drive shaft 58, for example, as explained herein.

As shown in FIGS. 1, 2, 3A, and 3B, some embodiments of the hydraulic fracturing pump 20 may have physical dimensions configured such that the hydraulic fracturing pump 20 does not exceed the space available on the platform 46, for example, while still providing a desired pressure output and/or flow output to assist with performing the fracturing operation as explained herein. For example, the hydraulic fracturing pump 20 may have a pump length dimension substantially parallel to a longitudinal axis of the platform 46 that facilitates placement and/or connection of the hydraulic fracturing pump 20 on the platform 46, for example, without causing the hydraulic fracturing unit 12 to exceed a length permitted for transportation on public highways, for example, in compliance with government regulations. In some embodiments, for example, as shown in FIG. 2, the hydraulic fracturing pump 20 may have a pump width dimension substantially perpendicular to a longitudinal axis of the platform 46 that facilitates placement and/or connection of the hydraulic fracturing pump 20 on the platform 46, for example, without causing the hydraulic fracturing unit 12 to exceed a width permitted for transportation on public highways, for example, in compliance with government regulations. For example, the hydraulic fracturing pump 14 may have a pump width perpendicular to the longitudinal axis of the platform 46, such that the pump width is less than or equal to the width of the platform, for example, as shown in FIG. 2. As shown in FIG. 2, in some embodiments, as viewed from the rear of the platform 46 and in a direction substantially parallel to the longitudinal axis of the platform 46, an end of the hydraulic fracturing pump 20 may take on the appearance of an inverted V and may include two, four, six, eight, or more plungers that reciprocate in two banks of plungers in planes defining an angle therebetween ranging, for example, from about 20 degrees to about 180 degrees (e.g., from about 30 degrees to about 120 degrees, about 90 degrees, about 70 degrees, about 60 degrees, or about 45 degrees). Hydraulic fracturing pumps having an in-line architecture and having two or more plungers (e.g., three, four, five, or more plungers) reciprocating in a common plane are contemplated As shown in FIG. 2, FIG. 3A, FIG. 3B, FIG. 4B, FIG. 4C, FIG. 4D, and FIG. 4E, some embodiments of the intake air treatment assembly 14 may include a filtration assembly 76 connected to the turbine housing 70 and positioned to provide a flow path to supply at least partially filtered intake air to the inlet assembly 18 of the GTE 16. For example, FIGS. 4A-4E show schematic views of an example intake air treatment assembly 14, according to embodiments of the disclosure.

For example, the filtration assembly 76 may include a filtration housing 78 connected to the turbine housing 70, for example, as shown. In some embodiments, the filtration assembly 76 may include one or more pre-cleaners 80 positioned to receive ambient air drawn into the filtration assembly 76 via operation of the GTE 16. As shown, in some embodiments, the one or more pre-cleaners 80 may include one or more inertial separators 82 configured to separate a first portion of particles and/or liquid from the ambient air, thereby to provide at least partially filtered intake air for use by the GTE 16 during operation. For example, the ambient air, particularly in harsh environments common to oilfield operations, may include contaminates, such as particles and/or liquid, including, for example, sand, dust, dirt, water, ice, proppants, and/or fracturing fluid additives, such as thickening agents and/or gels, such as guar. For example, proppants may include grains of sand, ceramic beads or spheres, shells, and/or other particulates, along with gelling agents, and such materials may become suspended in the ambient air and drawn into the GTE 16 during operation, unless separated from the ambient air, for example, via the pre-cleaners 80 and/or other types of filtration. In some embodiments, the one or more pre-cleaners 80 may be configured to separate one or more of these contaminates from ambient air supplied to the GTE 16 during operation to prevent damage to components of the GTE 16 and/or to reduce maintenance and/or downtime associated with the GTE 16, for example, as discussed herein.

In some embodiments, the filtration housing 78 and one or more of the pre-cleaners 80 may at least partially define a filtration chamber 84, for example, as shown in FIGS. 4B-4E. The filtration assembly 76 may include one or more filters 86 positioned in the filtration chamber 84 and positioned in the flow path downstream of the one or more pre-cleaners 80 and configured to separate a second portion of the particles and/or liquid from the at least partially filtered intake air received from the one or more pre-cleaners 80, thereby to provide at least partially (e.g., further) filtered intake air to the inlet assembly 18 of the GTE 16. For example, the one or more filters 86 may serve to separate additional particles and/or liquid from the partially filtered ambient air received from the one or more pre-cleaners 80. In some embodiments, the pre-cleaners 80 may be configured to separate relatively larger particles and/or larger liquid droplets from the ambient air, and the filters 84 may be configured to separate relatively smaller particles and/or larger liquid droplets from the partially filtered ambient air received from the pre-cleaners 80, for example, as described herein. Use of the pre-cleaners 80, in some embodiments, may reduce the frequency with which the filters 86 need to be serviced or replaced due to obstruction or clogging by particles and/or liquid in the ambient air. In some embodiments, as shown in FIGS. 4B and 4C, the one or more filters 86 may include one or more pre-filters 88 and/or one or more final filters 90, and in some embodiments, additional filtration downstream of the pre-filters 88 and/or the final filters 90. In some embodiments, the one or more pre-filters 88 may include one or more medium-efficiency intermediate filters (e.g., one or more cartridge-type pre-filters and/or bag-type pre-filters), and the one or more final filters 90 may include one or more high-efficiency final filters.

Figure 4A:
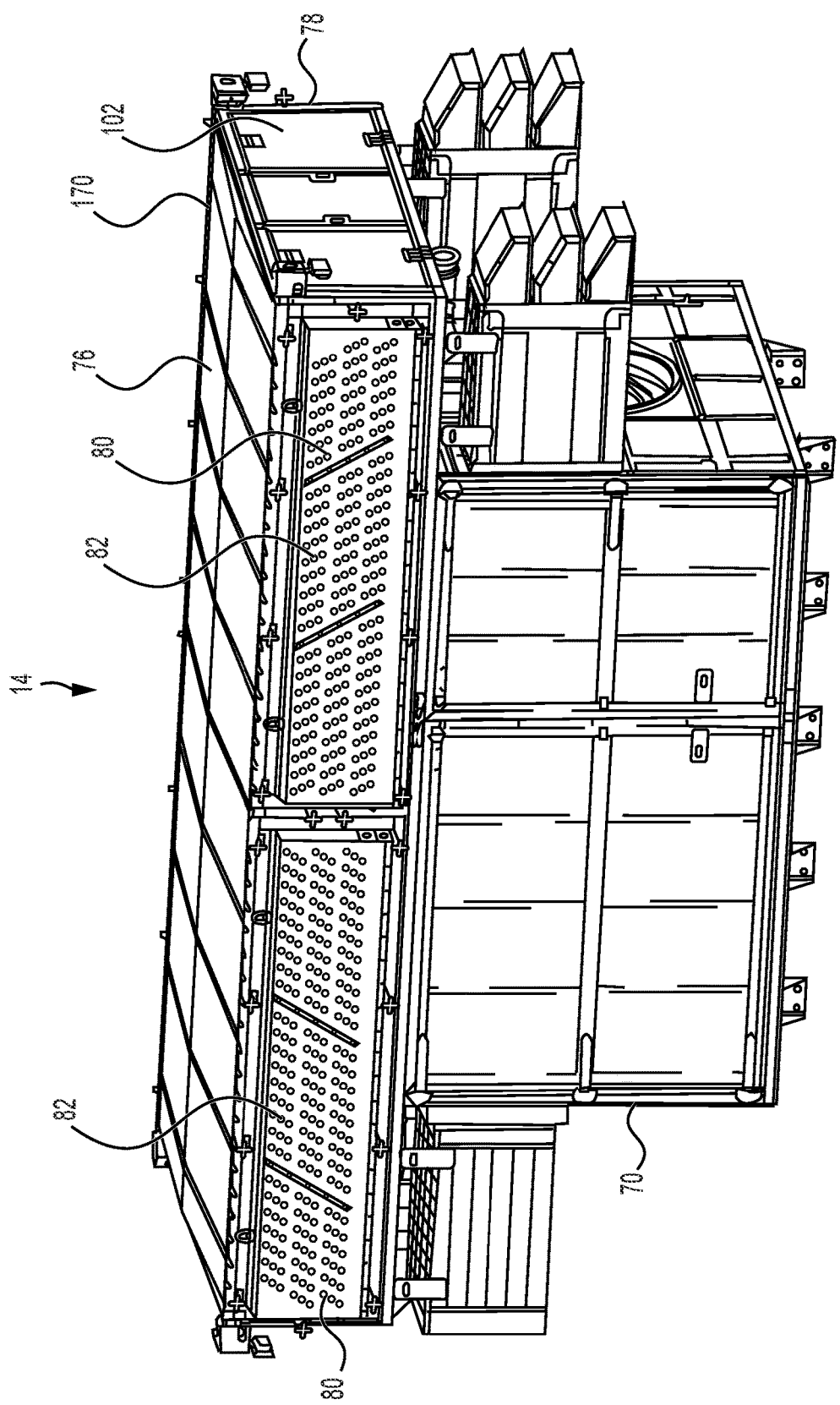
FIG. 4A is a schematic perspective view of an example intake air treatment assembly, according to embodiments of the disclosure.

FIG. 4B is a schematic top view of an example intake air treatment assembly 14 showing an example flow path, according to embodiments of the disclosure. As shown in FIG. 4B, in some embodiments, during operation of the GTE 16, ambient air 92 is drawn into the filtration housing 78 via the one or more pre-cleaners 80. As described herein, the pre-cleaners 80 may include one or more inertial separators 82 (see, e.g., FIGS. 4A and 5A-5F) configured to separate a first portion of particles and/or liquid from the ambient air 92, thereby to provide at least partially filtered intake air 94. The at least partially filtered intake air 94 may be further drawn into and through the one or more filters 86, including, in at least some embodiments, the pre-filters 88 and/or the final filters 90 downstream relative to the pre-cleaners 80. The one or more filters 86 may be configured to separate a second portion of the particles and/or liquid from the at least partially filtered intake air 94, thereby to provide filtered intake air 96 (e.g., the at least partially filtered intake air, which may be further filtered relative to the at least partially filtered intake air 94 received from the pre-cleaners 80). As shown, in some embodiments, the filtered intake air 96 may be supplied to the inlet assembly 18 of the GTE 16, with or without additional filtration.

As shown in FIG. 4B, in some embodiments, the intake assembly 18 may be separated into two or more separate intake assemblies 18a and 18b configured to supply at least partially filtered intake air (e.g., intake air 96) to one or more GTEs 16. For example, in some embodiments, the two or more intake assemblies 18a and 18b may be configured to supply the at least partially filtered intake air 94 to a single GTE 16, for example, from opposite sides of the hydraulic fracturing unit 12 (e.g., from the driver side and the passenger side of the trailer 60). In some embodiments, the two or more intake assemblies 18a and 18b may be configured to supply the at least partially filtered intake air 94 to two or more GTEs 16 of a common hydraulic fracturing unit 12. FIG. 4C is a schematic top view of another example intake air treatment assembly 14 showing another example flow path, according to embodiments of the disclosure. In the example embodiment shown in FIG. 4C, the example intake assembly 18 may be a combined or single intake assembly 18 configured to supply at least partially filtered intake air (e.g., the at least partially filtered intake air 96) to one or more GTEs 16. For example, in some embodiments, the single intake assembly 18 may be configured to supply the at least partially filtered intake air 94 to a single GTE 16 of a hydraulic fracturing unit 12. In some embodiments, the single intake assembly 18 may be configured to supply the at least partially filtered intake air 94 to two or more GTEs 16 of a common hydraulic fracturing unit 12.

Figure 4E:
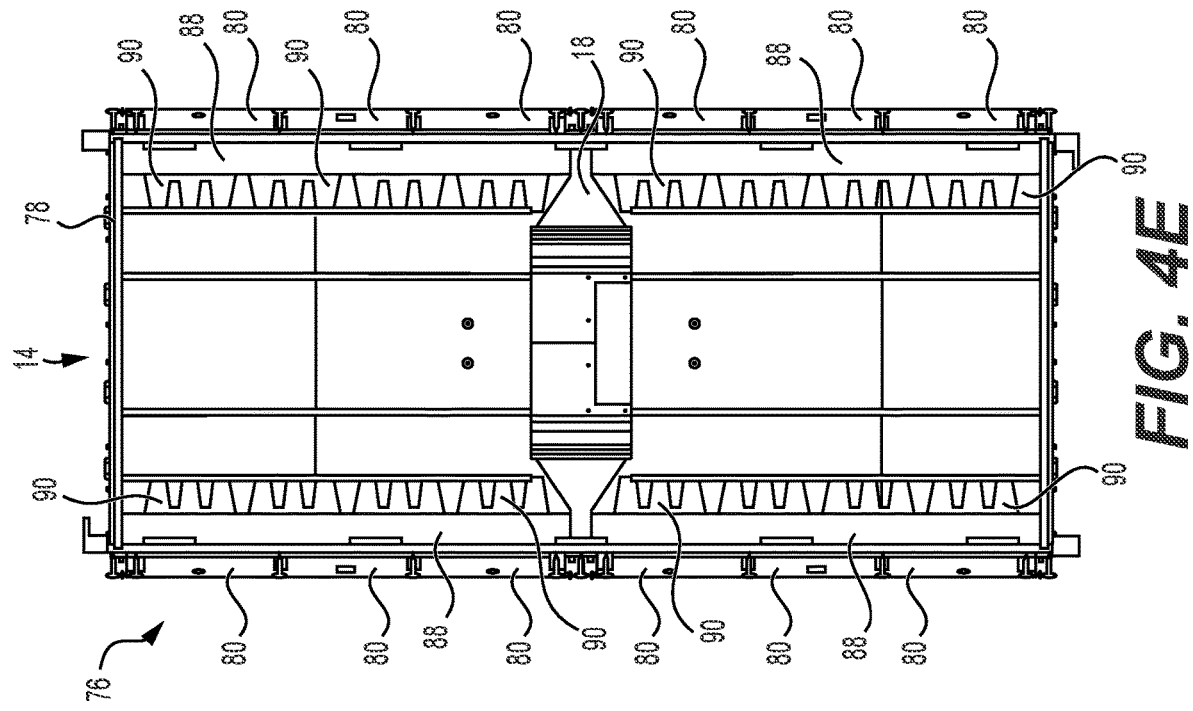
FIG. 4E is a schematic top view of another example intake air treatment assembly not including sound attenuation baffles, according to embodiments of the disclosure.
Figure 4D:
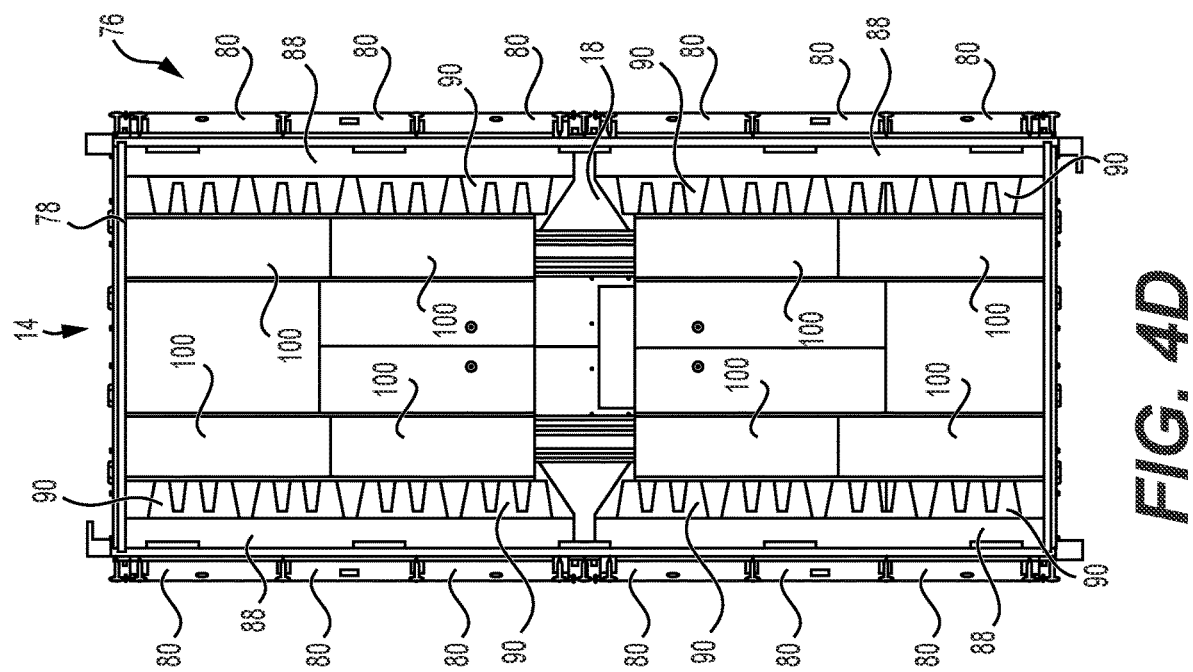
FIG. 4D is a schematic top view of an example intake air treatment assembly including example sound attenuation baffles, according to embodiments of the disclosure.

FIG. 4D is a schematic top view of an example intake air treatment assembly 14 including example sound attenuation baffles 100, according to embodiments of the disclosure, and FIG. 4E is a schematic top view of another example intake air treatment assembly 14 without sound attenuation baffles, according to embodiments of the disclosure. As shown in FIG. 4D, some embodiments of the intake air treatment assembly 14 may include one or more sound attenuation baffles received in the filtration chamber 84 and configured to reduce sound generated during operation of the GTE 16 caused by air drawn into the filtration chamber 84 during operation of the GTE 16. In the example shown, the sound attenuation baffles 100 are positioned downstream relative to the pre-cleaners 80 and the filters 86, but upstream relative to the inlet assembly 18, which may include an inlet plenum (and/or inlet manifold), for example, as shown in FIGS. 4D and 4E.

In some embodiments, the filtration housing 78 may include one or more access panels 102 positioned to facilitate access to the filtration chamber 84, as shown in FIG. 4A. For example, the access panels 102 may enable maintenance or replacement of the filters 86 and/or the sound attenuation baffles 100, for example, if the filtration chamber 84 houses sound attenuation baffles 100. Some embodiments may not include sound attenuation baffles, for example, as shown in FIG. 4E.

Figure 5A:
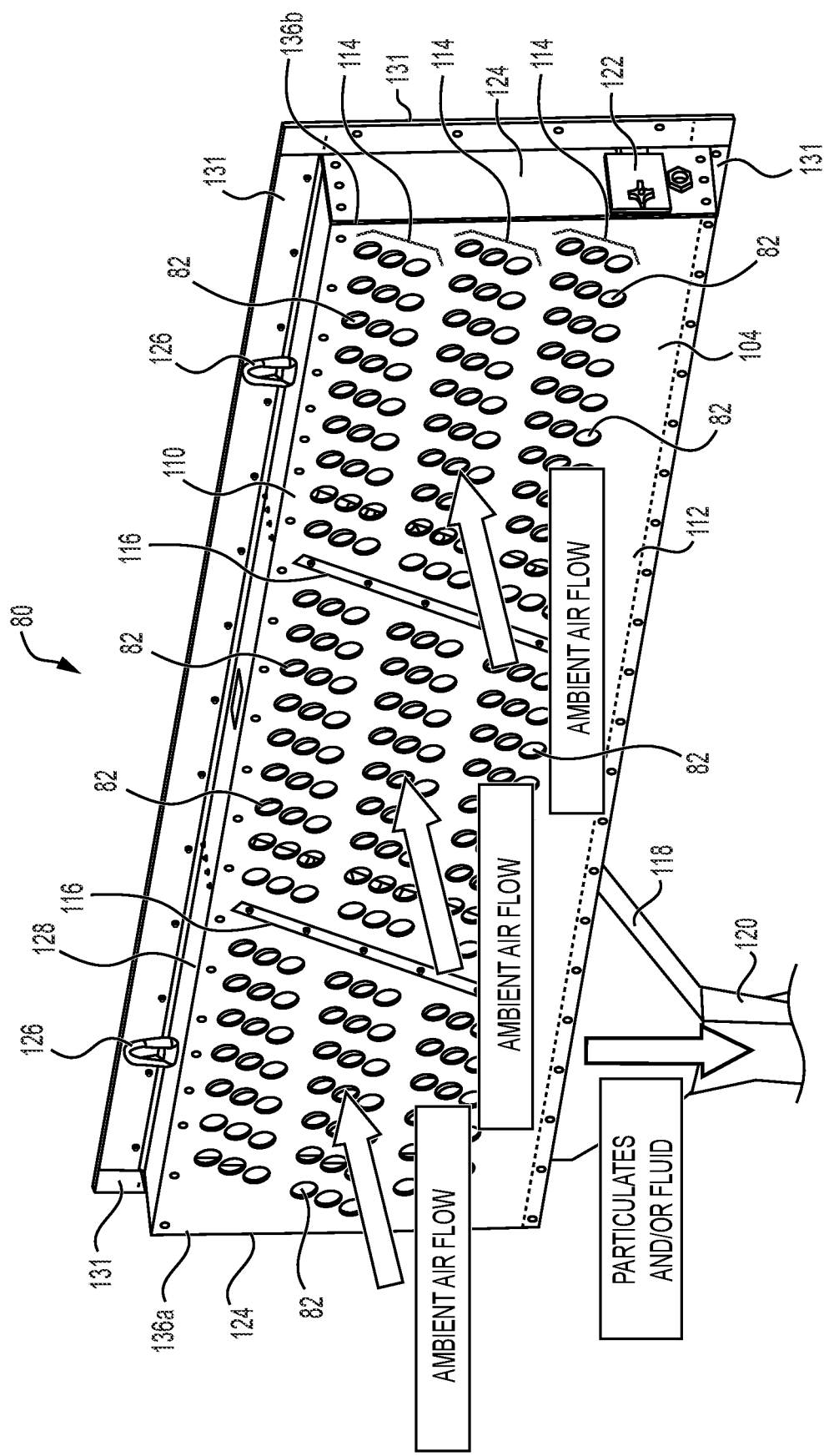
FIG. 5A is a schematic perspective view of an example pre-cleaner viewed from an exterior side, according to embodiments of the disclosure.
Figure 5B:
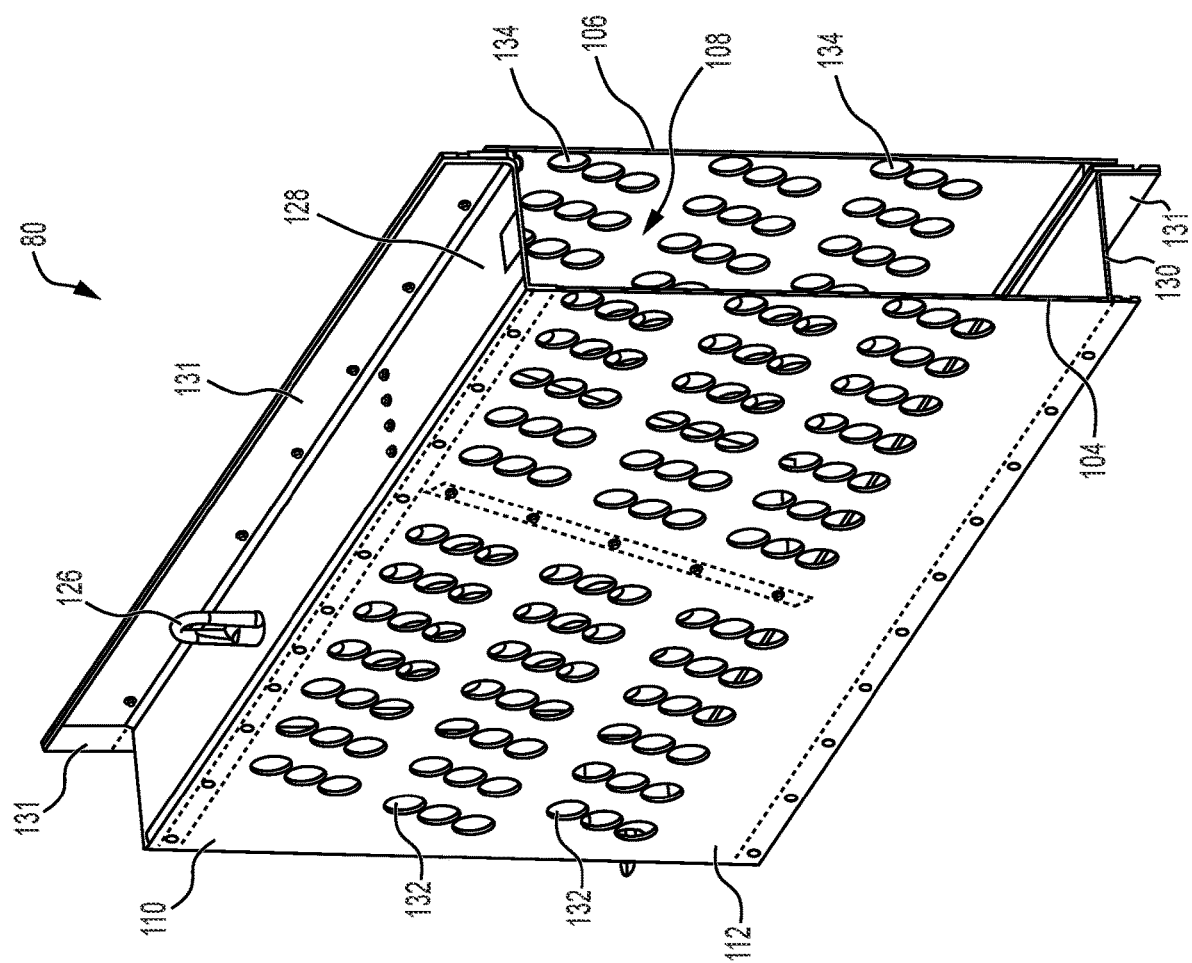
FIG. 5B is a schematic perspective partial section view of the example pre-cleaner shown in FIG. 5A, according to embodiments of the disclosure.

FIG. 5A, FIG. 5B, FIG. 5C, FIG. 5D, and FIG. 5E are schematic views of an example pre-cleaner 80, according to embodiments of the disclosure. FIG. 5A is a schematic perspective view of the example pre-cleaner 80 viewed from an exterior side. In some embodiments, one or more of the pre-cleaners 80 may include one or more inertial separators 82 configured to separate particles and/or liquid from ambient air 92 passing through the pre-cleaners 80, thereby to provide at least partially filtered intake air 94 (see, e.g., FIGS. 4B and 4C). As shown in FIGS. 5A and 5B, in some embodiments, the pre-cleaners 80 may include an exterior panel 104 facing outward from the filtration assembly 76, and an interior panel 106 opposite the exterior panel 104 and facing inward toward an interior of the filtration assembly 76, for example, toward the filtration chamber 84. The exterior panel 104 and the interior panel 106 may at least partially define a separator cavity 108 therebetween, for example, as shown in FIG. 5B.

As shown in FIGS. 5A, 5B, 5C, and 5E, the exterior panel 104 and/or the interior panel 106 may at least partially define an upper end 110 and a lower end 112, and a plurality of the inertial separators 82 may be arranged in groups 114 extending diagonally between the upper end 110 and the lower end 112 of the pre-cleaner 80. For example, as shown in FIGS. 5A-5C, the groups 114 of inertial separators 82 may include two or more inertial separators 82 (e.g., groups of three inertial separators 82 as shown), and/or the groups 114 may be spaced from one another lengthwise and/or height-wise across the pre-cleaners 80. For example, as shown, the pre-cleaners 80 may include multiple groups 114 spaced across the pre-cleaners 80 and from the upper end 110 toward the lower end 112 of the pre-cleaners 80. In some embodiments, the spacing may facilitate internal reinforcement of the pre-cleaners 80, for example, with internal bracing 116 to prevent the exterior panel 104 and/or the interior panel 106 from deflecting toward one another and/or collapsing during operation of the GTE 16. In some embodiments, the spacing and/or the diagonal arrangements of the groups 114 may allow particles and/or liquid separated from the ambient air 92 by the inertial separators 82 to fall or drop to a lower end of the separator cavity 108 to facilitate removal of the separated particles and/or liquid from the pre-cleaners 80. Other configurations of groups 114 of the inertial separators 82 are contemplated. In some embodiments, the inertial separators 82 may not be arranged in groups across the pre-cleaner 80.

As shown, some embodiments of the pre-cleaner 80 may include a pre-cleaner bypass 118 connected to the pre-cleaner 80 and positioned to receive ambient air expelled from the inertial separators 82 that does not exit the pre-cleaner 80 via the interior panel 106 and/or that includes the first portion of the particles and/or liquid separated from the ambient air 92. For example, some of the ambient air 92 entering the pre-cleaner 80, rather than exiting the pre-cleaner 80 via the inertial separators 82, may be expelled from the pre-cleaner 80 via the pre-cleaner bypass 118. In some embodiments, as particles and/or liquid separated from the ambient air 92 by the inertial separators 82 fall or drop within the separator cavity 108, the particles and/or liquid may pass through the pre-cleaner bypass 118 located at the lower end 112 of the pre-cleaner 80. In some embodiments, the pre-cleaner bypass 118 may be configured to be connected to a conduit 120 configured to draw-off the ambient air and/or the particles and/or liquid passing into the pre-cleaner bypass 118 from the intake air treatment assembly 14, for example, as shown in FIG. 5A.

Figure 5E:
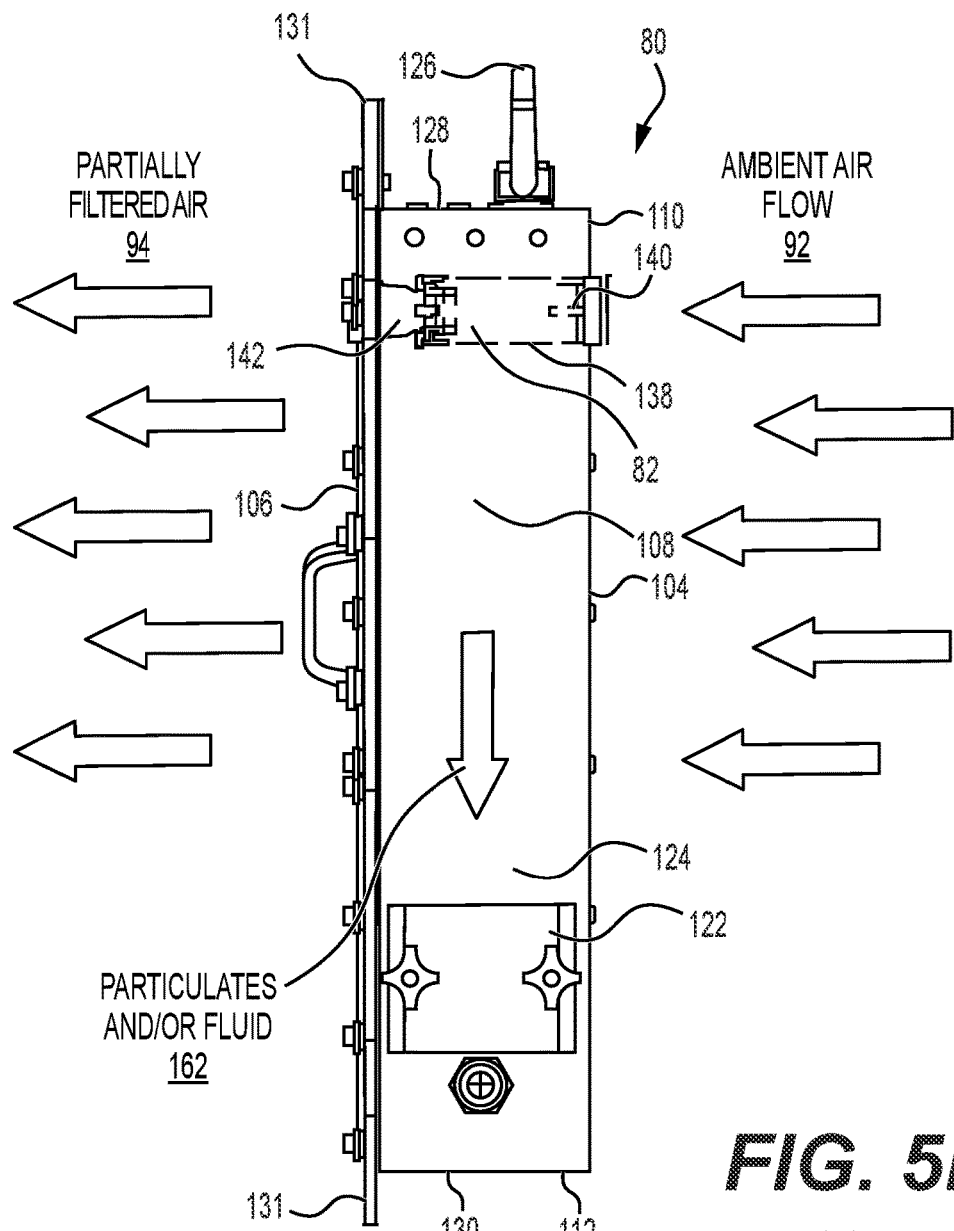
FIG. 5E is a schematic end view of the example pre-cleaner shown in FIG. 5A, according to embodiments of the disclosure.

As shown in FIGS. 5A and 5E, some embodiments of the pre-cleaner 80 may include one or more access plates 122 configured to provide access to the separator cavity 108, for example, to service the pre-cleaner 80 and/or remove particles and/or liquid from the separator cavity 108, for example, particles and/or liquid that do not drop into the pre-cleaner bypass 118. For example, the pre-cleaner 80 may include side panels 124 at opposite longitudinal ends of the pre-cleaner 80 and extending between the exterior panel 104 and the interior panel 106, and one or more access plates 122 may be located at lower ends of one or more of the side panels 124.

In some embodiments, the pre-cleaner 80 may include one or more lifting fixtures 126 configured to facilitate lifting and mounting of the pre-cleaner 80 to the filtration housing 78. The lifting fixtures 126 may include, for example, hooks, eyebolts, and/or other devices to facilitate lifting of the pre-cleaner 80 via a lifting mechanism, such as a forklift or crane. For example, the pre-cleaner 80 may include an upper panel 128 and a lower panel 130 at the upper end 110 and lower end 112, respectively, of the pre-cleaner 80 and extending between the exterior panel 104 and the interior panel 106, and one or more lifting fixtures 126 may be located at the upper panel 128. The side panels 124, the upper panel 128, and the lower panel 130 may at least partially define the separator cavity 108 of the pre-cleaner 80.

As shown in FIG. 5A, the pre-cleaner 80 may include one or more flanges 131 extending outward from a perimeter of the pre-cleaner 80. The one or more flanges 131 may facilitate connection of the pre-cleaner 80 to the filtration assembly 76 via, for example, one or more fasteners, adhesives, and/or welding.

As shown in FIG. 5B, for example, in some embodiments, the exterior panel 104 may at least partially define one or more exterior holes 132, and the interior panel 106 may at least partially define one or more interior holes 134. The one or more exterior holes 132 and the one or more interior holes 134 may provide mounting points for the one or more inertial separators 82, for example, as described with respect to FIG. 5E and FIG. 5F.

For example, as schematically shown in FIG. 5E, an example inertial separator 82 extends between the exterior panel 104 and the interior panel 106 with opposite ends of the inertial separator 82 being connected to the exterior panel 104 and the interior panel 106 at respective exterior holes 132 and interior holes 134, with exterior holes 132 providing ambient air flow into the pre-cleaner 80 via the inertial separator 82. The interior holes 134 provide partially filtered air flow from the inertial separator 82 into the filtration chamber 84.

Figure 5F:
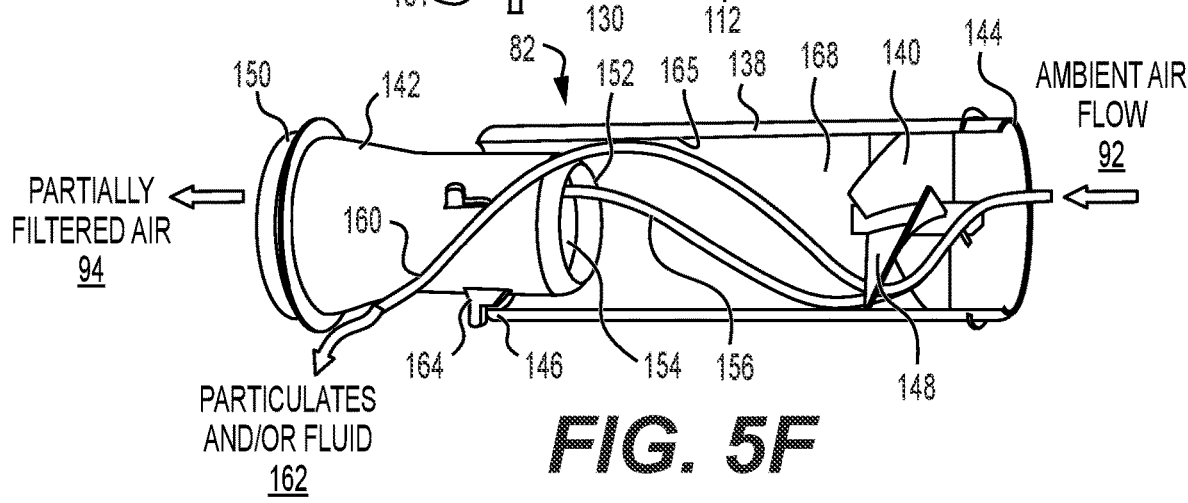
FIG. 5F is a schematic partial side section view of an example inertial separator of the example pre-cleaner shown in FIG. 5A, according to embodiments of the disclosure.

As shown in FIG. 5E and FIG. 5F, in some embodiments, the one or more pre-cleaners 80 may include one or more (e.g., a plurality of) inertial separators 82 to separate a first portion of particles and/or liquid from the ambient air 92, thereby to provide the at least partially filtered intake air 94 for operation of the GTE 16. For example, as shown, the one or more inertial separators 82 may include an air flow tube 138, a diverter 140, and/or a separator tube 142. As shown in FIG. 5F, the air flow tube 138 may have a proximal end 144 connected to the exterior panel 104, may extend toward the interior panel 106, and may terminate at a distal end 146. In some embodiments, the diverter 140 may be connected to the air flow tube 138 and may be positioned to cause the ambient air 92 entering the air flow tube 138 to swirl as the ambient air 92 flows from the proximal end 144 of the air flow tube 138 to the distal end 146 of the air flow tube 138, for example, as schematically depicted in FIG. 5F. For example, the diverter 140 may include one or more stator blades 148 presenting one or more curved surfaces to cause the ambient air 92 entering the air flow tube 138 to swirl as the ambient air 92 passes the one or more stator blades 148 and flows from the proximal end 144 of the air flow tube 138 to the distal end 146 of the air flow tube 138.

As shown in FIGS. 5E and 5F, in some embodiments, the separator tube 142 may be connected to the interior panel 106 and may extend from the interior panel 106 toward the distal end 146 of the air flow tube 138. The separator tube 142 may have a proximal end 150 connected to the interior panel 106 and may terminate at a distal end 152. As shown, in some embodiments, the air flow tube 138 may define an interior cross-sectional area, and the separator tube 142 may have an exterior cross-sectional area smaller than the interior cross-sectional area of the air flow tube 138, for example, and the distal end 152 of the separator tube 142 may be received in the distal end 146 of the air flow tube 138, such that the distal end 152 of the separator tube 142 terminates between the distal end 146 and the proximal end 144 of the air flow tube 138, for example, as shown in FIG. 5F.

In some embodiments, the separator tube 142 may be connected to the interior panel 106, such that an interior passage 154 of the separator tube 142 provides a first separator flow path 156 for the at least partially filtered intake air 94 to exit the inertial separator 82 through the interior passage 154 of the separator tube 142 and the interior hole 134 of the interior panel 106. For example, as shown in FIG. 5F, the separator tube 142 may be positioned relative to the distal end 146 of the air flow tube 138 to provide the first separator flow path 156 for the at least partially filtered intake air 94 to exit the pre-cleaner 80 through the interior passage 154 of the separator tube 142. In some embodiments, the distal end 146 of the air flow tube 138 may be connected to the separator tube 142 (e.g., at an exterior surface 158, as shown) and may at least partially define a second separator flow path 160 for the first portion of particles and/or liquid 162 to be separated from the ambient air 92 entering the inertial separator 82. For example, one or more struts 164 may connect the exterior surface 158 of the distal end 152 of the separator tube 142 to the distal end 146 of the air flow tube 138, for example, as shown in FIG. 5F.

In some embodiments, the second separator flow path 160 may be configured and/or positioned to deposit the first portion of the particles and/or liquid 162 into the separator cavity 108, for example, as shown in FIG. 5E. For example, the distal end 146 of the air flow tube 138 may terminate between the exterior panel 104 and the interior panel 106, thereby at least partially defining the second separator flow path 160 for the first portion of the particles and/or liquid 162 to be separated from the ambient air 92 entering the inertial separator 82, with the second separator flow path 160 passing between the exterior surface 158 of the separator tube 142 and an interior surface 166 of the air flow tube 138. As shown in FIG. 5F, in some embodiments, an interior passage 168 of the air flow tube 138, the interior passage 154 of the separator tube 142, and/or the exterior surface 158 of the separator tube 142 may have a substantially circular cross-sectional shape. Other cross-sectional shapes are contemplated.

Applicant has recognized that for some embodiments, for ambient air that flows through the pre-cleaners 80 via the inertial separators 82, as the velocity of the ambient air increases, the resistance or pressure against the flow of the ambient air also increases, which reduces the efficiency of operation and/or the power output of the GTE 16. Thus, reducing the velocity of the ambient air flowing through the pre-cleaner 80 via the inertial separators 82 may result in more efficient operation and/or a higher power output of the GTE 16. Applicant has also recognized that reducing the velocity of the ambient air flowing through the pre-cleaner 80 and the inertial separators 82 also reduces the effectiveness of the removal of particles and/or liquid from the ambient air passing through the inertial separators 82.

Some embodiments according to the present disclosure address the high pressure associated with high ambient air velocities and/or the reduced effectiveness of the particle and/or liquid separation by (1) reducing the cross-sectional area of the inertial separators 82 (e.g., by reducing the diameter of the inertial separators 82, for example, when the interior passage 168 of the air flow tube 138, the interior passage 154 of the separator tube 142, and/or the exterior surface 158 of the separator tube 142 have a substantially circular cross-sectional shape), and/or (2) providing relatively more inertial separators 82 per unit area of the pre-cleaner 80. By reducing the cross-sectional area of the inertial separators 82, the angular acceleration of particles and/or liquid in the ambient air 92 is increased for a given air flow velocity, which, in turn, causes the particles and/or liquid to be forced outward toward the interior surface 166 of the air flow tube 138 by the diverter 140 as the particles and/or liquid travel in a substantially helical path down the length of the air flow tube 138 between the proximal end 144 of the air flow tube 138 to the distal end 146 of the air flow tube 138 (see, e.g., FIG. 5F). Because the particles and/or liquid are forced outward by the relatively higher angular acceleration due to centrifugal force due to the smaller diameter, the particles and/or liquid travel radially outward relative to the distal end 152 of the separator tube 142 and follow the second separator flow path 160 into the separator cavity 108 of the pre-cleaner 80. The ambient air 92, separated from the particles and/or liquid that follows the second separator flow path 160, continues in through the interior passage 154 of the separator tube 142, following the first separator flow path 156. By reducing the cross-sectional area of the inertial separators 82, a relatively greater percentage of the particles and/or liquid in the ambient air 92 may be separated from the ambient air 92 by the inertial separators 82 for the ambient air 92 travelling at a given velocity. In some embodiments, this may facilitate reducing the velocity of the ambient air 92 flowing through the pre-cleaners 80 and thus reducing the pressure drop of the ambient air 92 passing through the pre-cleaners 80 to enhance operation of the GTE 16, while maintaining, or even increasing, the effectiveness of the separation of particles and/or liquid from the ambient air 92.

In addition, by reducing the cross-sectional area of the inertial separators 82, relatively smaller particles (e.g., fine silica dust) and/or liquid droplets in the ambient air 92 may be more effectively separated from the ambient air 92 by the inertial separators 82 for the ambient air 92 travelling at a given velocity. According to some embodiments, this may be desirable in environments in which hydraulic fracturing operations are being performed due to the smaller dust particles and/or liquid droplets, sometimes including gels, that are often present in the ambient air 92 in such environments. According to some embodiments, by increasing the number of inertial separators 82 for given surface area of a pre-cleaner 80, the volume of ambient air 92 flowing through the pre-cleaner 80 during operation of the GTE 16 may be substantially maintained, even though the cross-sectional area of the inertial separators 82 may be relatively reduced.

In some embodiments, the cross-sectional area of the inertial separators 82 may be substantially circular, and the inertial separators 82 (e.g., measured at the air flow tube 138) may have a diameter ranging from about 0.5 inches to about 6 inches, for example, from about 0.5 inches to about 5.5 inches, from about 0.5 inches to about 5.0 inches, from about 0.5 inches to about 4.5 inches, from about 0.5 inches to about 4.0 inches, from about 0.5 inches to about 3.5 inches, from about 0.5 inches to about 3.0 inches, from about 0.5 inches to about 2.5 inches, from about 0.5 inches to about 2.0 inches, or from about 1.0 inches to about 2.0 inches (e.g., about 1.5 inches). In some embodiments, the size of the diameter may be critical for balancing the effectiveness of the inertial separators 82 with the velocity of the flow of the ambient air 92 as it passes through the inertial separators 82, which results in effective separation of the particles and/or liquid from the ambient air 92 and reducing the pressure drop of the ambient air 92 as it flows through the inertial separators 82. For example, the cross-sectional area of the inertial separators 82 may be based, at least in part, on one or more parameters, such as, for example, the desired volume flow rate of the at least partially filtered intake air 94 through the pre-cleaners 80, the available space for the pre-cleaners 80, the maximum desired pressure drop through the pre-cleaners 80, and/or the air flow velocity through the pre-cleaners 80 desired to generate sufficient centrifugal force to achieve desired particle separation efficiencies (e.g., for particle size ranges and/or particle types desired to be separated by the pre-cleaners 80). Other parameters are contemplated.

In some embodiments, the distance between the exterior panel 104 and the interior panel 106 of the pre-cleaners 80 may range from about 1.0 inch to about 10.0 inches, for example, from about 1.5 inches to about 9.5 inches, from about 2.0 inches to about 9.0 inches, from about 2.5 inches to about 8.5 inches, from about 3.0 inches to about 8.0 inches, from about 3.5 inches to about 7.5 inches, from about 4.0 inches to about 7.0 inches, from about 4.5 inches to about 6.5 inches, or from about 5.0 inches to about 6.0 inches (e.g., about 5.5 inches). In some embodiments, the distance between the exterior panel 104 and the interior panel 106, and thus, length of the inertial separators 82 may be critical for balancing the effectiveness of the inertial separators 82 with the velocity of the flow of the ambient air 92 as it passes through the inertial separators 82, which results in effective separation of the particles and/or liquid from the ambient air 92 and reducing the pressure drop of the ambient air 92 as it flows through the inertial separators 82.

In some embodiments, the ratio of the distance between the exterior panel 104 and the interior panel 106 of the pre-cleaners 80 to the diameter of the inertial separators 82 (e.g., measured at the air flow tube 138), for example, when the air flow tube 82 has a substantially circular cross-section) may range from about 1:1 to about 10:1, for example, from about 1:1 to about 9:1, from about 1:1 to about 8:1, from about 1:1 to about 7:1, from about 1:1 to about 6:1, from about 1:1 to about 5:1, from about 1:1 to about 4:1, from about 1.5:1 to about 4:1, from about 2:1 to about 4:1, from about 2.5:1 to about 4:1, or from about 3:1 to about 4:1 (e.g., about 3.5:1). In some embodiments, this ratio may be critical for balancing the effectiveness of the inertial separators 82 with the velocity of the flow of the ambient air 92 as it passes through the inertial separators 82, which results in effective separation of the particles and/or liquid from the ambient air 92 and reducing the pressure drop of the ambient air 92 as it flows through the inertial separators 82.

In some embodiments, the pre-cleaners 80 may be configured to separate particles and/or liquid present in the ambient air 92, where the particles and/or liquid include one or more of mud, rain, ice, snow, leaves, sawdust, chaff, sand, dust (e.g., silica dust), proppant materials, gels (e.g., guar), and/or other possible contaminates that may be present in the ambient air surrounding, for example, a hydraulic fracturing operation. In some embodiments, the pre-cleaners 80 may be configured to separate particles and/or liquid present in the ambient air 92 having a median particle size and/or a median droplet size ranging from about 1.0 micrometer (micron) to about 15 microns, for example, from about 1.5 microns to about 14 microns, from about 2.0 microns to about 13 microns, from about 2.5 microns to about 12 microns, from about 2.5 microns to about 11 microns, from about 2.5 microns to about 10 microns, from about 2.5 microns to about 9 microns, from about 2.5 microns to about 8 microns, from about 2.5 microns to about 7 microns, from about 2.5 microns to about 6 microns, from about 2.5 microns to about 5 microns, or from about 2.5 microns to about 4 microns (e.g., about 3 microns). In some embodiments, the pre-cleaners 80 may be configured to separate particles and/or liquid present in the ambient air 92 having a median particle size and/or a median droplet size of about 5.0 microns or less, for example, of about 4.5 microns or less, of about 4.0 microns or less, of about 3.5 microns or less, of about 3.0 microns or less, of about 2.5 microns or less, of about 2.0 microns or less, of about 1.5 microns or less, or of about 1.0 micron or less. In some embodiments, the particle size may be critical for sizing the cross-section of the inertial separators 82 (e.g., selecting the diameter of the inertial separators 82 (e.g., measured at the air flow tube 138)) and/or the distance between the exterior panel 104 and the interior panel 106 of the pre-cleaners 80, for example, to balance the effectiveness of the inertial separators 82 with the velocity of the flow of the ambient air 92 as it passes through the inertial separators 82, which may result in effective separation of the particles and/or liquid from the ambient air 92 and reducing the pressure drop of the ambient air 92 as it flows through the inertial separators 82.

In some embodiments, the pre-cleaners 80 may be configured to separate a percentage of particles and/or liquid present in the ambient air 92 ranging from about 87% to about 97% by weight, for example, from about 88% to about 96% by weight, from about 89% to about 96% by weight, or from about 90% to about 95% by weight, for example, for coarse particles and/or liquid present in the ambient air 92 having a median particle size and/or a median droplet size ranging from about 2.5 microns to about 10 microns. In some embodiments, the pre-cleaners 80 may be configured to separate a percentage of particles and/or liquid present in the ambient air 92 ranging from about 70% to about 90% by weight, for example, from about 71% to about 89% by weight, from about 72% to about 88% by weight, from about 73% to about 87% by weight, from about 74% to about 86% by weight, from about 75% to about 85% by weight, for example, for fine particles and/or liquid present in the ambient air 92 having a median particle size and/or a median droplet size of about 2.5 microns or less.

Figure 6:
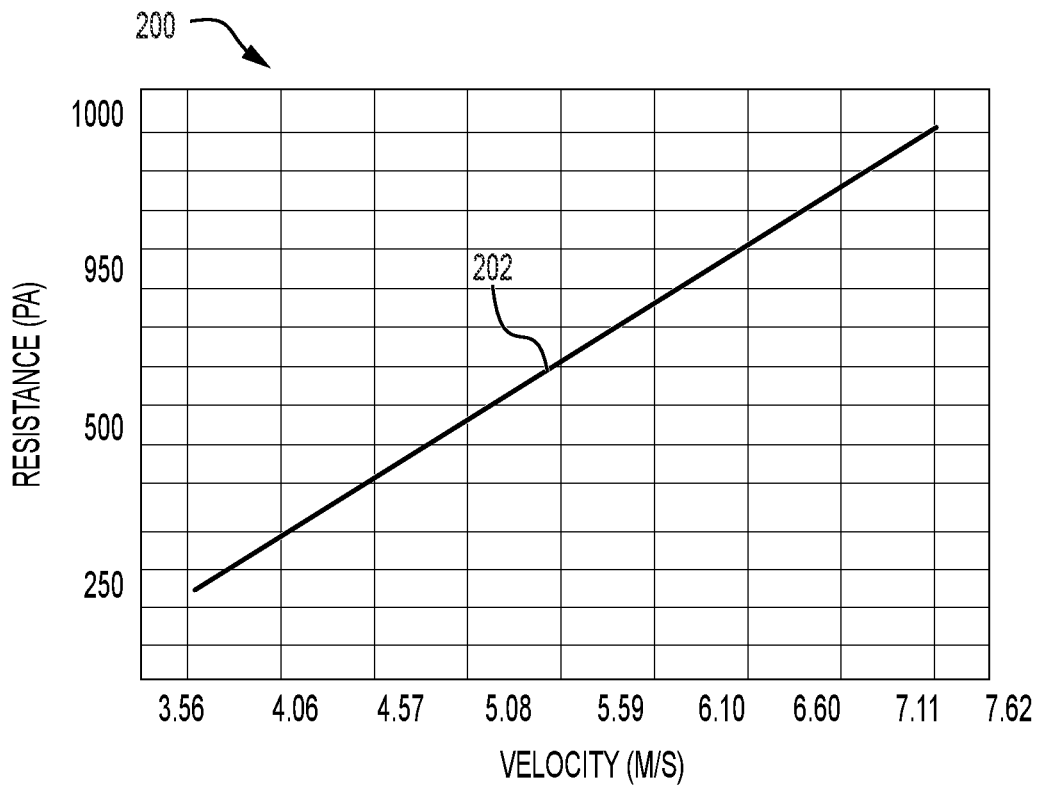
FIG. 6 is a graph showing backpressure as a function of air velocity through an example inertial separator, according to embodiments of the disclosure.

FIG. 6 is a graph 200 showing backpressure or pressure drop as a function of air velocity through an example inertial separator 82, according to embodiments of the disclosure. As shown by the example relationship 202 shown in FIG. 6, as the velocity of the ambient air flowing through the example inertial separator 82 increases, the resistance to flow through the inertial separator 82 also increases (e.g., the pressure drop through the example inertial separator 82 increases). Thus, as the velocity of the ambient air flowing through the example inertial separator 82 increases, the efficiency of operation of the GTE 16 may decrease and/or the power output of the GTE 16 may decrease, thereby potentially hindering operation of the GTE 16 and the hydraulic fracturing 3 operation.

Figure 7:
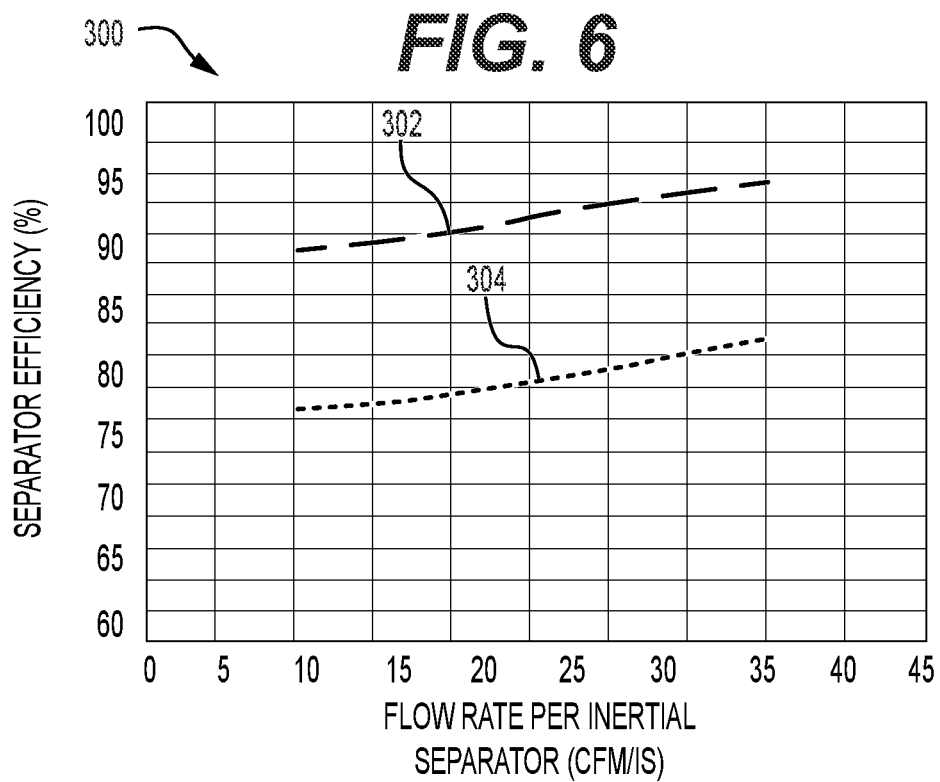
FIG. 7 is a graph showing inertial separator efficiency as a function of flow rate through an example inertial separator for example coarse particles and example fine particles, according to embodiments of the disclosure.

FIG. 7 is a graph 300 showing inertial separator efficiency as a function of flow rate through an example inertial separator 82 for example coarse particles 302 and example fine particles 304, according to embodiments of the disclosure. As shown by the example relationships 302 and 304 shown in FIG. 7, as the flow rate of the ambient air flowing through the example inertial separator 82 increases, the efficiency of the separation of particles from the ambient air by the example inertial separator 82 also increases. In addition, comparing the relationships 302 and 304 for course and fine particles shows that as the size of the particles present in the ambient air increases, the efficiency of the separation of the particles from the ambient air also increases for a given flow rate of the ambient air through the example inertial separator. Thus, although increasing the flow rate of the ambient air flowing through the example inertial separator 82 results in increasing the efficiency of the separation of particles, as shown in FIG. 6, this also increases the resistance to air flow through the example inertial separator, which, in turn, may adversely the effect of operation of the GTE 16, reducing the efficiency and/or power output of the GTE 16. As noted herein, some embodiments of the assemblies and/or processes according to embodiments described herein, may mitigate and/or overcome these potential drawbacks, as well as possibly others.

Figure 8:
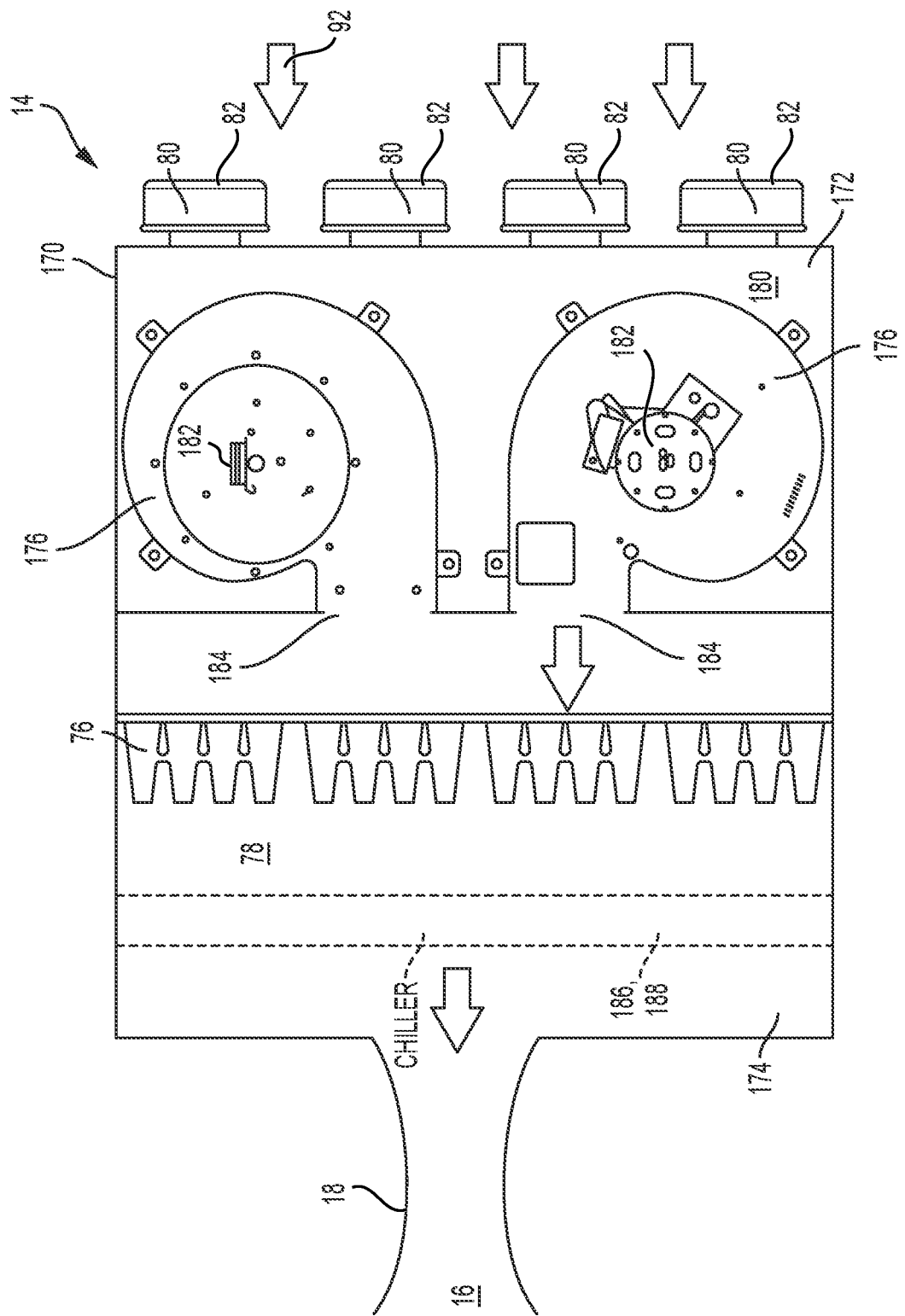
FIG. 8 is a schematic diagram of an embodiment of an intake air treatment assembly for increasing the efficiency of a gas turbine engine, according to embodiments of the disclosure.
Figure 9:
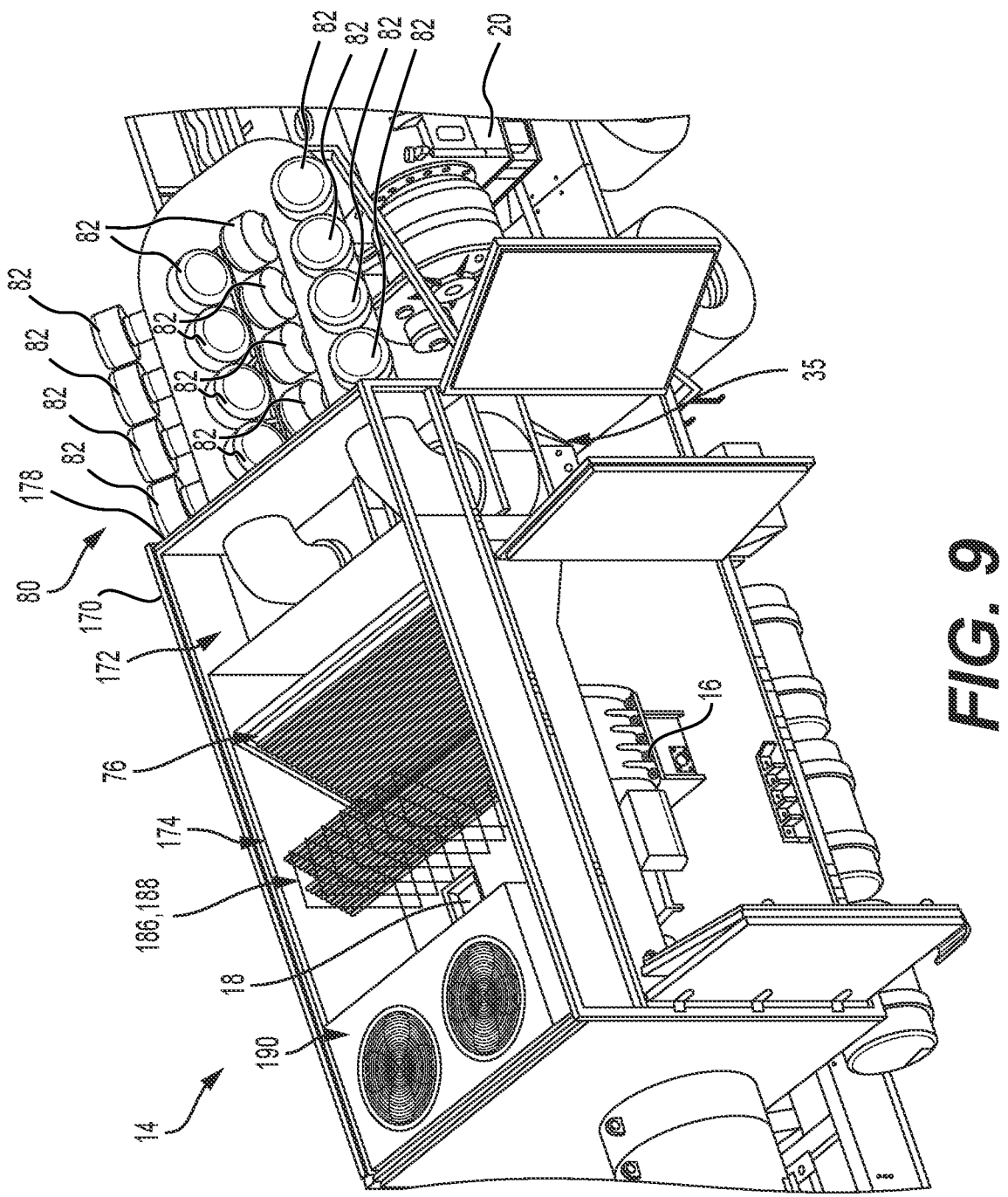
FIG. 9 shows an exemplary system setup of an air conditioning system for a gas turbine engine, according to embodiments of the disclosure.

Referring to FIGS. 8 and 9, another example intake air treatment assembly 14 is described for operation with an example GTE 16. In some embodiments, the GTE 16 may generally include, in serial flow arrangement, an inlet assembly 18 including an inlet for receiving and channeling ambient air 92 to a compressor of the GTE 16, which receives and compresses the ambient air 92, a combusting assembly that mixes fuel and the compressed ambient air 92, ignites the mixture, and allows for the gaseous by-product to flow to a turbine section, which transfers energy from the gaseous by-product to an output power. Other components of the GTE 16 may be used therein as will be understood by those skilled in the art.

In some embodiments, the intake air treatment assembly 14 may be incorporated into a hydraulic fracturing unit, for example, as described herein. For example, a hydraulic fracturing unit 12 may include a trailer 60 and a hydraulic fracturing pump 20 to pump fracturing fluid into a wellhead 42, with the hydraulic fracturing pump 20 connected to the trailer 60, for example, as described herein. The hydraulic fracturing unit 12 also may include the GTE 16 to drive the hydraulic fracturing pump 20, for example, via a transmission 22 (e.g., a reduction gearbox), and the intake air treatment assembly 14, in some embodiments, may be used to increase the efficiency of operation of the GTE 16.

A hydraulic fracturing operation may be performed generally at any geographic location and during any season of the year, often in harsh environmental conditions. As a result, hydraulic fracturing may occur under a wide variety of ambient temperatures and pressures, depending on the location and time of year. In addition, the load on hydraulic fracturing pumps and thus the GTEs may change or fluctuate greatly, for example, depending on the build-up and release of pressure in the formation being fractured during the fracturing operation. In some embodiments, the intake air treatment assembly 14 may be configured to increase the efficiency of operation of a GTE, for example, during operation in a wide variety of ambient conditions and/or under fluctuating loads. Performance losses may be expected at increased temperatures, increased altitude, and/or increased humidity when using a dual-fuel turbine system for a mobile hydraulic fracturing unit configured to drive a reciprocating hydraulic fracturing pump via a gearbox, or to drive a generator as part of a gen-set. These environmental conditions may lead to the air being less dense, which may adversely affect turbine system performance as the mass air flow through the air intake and one or more axial compression stages of the GTE are directly proportional to the power output of the GTE.

In some embodiments, as explained herein, the intake air treatment assembly 14 may include an air treatment housing 170, one or more pressure control assemblies 172, and one or more temperature control assemblies 174. In some embodiments, the filtration assembly 76 may be positioned between the one or more pressure control assemblies 170 and the inlet assembly 18 of the GTE 16. In some embodiments, the one or more pressure control assemblies 172 and/or one or more temperature control assemblies 174 may be configured to condition ambient air supplied to the GTE 16, for example, to cause a desired increase in the mass flow of air through the one or more axial compression stages of the GTE 16, thereby at least partially mitigating or overcoming any performance losses of the GTE 16 of a hydraulic fracturing unit 12 due to increased temperature, increased altitude, and/or increased humidity, while being able to respond to fluctuating loads.

As discussed herein, performance losses may be expected at increased temperature, increased altitude, and/or increased humidity, for example, when using a dual-fuel turbine system in a mobile application that is configured to drive a reciprocating hydraulic fracturing pump or drive a generator as part of a gen-set. These environmental conditions may lead to the air being less dense. The relative density of air may be an important factor for operation of a GTE as the mass air flow through the one or more axial compression stages may be directly proportional to the GTE's power output. The intake air treatment assembly 14, in some embodiments, may facilitate selective conditioning of intake air, which may cause a desired increase in air density of air entering the intake assembly of the GTE. For example, as described in more detail herein, in some embodiments, the intake air treatment assembly 14 may filter ambient air entering the intake air treatment assembly 14, may boost the pressure of ambient air entering the intake air treatment assembly 14, and/or may lower the temperature of the ambient air entering the intake air treatment assembly 14, for example, to increase the operating efficiency of the GTE.

For example, as schematically shown in FIG. 8, the example air treatment housing 170 may be configured to channel ambient air 92 towards the inlet assembly 18 of the GTE 16 and/or may be positioned upstream of the inlet assembly 18 of the GTE 16, which supplies a treated (e.g., filtered, pressure controlled, and/or temperature controlled (e.g., cooled)) flow of the ambient air to a compressor of the GTE 16. The air treatment housing 170 may include a filtration housing 78, a pressure control assembly 172, and/or a temperature control assembly 174 configured to facilitate structural integration into the inlet assembly 18 of the GTE 16. The integration of the inlet assembly 18 of the GTE 16 and the air treatment housing 170 may facilitate a more controlled flow of the ambient air flowing through pressure control assembly 172, the temperature control assembly 174, and/or the filtration assembly 76 and thereafter to the inlet assembly 18 of the GTE 16. The air treatment housing 170 may be connected to the inlet assembly 18 of the GTE 16 via, for example, a plenum and/or one or more connectors, such as, for example, one or more fasteners (e.g., screws, bolts, clamps, and/or rivets), adhesives, and/or welding. The air treatment housing 170 may be formed of, or may include, any one or more materials capable of supporting the air treatment housing 170. Such materials may include, for example, metal and/or other structural materials.

The pressure control assembly 172 may include one or more pre-cleaners 80 and one or more blower fans 176 configured to pressurize air entering the intake air treatment assembly 14. In some embodiments, the pressure control assembly 172 may be positioned at a proximal end 178 of the air treatment housing 170. The one or more pre-cleaners 80 may be in fluid communication with a first pressure control chamber 180 of the pressure control assembly 172, and the one or more blower fans 176 may be mounted in the first pressure control chamber 180 to pressurize air entering the first pressure control chamber 180 via the one or more pre-cleaners 80. In some embodiments, it is contemplated that the one or more pre-cleaners 80 separate or knock down debris, such as particles and/or liquid, present in the ambient air 92 entering the intake air treatment assembly 14, including mud, rain, ice, snow, leaves, sawdust, chaff, sand, dust (e.g., silica dust), proppant materials, gels (e.g., guar), and/or other possible contaminates. As shown in FIGS. 8 and 9, the pre-cleaners 80 may be, or include, inertial separators configured to continuously or intermittently eject particles and/or liquid before reaching a filtration assembly 76 that may be mounted internally within the air treatment housing 170, for example, without the need for further cleaning or shutting-down the associated hydraulic fracturing unit 12, for example, to replace one or more of the pre-cleaners 80.

In some embodiments, to at least partially compensate for any pressure drop through the one or more pre-cleaners 80 and/or to boost pressure and/or the flow rate of the air supplied to the GTE 16, the one or more blower fans 176, which may be operated by one or more motors, such as one or more electric motors, hydraulic motors, and/or pneumatic motors, may be provided and positioned to raise the overall air flow rate up to a desired air feed rate, such as, for example, about 28,000 cubic feet per minute (CFM), to increase an inlet pressure at the inlet of the GTE 16 with a resultant increase in efficiency of operation of the GTE 16. In some embodiments, for example, as schematically shown in FIG. 8, at least one of the one or more blower fans 176 may be connected to a motor 182 and may be positioned in the first pressure control chamber 180 of the pressure control assembly 172 to boost the pressure of intake air to a desired level after any pressure drop created as the ambient air 92 passes through the one or more pre-cleaners 80 and into the filtration assembly 76 downstream of the pressure control assembly 172. The one or more blower fans 176 may include a squirrel-cage blower fan and/or any other suitable types of blower fans, such as other conventional electrically, hydraulically, or pneumatically powered blower fans, such as vane axial fans. In some embodiments, the intake air treatment assembly 14 may be integrated with a bypass configured to circumvent the pressure control assembly 172, for example, to mitigate or reduce any pressure drop created when, for example, the pressure control assembly 172 is not operating.

In some embodiments, the one or more blower fans 176 may pressurize the air exiting the pressure control assembly 172 to a degree sufficient to at least partially overcome any pressure drop associated with air passing through the one or more pre-cleaners 80 positioned upstream and/or associated with the air passing through the pressure control assembly 172 positioned downstream relative to the pressure control assembly 172, and, if used, any downstream filtration assembly 76 positioned upstream of the pressure control assembly 172, as well as any other losses the system may encounter, such as rarefication of the inlet air to the one or more blower fans 176. For example, a downstream filter assembly 76 may include a pre-filter 88 and/or a final filter 90, such as a high-efficiency filter, a conventional vane inlet with a low cartridge-type pre-filter, and/or bag-type pre-filter that would be suitable for filtration, periodic cleaning, and/or replacement.

It is contemplated that the one or more blower fans 176 may be relatively oversized to allow for further pressurization of the air at the downstream inlet of the GTE 16. Such relative oversizing may allow for suitable compensation for the loss of atmospheric pressure and air density, for example, associated with higher geographic elevations. The change in pressure due to a change in elevation may be calculated via the following equation:

$$P = P_b \left[ \frac{T_b}{T_b + L_b(H - H_b)} \right]^{\frac{g_0 M}{R^* L_b}}$$

where:
P=local atmospheric pressure;
$P_b$=static pressure at sea level;
$T_b$=temperature at sea level;
$L_b$=temperature lapse rate;
$H_b$=elevation at sea level;
H=local elevation;
R*=universal gas constant;
$g_0$=gravity; and
M=molar mass of air.

Figure 10:
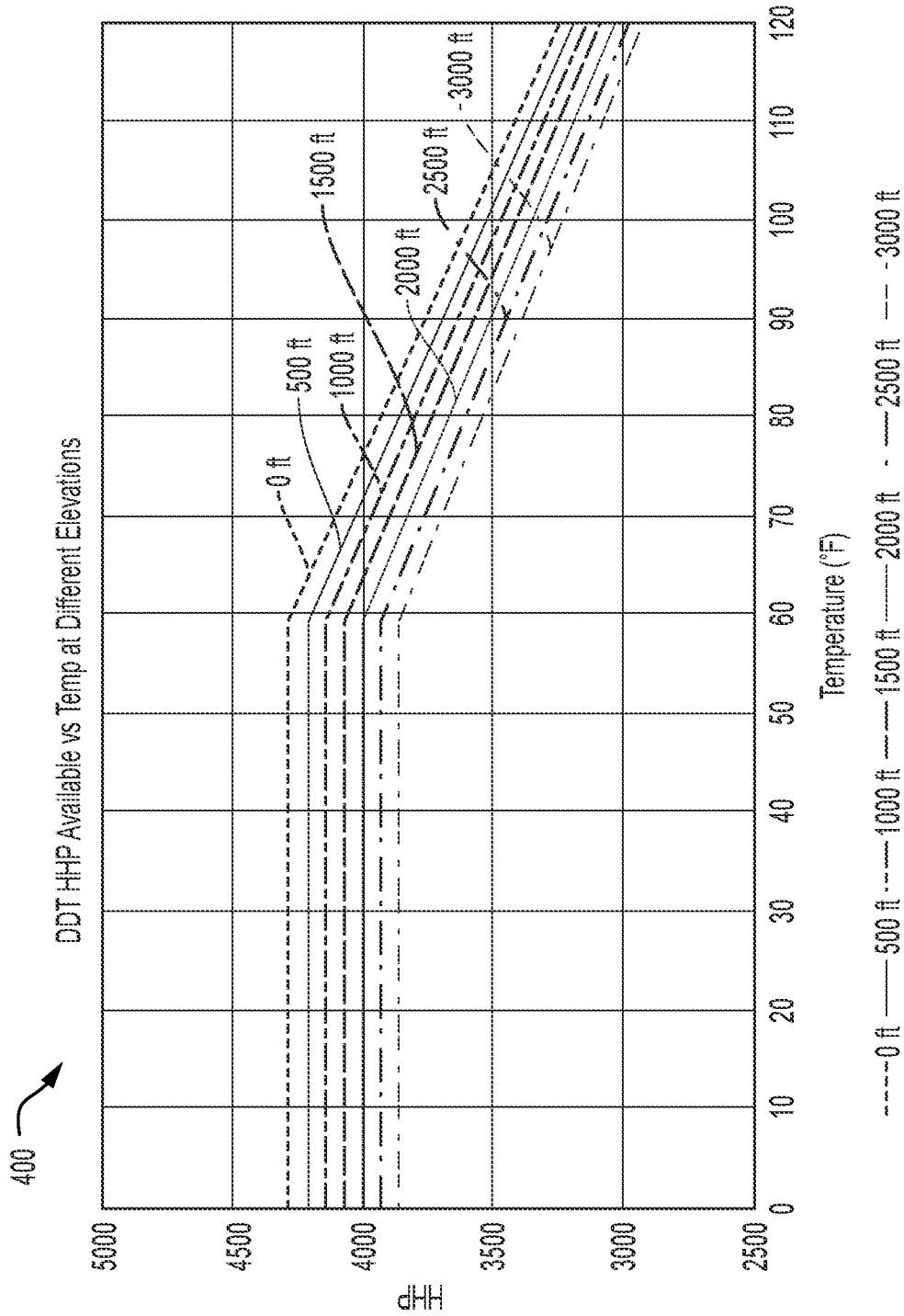
FIG. 10 illustrates example performance loss of the gas turbine engine with increased temperature, according to embodiments of the disclosure.

From the calculated pressure, a new or corrected density of the air at the constant atmospheric pressure may be calculated. FIG. 10 is a graph 400 showing the change in pressure as a function of increased elevation. It also shows the calculated density in reference to temperature change and elevation change.

$$\rho = \frac{p}{R_{sp}T}$$

where:
P=absolute pressure;
ρ=density;
T=absolute temperature; and
$R_{SP}$=specific gas constant.

Referring now to FIG. 11, the conventional factor for performance loss of the GTE 16 with increased temperature is a 0.4% to about 0.5% reduction in performance for every one degree Fahrenheit (F) increase over 59 degrees F. For example, as shown in the graph 400, at 500 feet elevation, reducing the air temperature from about 100 degrees F. to about 90 degrees F., results in an output power increase from an example GTE of about 140 horsepower, or about 4%. This example increase in output power results from the temperature decreasing while maintaining a constant air pressure. The ideal gas law equation may be used to calculate the density of the air as a function of the change in temperature.

FIG. 11 illustrates, in tabular form, air properties at different elevations and temperatures. As shown in FIG. 11, for example, at an altitude of 500 feet, a decrease in air temperature from about 100 degrees F. to about 90 degrees F. will result in a density increase of 0.0013 lbm/ft³, or about a 1.8% increase in density. For at least some embodiments of GTE 16, for every percentage of air density increase, the power output efficiency of the GTE 16 may increase by about 2.2%.

As shown in FIG. 8, in some embodiments, the first pressure control chamber 180 of the pressure control assembly 172 may be in fluid communication with a filtration chamber 84 of a filtration housing 78 via at least one outlet 184 of the air conditioning assembly 172. In some embodiments, the pressure control assembly 172 may further include one or more drift eliminators and/or coalescer pads configured to, for example, reduce the amount of liquid in the air flowing through the pressure control assembly 172.

In some embodiments, the one or more temperature control assemblies 174 may be provided for adjusting the temperature of the airstream passing through the air treatment housing 170 and toward the inlet assembly 18 of the GTE 16, and, in some embodiments, may be positioned or mounted downstream of the pressure control assembly 172. The airstream may enter the one or more temperature control assemblies 174 at a first temperature and exits the one or more temperature control assemblies 174 a second temperature, for example, as a second temperature lower than the first temperature. In some embodiments, the one or more temperature control assemblies 174 may include, for example, one or more chillers and/or other devices (e.g., air conditioning units) configured to reduce the temperature of the air flowing through the one or more temperature control assemblies 174. In some embodiments, the specific form of the one or more temperature control assemblies 174 may be tailored based, at least in part, on the configuration of the GTE 16, for example.

In some embodiments, the one or more temperature control assemblies 174 may include one or more chiller assemblies 186. For example, the one or more chiller assemblies 186 may include an arrangement of condenser coils 188 disposed in the air treatment housing 170 and configured to at least partially span the width of the air treatment housing 170, such that, for example, the airstream passes through and/or around the condenser coils 188 to reduce the temperature of the airstream that is directed downstream toward the inlet assembly 18 of the GTE 16. The condenser coils 188 may be in fluid communication with a source of pressurized chilled refrigerant. The refrigerant may be any conventional refrigerant, such as, for example, R22, R410a, and/or similar refrigerants. In some embodiments, the refrigerant may be cooled to about 45 degrees F., although the refrigerant may be cooled to other desired temperature based at least partially on the operating conditions of the hydraulic fracturing unit 12 and/or the GTE 16.

It is contemplated that the one or more temperature control assemblies 174 may decrease the temperature of the airstream entering the inlet assembly 18 of the GTE 16 to increase the efficiency and/or power output of the GTE 16. For example, the one or more temperature control assemblies 174 may decrease a temperature of the airstream by an amount ranging from about 2 degrees F. to about 20 degrees F., for example, from about 5 degrees F. and about 10 degrees F. In some applications, increasing the efficiency and/or the power output of the GTE 16 may result in more efficient operations. For example, in a hydraulic fracturing operation including multiple hydraulic fracturing units 12, each operating a GTE 16 to supply power to drive respective hydraulic fracturing pumps 20, such increases in efficiency and/or power output may facilitate reducing the number the GTEs 16 and/or hydraulic fracturing units being operated, while still providing sufficient power to achieve or exceed desired fracturing fluid pressures and/or flow rates for completion of the hydraulic fracturing operation.

In some embodiments, in elevational cross-sectional view, the condenser coils 188 of the chiller assemblies 186 may have a substantially planar shape, may be W-shaped, V-shaped, or other geometric shapes. The chiller assemblies 186 further may be configured to provide a source of pressurized and/or chilled refrigerant. For example, the chiller assemblies 186 may include a one or more compressors 190 incorporated into a refrigeration cycle and configured to supply pressurized and/or chilled refrigerant to the condenser coils 188. The one or more compressors 190 may include one or more of the following types of compressors: a reciprocating compressor, a scroll compressor, a screw compressor, a rotary compressor, a centrifugal compressor, and/or other known compressor types suitable for providing compressed refrigerant. In some embodiments, the source of pressurized chilled supply may be provided by one or more chill lines carrying pressurized refrigerant, for example, that may be routed through and/or around a cooling source, such as, for example, at least one gas source in liquid form.

In some embodiments, the condenser coils 188 may be placed in an existing radiator package, for example, associated with the hydraulic fracturing unit 12 and/or the hydraulic fracturing operation, where lube coolers and/or engine coolers for the GTE 16 are housed. In some embodiments, the condenser coils 188 may be packaged along with the one or more compressors 190 and an expansion valve of a refrigeration cycle system.

Figure 12:
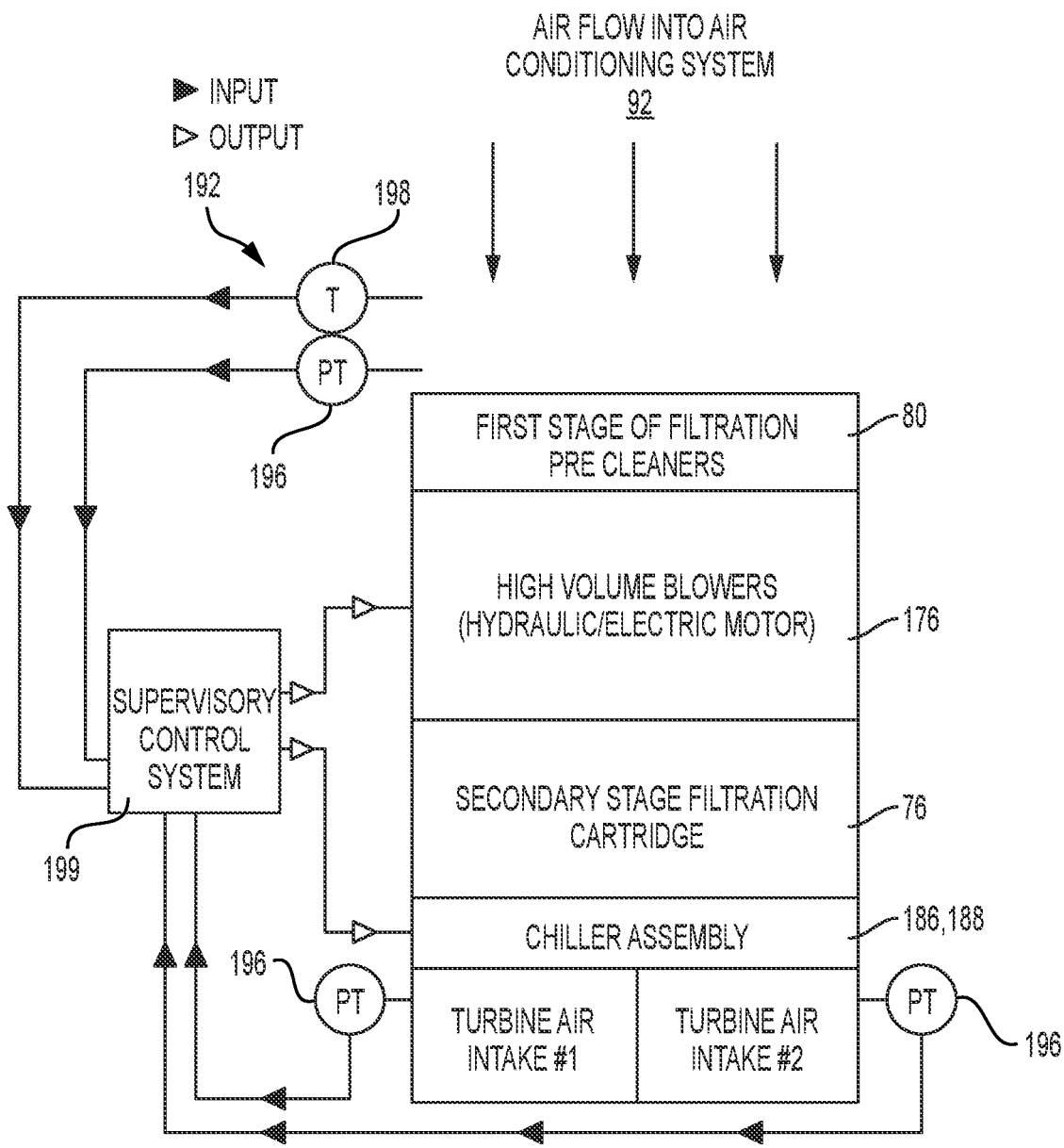
FIG. 12 is a schematic diagram of an example electrical system for operating an example intake air treatment assembly, according to embodiments of the disclosure.
Figure 13:
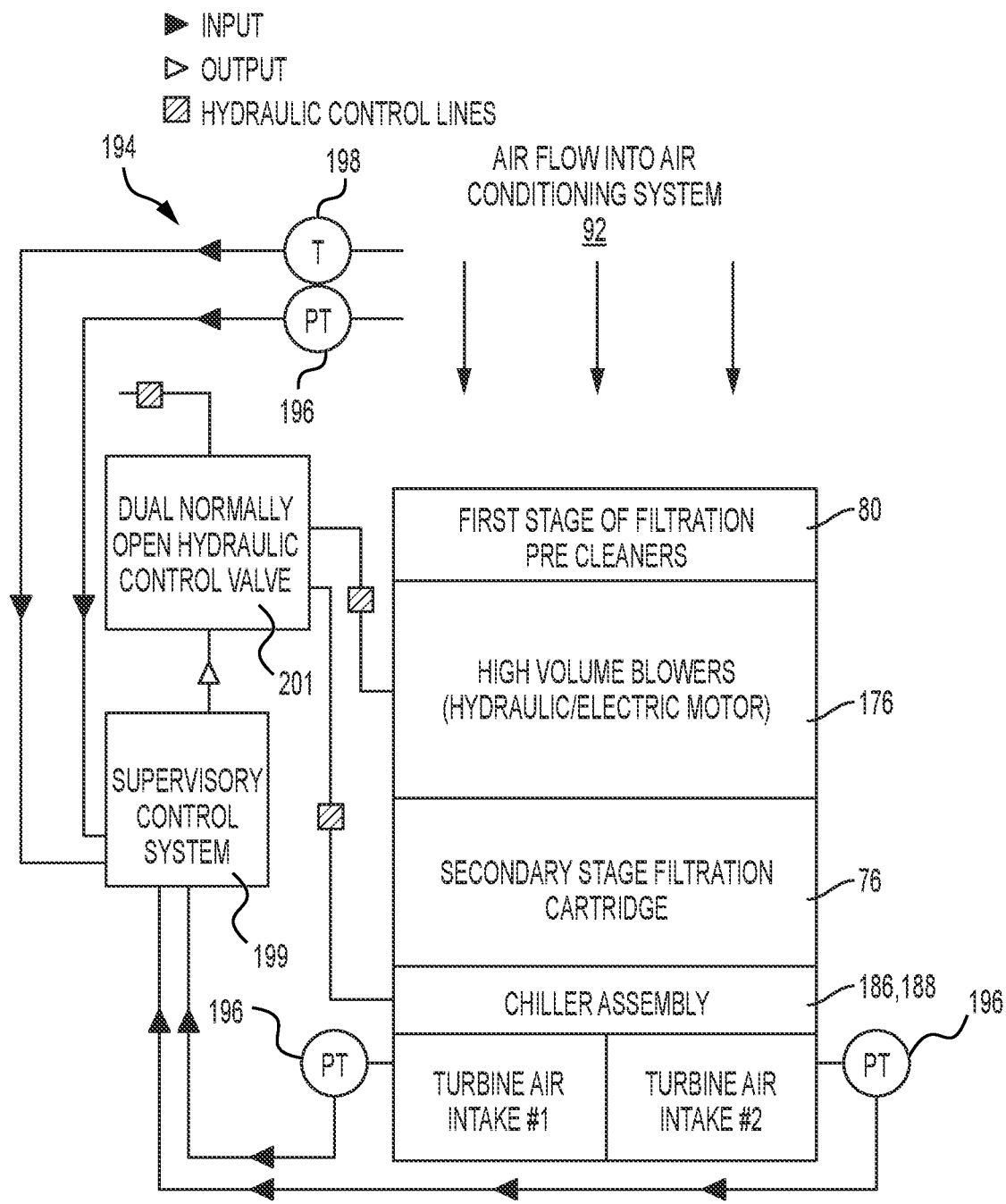
FIG. 13 is a schematic diagram of an example hydraulic system for operating an example intake air treatment system, according to embodiments of the disclosure.

FIG. 12 and FIG. 13 are schematic diagrams of an example electrical assembly 192 and an example hydraulic assembly 194, respectively, for operating examples of intake air treatment assemblies 14, according to embodiments of the disclosure. For example, in some embodiments, it is contemplated that the pressure control assembly 172 and/or one or more of the temperature control assemblies 174 may not be operated at a constant speed or power output. For example, during a cold day with low humidity and/or at a low elevation, the intake air treatment assembly 14 may only utilize the one or more pre-cleaners 80 and/or the one or more filters 86 of the filtration assembly 76. In some embodiments, the one or more blower fans 176 may be selectively engaged to increase the likelihood or ensure that any pressure drop across the pre-cleaners 80 and/or filters 86 is within the GTE manufacturer's guidelines, and/or that one or more of the blower fans 176 will not be run at the respective blower fan's flowrate rating (e.g., cubic feet per minute), nor will one or more of the temperature control assemblies 174 attempt to reduce the temperature of the air to an unnecessarily low temperature. For example, as shown in FIGS. 12 and 13, the pressure control assembly 172 and at least one temperature control assembly 174 may be selectively controlled via proportional motor control that may be operatively configured to function through a combination of the use of programmable VFDs, a PLC control system, an instrumentation, and/or a hydraulic control system.

In some embodiments, ISO conditions of 59 degrees F., 14.696 pounds per square inch atmospheric pressure, at sea level, and 60% relative humidity, may be used as baseline operating levels for control of the intake air treatment assembly 14, for example, because these parameters may often be used to rate a GTE for service.

As shown in FIG. 12, in some embodiments, the intake air treatment assembly 14 may be configured to use one or more signals from one or more sensors, such as atmospheric pressure sensors 196 and/or temperature sensors 198 to facilitate monitoring of, for example, air density through the data inputs and calculating, at a desired sample rate, the density in reference to temperature change and elevation change. It is contemplated that the pressure drop through the one or more pre-cleaners 80 and/or the one or more filters 86 may be monitored via two or more pressure sensors 196, which may be positioned, for example, at the intake of the one or more pre-cleaners 80 and/or filters 86, and at the intake assembly 18 of the GTE 16. A pressure differential between the pressure sensors 196 of the different locations may facilitate the intake air treatment assembly 14 to control operation of the one or more blower fans 176, for example, so that they operate at a desired speed to reduce, mitigate, or overcome any sensed pressure drop between the sensor locations.

In some embodiments, the intake air treatment assembly 14 may include a supervisory control system 199, which may be used to at least partially control operation of the pressure control assembly 172 and/or the temperature control assembly 174. In the event there is a loss of one or more control signals from the supervisory control system 199, the one or more chiller assemblies 186 and/or the one or more blower fans 176 may be configured to automatically revert to operation at maximum output as a failsafe and/or to ensure that operation of the GTE 16 is not ceased. During operation, the pressure sensors 196 and/or the temperature sensors 198 may be configured to provide continuous or intermittent feedback to the supervisory control system 199. In some embodiments, during normal operation, the supervisory control system 199 may be configured to detect a deficiency of the inlet airstream, such as a high temperature and/or a pressure drop, and may further be configured to generate one or more control signals to the blower fan motors and/or the one or more temperature control assemblies, for example, to condition the airstream to mitigate or overcome the environmental losses. In some embodiments, the supervisory control system 199 may include, for example, a PLC, micro-controllers, computer-based controllers, and the like as will be understood by those skilled in the art.

FIG. 13 schematically illustrates an example use of hydraulic power to operate one or more hydraulic motors connected to the one or more blower fans 176 (e.g., if hydraulically powered blower fans are used), and hydraulically-powered fans connected to the one or more temperature control assemblies 174 (e.g., if used). In some such embodiments, one or more proportional hydraulic control valves 201 may be provided and configured to receive operational input from the supervisory control system 199, for example, for selective operation of a spool to control the supply of hydraulic fluid to the temperature control system 174.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

This application is a continuation-in-part of U.S. Non-Provisional application Ser. No. 17/954,118, filed Sep. 27, 2022, titled "MOBILE GAS TURBINE INLET AIR CONDITIONING SYSTEM AND ASSOCIATED METHODS," which is a continuation of U.S. Non-Provisional application Ser. No. 17/403,373, filed Aug. 16, 2021, titled "MOBILE GAS TURBINE INLET AIR CONDITIONING SYSTEM AND ASSOCIATED METHODS," which is a continuation of U.S. Non-Provisional application Ser. No. 17/326,711, filed May 21, 2021, titled "MOBILE GAS TURBINE INLET AIR CONDITIONING SYSTEM AND ASSOCIATED METHODS," now U.S. Pat. No. 11,156,159, issued Oct. 26, 2021, which is a continuation U.S. Non-Provisional application Ser. No. 17/213,802, filed Mar. 26, 2021, titled "MOBILE GAS TURBINE INLET AIR CONDITIONING SYSTEM AND ASSOCIATED METHODS," now U.S. Pat. No. 11,060,455, issued Jul. 13, 2021, which is a continuation of U.S. Non-Provisional application Ser. No. 16/948,289, filed Sep. 11, 2020, titled "MOBILE GAS TURBINE INLET AIR CONDITIONING SYSTEM AND ASSOCIATED METHODS," now U.S. Pat. No. 11,002,189, issued May 11, 2021, which claims priority to and the benefit of U.S. Provisional Application No. 62/704,565, filed May 15, 2020, titled "MOBILE GAS TURBINE INLET AIR CONDITIONING SYSTEM AND ASSOCIATED METHODS," and U.S. Provisional Application No. 62/900,291, filed Sep. 13, 2019, titled "MOBILE GAS TURBINE INLET AIR CONDITIONING SYSTEM," the disclosures of which are incorporated herein by reference in their entireties.

The scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A pre-cleaner to enhance the efficiency of separation of one or more of particles or fluid from intake air supplied to a gas turbine engine, the pre-cleaner comprising:
a first panel positioned to face outward from a filtration assembly;
a second panel opposite the first panel, the first panel and the second panel at least partially defining a separator cavity therebetween; and
one or more inertial separators extending between the first panel and the second panel, the one or more inertial separators being positioned to separate a portion of one or more of particles or liquid from ambient air, thereby to provide at least partially filtered intake air for supply to the gas turbine engine, the one or more inertial separators comprising:
an air flow tube having a proximal end connected to the first panel, extending toward the second panel, and terminating at a distal end, the air flow tube defining an interior cross-sectional area;
a diverter connected to the air flow tube and positioned to cause ambient air entering the air flow tube to swirl as the ambient air flows from the proximal end of the air flow tube to the distal end of the air flow tube; and
a separator tube connected to the second panel and extending from the second panel toward the distal end of the air flow tube, the separator tube having an exterior cross-sectional area smaller than the interior cross-sectional area of the air flow tube.

2. The pre-cleaner of claim 1, wherein the separator tube is positioned relative to the distal end of the air flow tube to provide:
a first separator flow path for the at least partially filtered intake air to exit the pre-cleaner through an interior passage of the separator tube; and
a second separator flow path for the first portion of the one or more of particles or liquid to be separated from the ambient air entering the inertial separator, the second separator flow path passing between an exterior surface of the separator tube and an interior surface of the air flow tube.

3. The pre-cleaner of claim 1, wherein the diverter comprises one or more stator blades presenting one or more curved surfaces to cause the ambient air entering the air flow tube to swirl as the ambient air passes the one or more stator blades and flows from the proximal end of the air flow tube to the distal end of the air flow tube.

4. The pre-cleaner of claim 1, wherein the second panel at least partially defines an interior hole, and the separator tube is connected to the second panel such that an interior passage of the separator tube provides a first separator flow path for the at least partially filtered intake air to exit the inertial separator through the interior passage of the separator tube and the interior hole of the second panel.

5. The pre-cleaner of claim 4, wherein the air flow tube is connected to an exterior surface of the separator tube and at least partially defines a second separator flow path for the first portion of the one or more of particles or liquid to be separated from the ambient air entering the inertial separator, the second separator flow path being positioned to deposit the first portion of the one or more of particles or liquid into the separator cavity.

6. The pre-cleaner of claim 5, wherein the distal end of the air flow tube terminates between the first panel and the second panel, thereby at least partially defining the second separator flow path.

7. The pre-cleaner of claim 1, further comprising a pre-cleaner bypass connected to one or more of the first panel or the second panel and positioned to receive a portion of the ambient air not flowing through the second panel and the portion of the one or more of particles or liquid separated from the ambient air.

8. The pre-cleaner of claim 1, wherein one or more of an interior passage of the air flow tube, an interior passage of the separator tube, or an exterior surface of the separator tube has a substantially circular cross-sectional shape.

9. The pre-cleaner of claim 1, wherein:
the pre-cleaner comprises a plurality of inertial separators; and
one or more of the first panel or the second panel at least partially defines an upper end and a lower end, and the plurality of inertial separators are arranged in groups extending diagonally between the upper end and the lower end of the pre-cleaner.

10. The pre-cleaner of claim 1, wherein the pre-cleaner comprises one or more flanges extending outward from a perimeter of the pre-cleaner and providing a connection for connecting the pre-cleaner to a filtration assembly via the one or more flanges.

11. An intake air treatment assembly to enhance the efficiency of operation of a gas turbine engine including an inlet assembly positioned to supply intake air to the gas turbine engine, the intake air treatment assembly comprising:
 a turbine housing configured to at least partially enclose the gas turbine engine and the inlet assembly and positioned to facilitate supply of intake air to the inlet assembly of the gas turbine engine;
 a filtration assembly connected to the turbine housing and positioned to provide a flow path to supply at least partially filtered intake air to the inlet assembly of the gas turbine engine, the filtration assembly comprising:
  a pre-cleaner positioned to receive ambient air drawn into the filtration assembly via operation of the gas turbine engine and comprising one or more inertial separators configured to separate a first portion of one or more of particles or liquid from the ambient air, thereby to provide at least partially filtered intake air; and
  one or more filters positioned in the flow path downstream of the pre-cleaner and configured to separate a second portion of the one or more of particles or liquid from the at least partially filtered intake air, thereby to provide the at least partially filtered intake air to the inlet assembly of the gas turbine engine.

12. The intake air treatment assembly of claim 11, wherein the pre-cleaner comprises:
 an exterior panel facing outward from the filtration assembly; and
 an interior panel opposite the exterior panel and facing inward toward an interior of the filtration assembly, the one or more inertial separators extending between the exterior panel and the interior panel.

13. The intake air treatment assembly of claim 12, wherein the one or more inertial separators comprise:
 an air flow tube having a proximal end connected to the exterior panel, extending toward the interior panel, and terminating at a distal end, the air flow tube defining an interior cross-sectional area;
 a diverter connected to the air flow tube and positioned to cause ambient air entering the air flow tube to swirl as the ambient air flows from the proximal end of the air flow tube to the distal end of the air flow tube; and
 a separator tube connected to the interior panel and extending from the interior panel toward the distal end of the air flow tube, the separator tube having an exterior cross-sectional area smaller than the interior cross-sectional area of the air flow tube.

14. The intake air treatment assembly of claim 13, wherein the separator tube is positioned relative to the distal end of the air flow tube to provide:
 a first separator flow path for the at least partially filtered intake air to exit the pre-cleaner through an interior passage of the separator tube; and
 a second separator flow path for the first portion of the one or more of particles or liquid to be separated from the ambient air entering the inertial separator, the second separator flow path passing between an exterior surface of the separator tube and an interior surface of the air flow tube.

15. The intake air treatment assembly of claim 13, wherein the diverter comprises one or more stator blades presenting one or more curved surfaces to cause the ambient air entering the air flow tube to swirl as the ambient air passes the one or more stator blades and flows from the proximal end of the air flow tube to the distal end of the air flow tube.

16. The intake air treatment assembly of claim 13, wherein the interior panel at least partially defines an interior hole, and the separator tube is connected to the interior panel such that an interior passage of the separator tube provides a first separator flow path for the at least partially filtered intake air to exit the inertial separator through the interior passage of the separator tube and the interior hole of the interior panel.

17. The intake air treatment assembly of claim 16, wherein:
 the exterior panel and the interior panel at least partially define a separator cavity therebetween; and
 the air flow tube is connected to an exterior surface of the separator tube and at least partially defines a second separator flow path for the first portion of the one or more of particles or liquid to be separated from the ambient air entering the inertial separator, the second separator flow path being positioned to deposit the first portion of the one or more of particles or liquid into the separator cavity.

18. The intake air treatment assembly of claim 17, wherein the distal end of the air flow tube terminates between the exterior panel and the interior panel, thereby at least partially defining the second separator flow path.

19. The intake air treatment assembly of claim 13, wherein one or more of an interior passage of the air flow tube, an interior passage of the separator tube, or an exterior surface of the separator tube has a substantially circular cross-sectional shape.

20. The intake air treatment assembly of claim 11, further comprising a pre-cleaner collector connected to the pre-cleaner and positioned to receive the first portion of the one or more of particles or liquid separated from the ambient air.

21. The intake air treatment assembly of claim 11, wherein the one or more filters comprise one or more of a pre-filter or a final filter.

22. The intake air treatment assembly of claim 21, wherein the one or more filters comprise the pre-filter downstream of the pre-cleaner and the final filter downstream of the pre-filter.

23. The intake air treatment assembly of claim 21, wherein the one or more of a pre-filter or a final filter comprises one or more of a medium-efficiency intermediate filter or a high-efficiency final filter.

24. The intake air treatment assembly of claim 21, wherein the one or more of a pre-filter or a final filter comprises one or more of a cartridge-type pre-filter or a bag-type pre-filter.

25. The intake air treatment assembly of claim 11, wherein the pre-cleaner comprises a plurality of inertial separators.

26. The intake air treatment assembly of claim 25, wherein:
 the pre-cleaner comprises an exterior panel facing outward from the filtration assembly and an interior panel opposite the exterior panel and facing inward toward an interior of the filtration assembly; and
 one or more of the exterior panel or the interior panel at least partially defines an upper end and a lower end, and the plurality of inertial separators are arranged in groups extending diagonally between the upper end and the lower end of the pre-cleaner.

27. The intake air treatment assembly of claim 11, wherein the pre-cleaner comprises one or more flanges extending outward from a perimeter of the pre-cleaner, and the pre-cleaner is connected to the filtration assembly via the one or more flanges.

28. The intake air treatment assembly of claim 11, wherein the filtration assembly comprises a plurality of pre-cleaners.

29. The intake air treatment assembly of claim 28, wherein:
the filtration assembly comprises a filtration housing connected to the turbine housing, the filtration housing and the plurality of pre-cleaners at least partially defining a filtration chamber; and
the one or more filters are positioned in the filtration chamber.

30. The intake air treatment assembly of claim 29, further comprising one or more sound attenuation baffles positioned in the filtration chamber to attenuate sound generated during operation of the gas turbine engine.

31. The intake air treatment assembly of claim 29, wherein the filtration housing comprises one or more access panels positioned to facilitate access to the filtration chamber.

32. A hydraulic fracturing unit to enhance flow of fracturing fluid into a wellhead during a high-pressure fracturing operation, the hydraulic fracturing unit comprising:
a chassis having a longitudinal chassis axis and a width perpendicular to the longitudinal chassis axis;
a gas turbine engine supported by the chassis;
an inlet assembly connected to the gas turbine engine to supply intake air to the gas turbine engine;
a hydraulic fracturing pump connected to the gas turbine engine; and
an intake air treatment assembly associated with the intake assembly to enhance the efficiency of operation of the gas turbine engine, the intake air treatment assembly comprising:
a turbine housing at least partially enclosing the gas turbine engine and the inlet assembly and positioned to facilitate supply of intake air to the inlet assembly of the gas turbine engine;
a filtration assembly connected to the turbine housing and positioned to provide a flow path to supply at least partially filtered intake air to the inlet assembly, the filtration assembly comprising:
a pre-cleaner positioned to receive ambient air drawn into the filtration assembly via operation of the gas turbine engine and comprising one or more inertial separators configured to separate a first portion of one or more of particles or liquid from the ambient air, thereby to provide at least partially filtered intake air; and
one or more filters positioned in the flow path downstream of the pre-cleaner and configured to separate a second portion of the one or more of particles or liquid from the at least partially filtered intake air, thereby to provide the at least partially filtered intake air to the inlet assembly of the gas turbine engine.

33. The hydraulic fracturing unit of claim 32, wherein the pre-cleaner comprises:
an exterior panel facing outward from the filtration assembly; and
an interior panel opposite the exterior panel and facing inward toward an interior of the filtration assembly, the one or more inertial separators extending between the exterior panel and the interior panel.

34. The hydraulic fracturing unit of claim 33, wherein the one or more inertial separators comprise:
an air flow tube having a proximal end connected to the exterior panel, extending toward the interior panel, and terminating at a distal end, the air flow tube defining an interior cross-sectional area;
a diverter connected to the air flow tube and positioned to cause ambient air entering the air flow tube to swirl as the ambient air flows from the proximal end of the air flow tube to the distal end of the air flow tube; and
a separator tube connected to the interior panel and extending from the interior panel toward the distal end of the air flow tube, the separator tube having an exterior cross-sectional area smaller than the interior cross-sectional area of the air flow tube.

35. The hydraulic fracturing unit of claim 34, wherein the separator tube is positioned relative to the distal end of the air flow tube to provide:
a first separator flow path for the at least partially filtered intake air to exit the pre-cleaner through an interior passage of the separator tube; and
a second separator flow path for the first portion of the one or more of particles or liquid to be separated from the ambient air entering the inertial separator, the second separator flow path passing between an exterior surface of the separator tube and an interior surface of the air flow tube.

36. The hydraulic fracturing unit of claim 34, wherein the diverter comprises one or more stator blades presenting one or more curved surfaces to cause the ambient air entering the air flow tube to swirl as the ambient air passes the one or more stator blades and flows from the proximal end of the air flow tube to the distal end of the air flow tube.

37. The hydraulic fracturing unit of claim 34, wherein the interior panel at least partially defines an interior hole, and the separator tube is connected to the interior panel such that an interior passage of the separator tube provides a first separator flow path for the at least partially filtered intake air to exit the inertial separator through the interior passage of the separator tube and the interior hole of the interior panel.

38. The hydraulic fracturing unit of claim 37, wherein:
the exterior panel and the interior panel at least partially define a separator cavity therebetween; and
the air flow tube is connected to an exterior surface of the separator tube and at least partially defines a second separator flow path for the first portion of the one or more of particles or liquid to be separated from the ambient air entering the inertial separator, the second separator flow path being positioned to deposit the first portion of the one or more of particles or liquid into the separator cavity.

39. The hydraulic fracturing unit of claim 38, wherein the distal end of the air flow tube terminates between the exterior panel and the interior panel, thereby at least partially defining the second separator flow path.

40. The hydraulic fracturing unit of claim 32, further comprising a pre-cleaner collector connected to the pre-cleaner and positioned to receive the first portion of the one or more of particles or liquid separated from the ambient air.

41. The hydraulic fracturing unit of claim 32, wherein one or more of an interior passage of the air flow tube, an interior passage of the separator tube, or an exterior surface of the separator tube has a substantially circular cross-sectional shape.

42. The hydraulic fracturing unit of claim 32, wherein the one or more filters comprise one or more of a pre-filter or a final filter.

43. The hydraulic fracturing unit of claim 42, wherein the one or more filters comprise the pre-filter downstream of the pre-cleaner and the final filter downstream of the pre-filter.

44. The hydraulic fracturing unit of claim 42, wherein the one or more of a pre-filter or a final filter comprises one or more of a medium-efficiency intermediate filter or a high-efficiency final filter.

45. The hydraulic fracturing unit of claim 42, wherein the one or more of a pre-filter or a final filter comprises one or more of a cartridge-type pre-filter or a bag-type pre-filter.

46. The hydraulic fracturing unit of claim 32, wherein the pre-cleaner comprises a plurality of inertial separators.

47. The hydraulic fracturing unit of claim 46, wherein:
the pre-cleaner comprises an exterior panel facing outward from the filtration assembly and an interior panel opposite the exterior panel and facing inward toward the interior of the filtration assembly; and
one or more of the exterior panel or the interior panel at least partially defines an upper end and a lower end, and the plurality of inertial separators are arranged in groups extending diagonally between the upper end and the lower end of the pre-cleaner.

48. The hydraulic fracturing unit of claim 32, wherein the pre-cleaner comprises one or more flanges extending outward from a perimeter of the pre-cleaner, and the pre-cleaner is connected to the filtration assembly via the one or more flanges.

49. The hydraulic fracturing unit of claim 32, wherein the filtration assembly comprises a plurality of pre-cleaners.

50. The hydraulic fracturing unit of claim 49, wherein:
the filtration assembly comprises a filtration housing connected to the turbine housing, the filtration housing and the plurality of pre-cleaners at least partially defining a filtration chamber; and
the one or more filters are positioned in the filtration chamber.

51. The hydraulic fracturing unit of claim 50, further comprising one or more sound attenuation baffles positioned in the filtration chamber to attenuate sound generated during operation of the gas turbine engine.

52. The hydraulic fracturing unit of claim 50, wherein the filtration housing comprises one or more access panels positioned to facilitate access to the filtration chamber.

53. A method to enhance efficiency of operation of a gas turbine engine, the method comprising:
causing ambient air to flow toward an inlet assembly connected to the gas turbine engine;
passing the ambient air through one or more pre-cleaners to cause the ambient air to swirl and separate a first portion of one or more of particles or liquid from the ambient air, thereby to provide at least partially filtered intake air;
passing the at least partially filtered intake air through one or more filters to separate a second portion of the one or more of particles or liquid from the at least partially filtered intake air, thereby to provide further filtered intake air; and
supplying the further filtered intake air to the intake assembly.

54. The method of claim 53, wherein passing the ambient air through one or more pre-cleaners comprises:
passing the ambient air through an air flow tube and a diverter connected to the air flow tube and positioned to cause the ambient air entering the air flow tube to swirl as the ambient air flows from a proximal end of the air flow tube to a distal end of the air flow tube to thereby generate swirling ambient air;
passing the swirling ambient air to a separator tube extending from the distal end of the air flow tube; and
separating the first portion of the one or more of particles or liquid from the swirling ambient air via the separator tube.

55. The method of claim 54, wherein passing the ambient air through an air flow tube and the diverter comprises passing the ambient air through one or more stator blades presenting one or more curved surfaces to cause the ambient air entering the air flow tube to swirl.

56. The method of claim 55, wherein passing the at least partially filtered intake air through the one or more filters comprises passing the at least partially filtered intake air through one or more of a pre-filter or a final filter.

57. The method of claim 56, wherein passing the at least partially filtered intake air through the one or more of a pre-filter or a final filter comprises one or more of:
passing the at least partially filtered intake air through a pre-filter downstream of the pre-cleaner and the final filter downstream of the pre-filter;
passing the at least partially filtered intake air through one or more of a medium-efficiency intermediate filter or a high-efficiency final filter; or
passing the at least partially filtered intake air through one or more of a cartridge-type pre-filter or a bag-type pre-filter.

58. The method of claim 54, wherein separating the first portion of the one or more of particles or liquid from the swirling ambient air via the separator tube comprises:
passing the at least partially filtered intake air through an interior passage of the separator tube; and
passing the first portion of the one or more of particles or liquid or tube around an exterior surface of the separator tube.

59. The method of claim 58, further comprising causing the first portion of the one or more of particles or liquid to be deposited into a separator cavity of the one or more pre-cleaners.

60. The method of claim 59, wherein causing the first portion of the one or more of particles or liquid to be deposited into the separator cavity comprises causing the first portion of the one or more of particles or liquid to pass between an exterior panel of the pre-cleaner and an interior panel of the pre-cleaner.

61. The method of claim 60, further comprising:
connecting the proximal end of the air flow tube to the exterior panel; and
connecting the separator tube to the interior panel, such that the separator tube extends toward the distal end of the air flow tube and provides flow communication between an interior passage of the air flow tube and an interior passage of the separator tube and an exterior surface of the separator tube.

62. The method of claim 61, further comprising connecting the air flow tube to an exterior surface of the separator tube to at least partially define a separator flow path for the first portion of the one or more of particles or liquid to be separated from the ambient air entering the inertial separator and to be received in the separator cavity.

63. The method of claim 60, further comprising causing the first portion of the one or more of particles or liquid to pass through the separator cavity into a pre-cleaner collector connected to the pre-cleaner and positioned to receive the first portion of the one or more of particles or liquid separated from the ambient air.

64. The method of claim 53, wherein passing the ambient air through the one or more pre-cleaners comprises passing the ambient air through a plurality of inertial separators.

65. The method of claim 53, further comprising passing the further filtered intake air through one or more sound attenuation baffles to attenuate sound generated during operation of the gas turbine engine.

* * * * *